United States Patent
Choi et al.

(10) Patent No.: US 12,454,064 B2
(45) Date of Patent: Oct. 28, 2025

(54) ROBOT AND CONTROLLING METHOD THEREOF

(71) Applicant: Samsung Electronics Co., Ltd., Suwon-si (KR)

(72) Inventors: Yeeun Choi, Suwon-si (KR); Hoon Han, Suwon-si (KR); Jinah Kong, Suwon-si (KR); Hyojin Kim, Suwon-si (KR); Jiwoong Hwang, Suwon-si (KR); Seungjoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 254 days.

(21) Appl. No.: 18/321,261

(22) Filed: May 22, 2023

(65) Prior Publication Data

US 2024/0066717 A1    Feb. 29, 2024

Related U.S. Application Data

(63) Continuation of application No. PCT/KR2023/006049, filed on May 3, 2023.

(30) Foreign Application Priority Data

Aug. 24, 2022 (KR) .................. 10-2022-0106367

(51) Int. Cl.
*B25J 13/06* (2006.01)
(52) U.S. Cl.
CPC .................... *B25J 13/06* (2013.01)
(58) Field of Classification Search
None
See application file for complete search history.

(56) References Cited

U.S. PATENT DOCUMENTS 10,349,245 B2   7/2019  Tokuchi
10,766,137 B1 * 9/2020  Porter .................. G06N 3/04
(Continued)

FOREIGN PATENT DOCUMENTS

JP    2017-100221 A    6/2017
JP    2018-176386 A    11/2018
(Continued)

OTHER PUBLICATIONS

Burlamaqui et al., A Multimedia Framework for Collaborative Interaction of People and Robots Through the Web, 2006, IEEE, p. 2-7 (Year: 2006).*

(Continued)

*Primary Examiner* — McDieunel Marc
(74) *Attorney, Agent, or Firm* — Jefferson IP Law, LLP

(57) ABSTRACT

A robot is provided. The robot includes a display, a memory storing identification information of the robot, a communication interface communicating with a server providing a virtual environment service, and at least one processor configured to, based on receiving a user input for interlocking the robot with the virtual environment service, transmit the identification information of the robot stored in the memory to the server through the communication interface, and based on receiving interaction information related to an avatar corresponding to the identification information of the robot from the server through the communication interface, control an operation of the robot based on the interaction information.

19 Claims, 40 Drawing Sheets

(56) References Cited

U.S. PATENT DOCUMENTS

| | | | |
|---|---|---|---|
| 10,792,810 B1* | 10/2020 | Beckman | B25J 9/163 |
| 10,800,040 B1* | 10/2020 | Beckman | B25J 9/1605 |
| 11,207,774 B2 | 12/2021 | Hayashi et al. | |
| 11,948,241 B2 | 4/2024 | Shin et al. | |
| 12,150,060 B2* | 11/2024 | Höglund | H04W 52/0235 |
| 2010/0145514 A1 | 6/2010 | Kim et al. | |
| 2018/0310118 A1 | 10/2018 | Tokuchi | |
| 2019/0389058 A1 | 12/2019 | Hayashi et al. | |
| 2020/0410739 A1 | 12/2020 | Shin et al. | |
| 2022/0035903 A1 | 2/2022 | Kim | |
| 2024/0273793 A1* | 8/2024 | DeCharms | G09B 5/06 |

FOREIGN PATENT DOCUMENTS

| | | |
|---|---|---|
| JP | 2020-000279 A | 1/2020 |
| JP | 2020-089529 A | 6/2020 |
| KR | 10-1416343 B1 | 8/2014 |
| KR | 10-1457377 B1 | 11/2014 |
| KR | 10-2016-0015803 A | 2/2016 |
| KR | 10-2016-0113384 A | 9/2016 |
| KR | 10-2018-0119515 A | 11/2018 |
| KR | 10-2242779 B1 | 4/2021 |
| KR | 10-2502228 B1 | 2/2023 |
| KR | 10-2518703 B1 | 4/2023 |
| WO | 2018/089700 A1 | 5/2018 |

OTHER PUBLICATIONS

Tavares; et al., HYPERPRESENCE—an application environment for control of multi-user agents in mixed reality spaces, 2003, IEEE, p. 1-8 (Year: 2003).*

Burlamaqui et al., A framework for collaborative interaction of people and robots in the Web, 2005, IEEE, p. 1-4 (Year: 2005).*

Mollet et al., Standardization and Integration in Robotics: Case of Virtual Reality Tools, 2008, IEEE, p. 525-530 (Year: 2008).*

Mizuchi et al., Cloud-based multimodal human-robot interaction simulator utilizing ROS and unity frameworks, 2017, IEEE, 2017, p. 948-955 (Year: 2017).*

Habib et al., Distributed teleoperation and collaborative environment for robotics E-learning and cooperation, 2008, IEEE, p. 1358-1363 (Year: 2008).*

Amstutz et al., Real time visualization of robot state with mobile virtual reality, 2002, IEEE, p. 241-247 (Year: 2002).*

Mrissa et al., An Avatar Architecture for the Web of Things, 2015, IEEE, p. 36-38 (Year: 2015).*

International Search report and written opinion dated Aug. 1, 2023, issued in International Application No. PCT/KR2023/006049.

* cited by examiner

FIG. 8

| CLASSIFICATION | CONTENT | EXAMPLE |
|---|---|---|
| PRIMARY INFORMATION | BASIC INFORMATION | ACCOUNT INFORMATION (ID), PROFILE INFORMATION |
| SECONDARY INFORMATION | CONVERSATION INFORMATION | KEYWORD, PREFERRED THEME, PREFERRED EMOTIONAL EXPRESSION, TENDENCY |
| THIRD INFORMATION | OBSERVATION INFORMATION | RELATION, ACTIVITY, VISITED PLACE, CONSUMPTION, PURCHASED PRODUCT, PREFERRED PRODUCT, PREFERRED THEME, PREFERENCE |
| FOURTH INFORMATION | ENVIRONMENT INFORMATION | INFORMATION COLLECTED IN THE METAVERSE ENVIRONMENT, AN EVENT, A NOTIFICATION (INCLUDING LOG-IN/LOG-OUT) |

810

FIG. 11
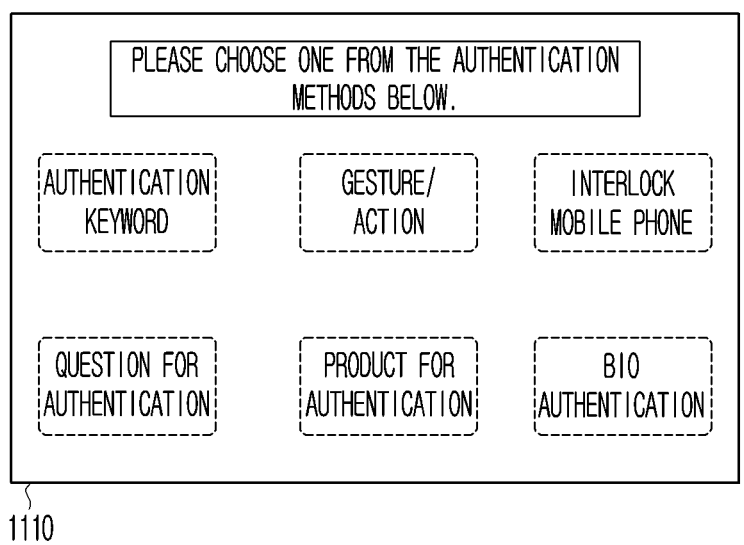
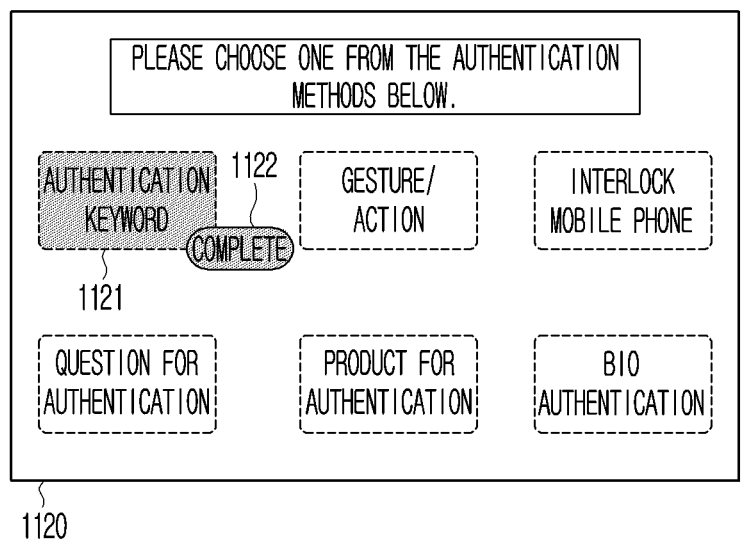

FIG. 12
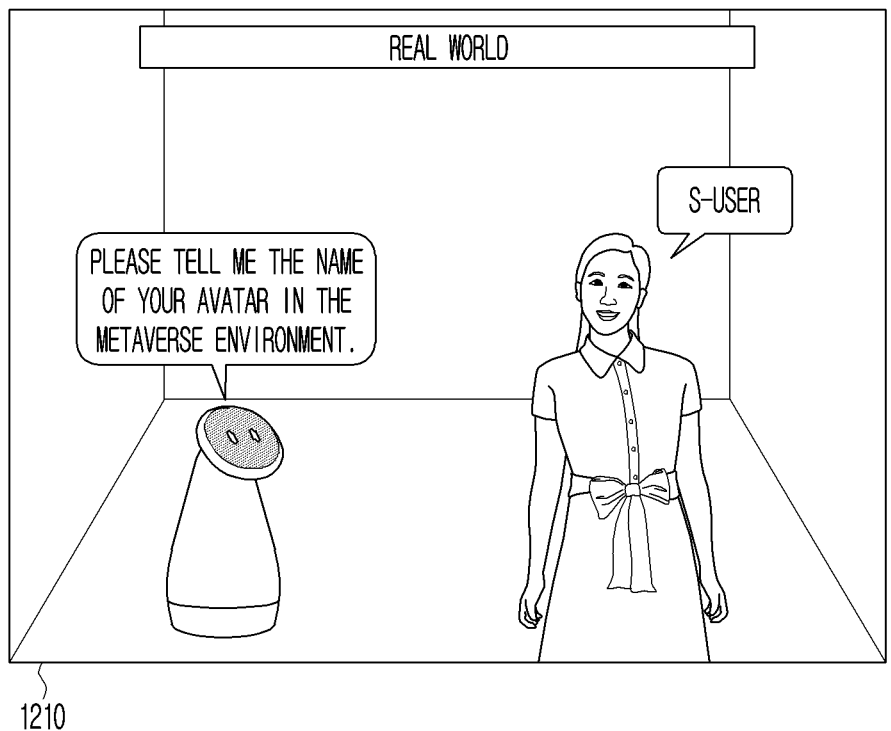
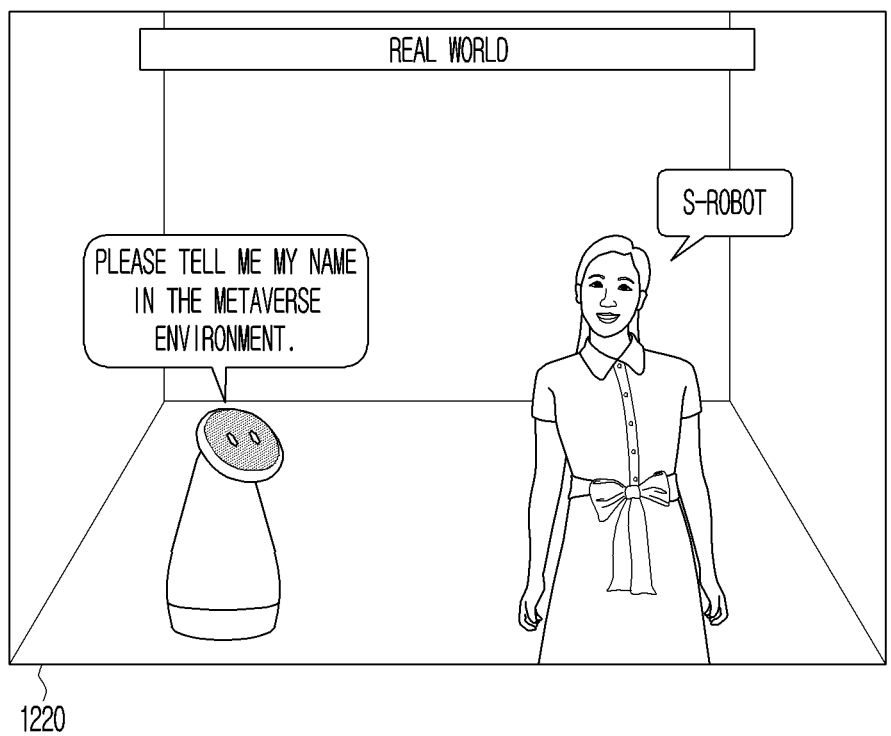

FIG. 13
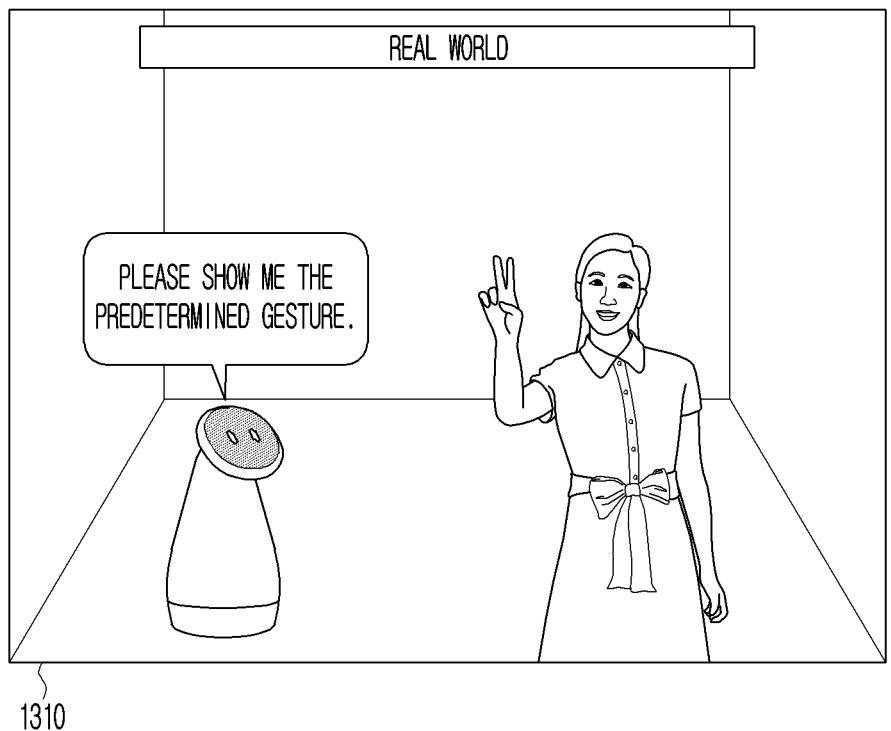
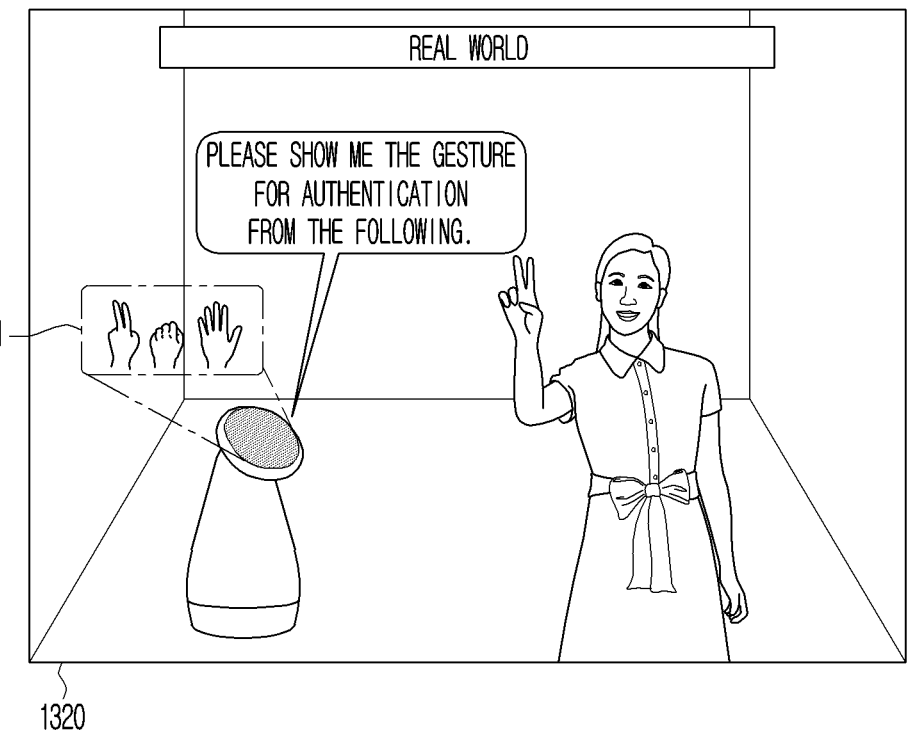

FIG. 14
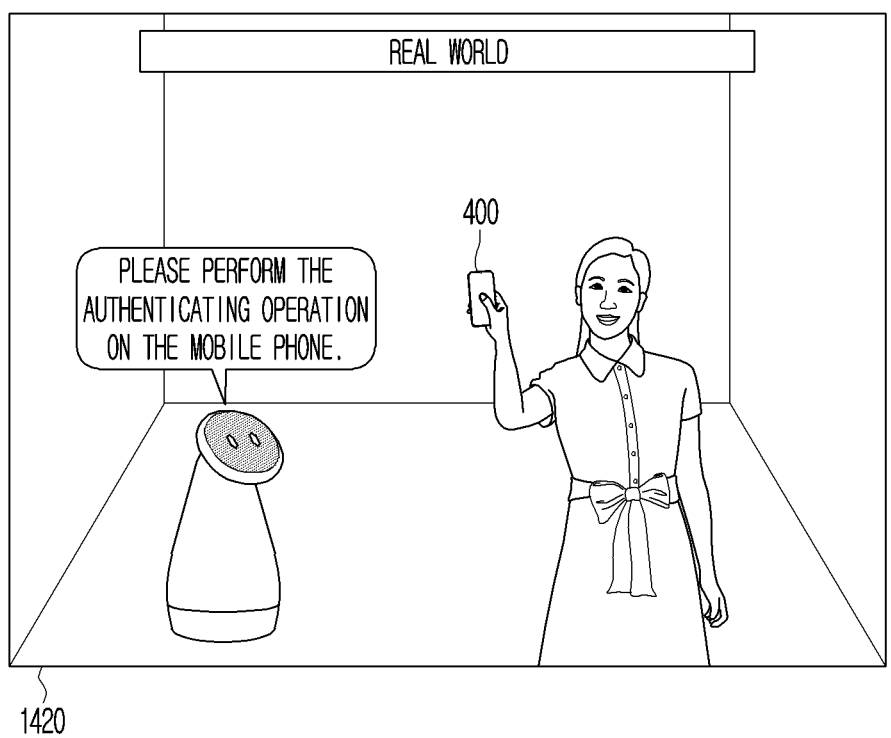

FIG. 15
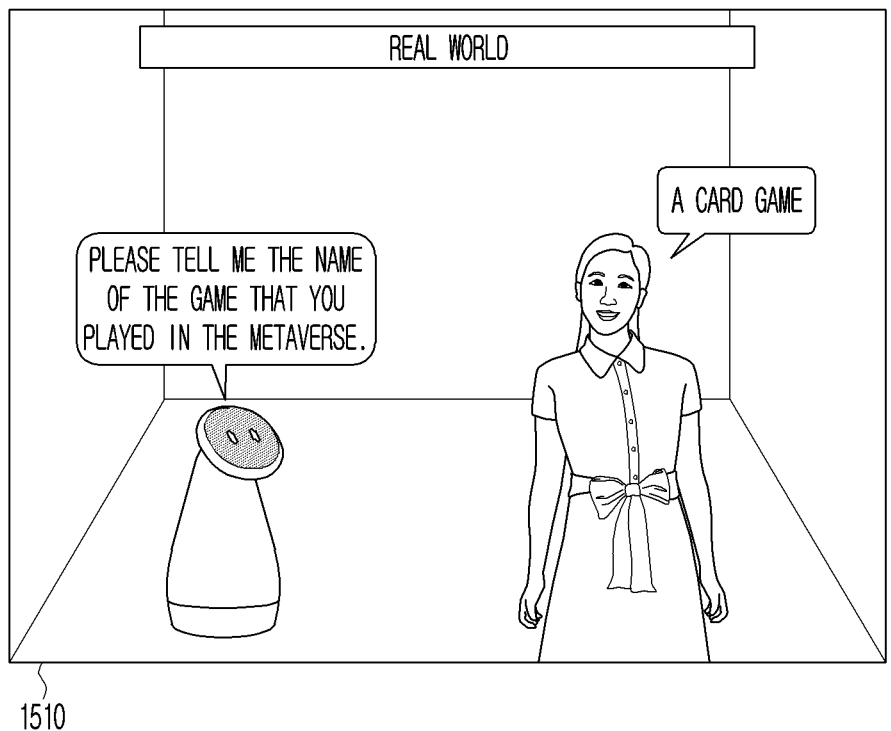
1510
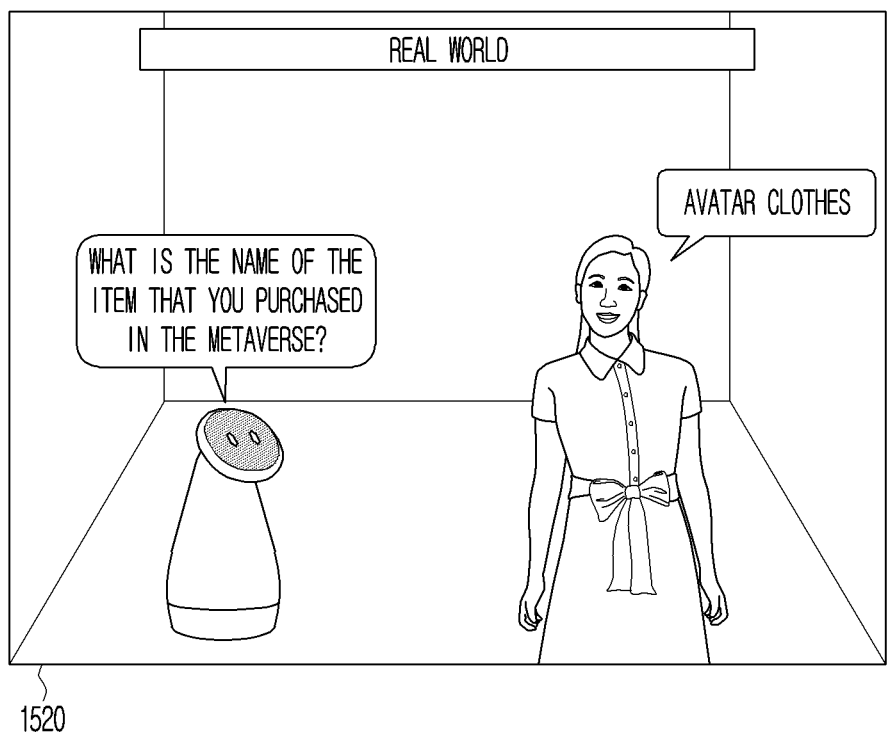
1520

FIG. 16
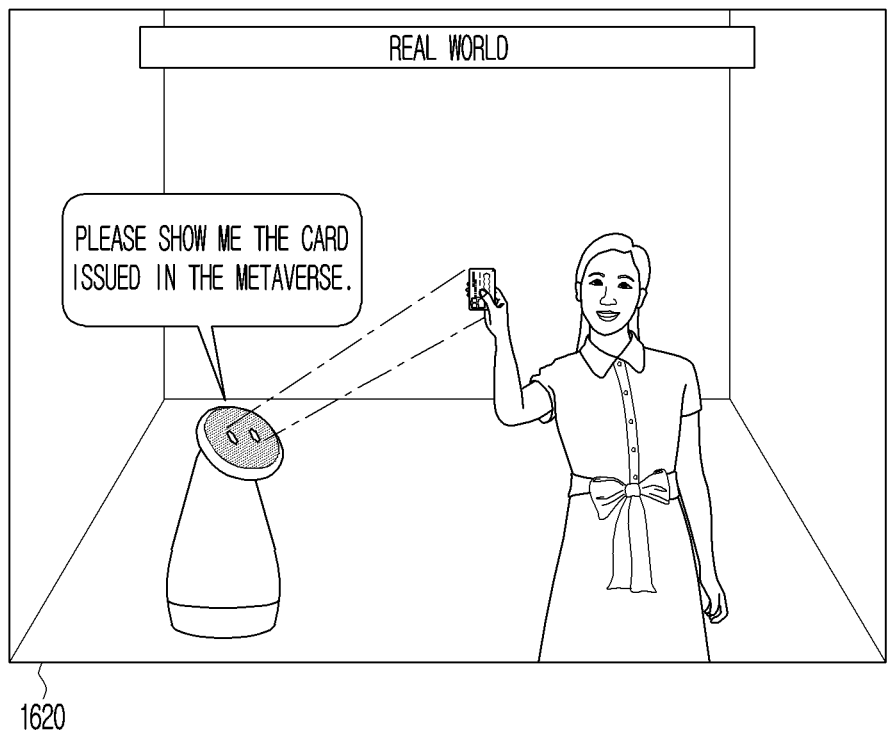

FIG. 17
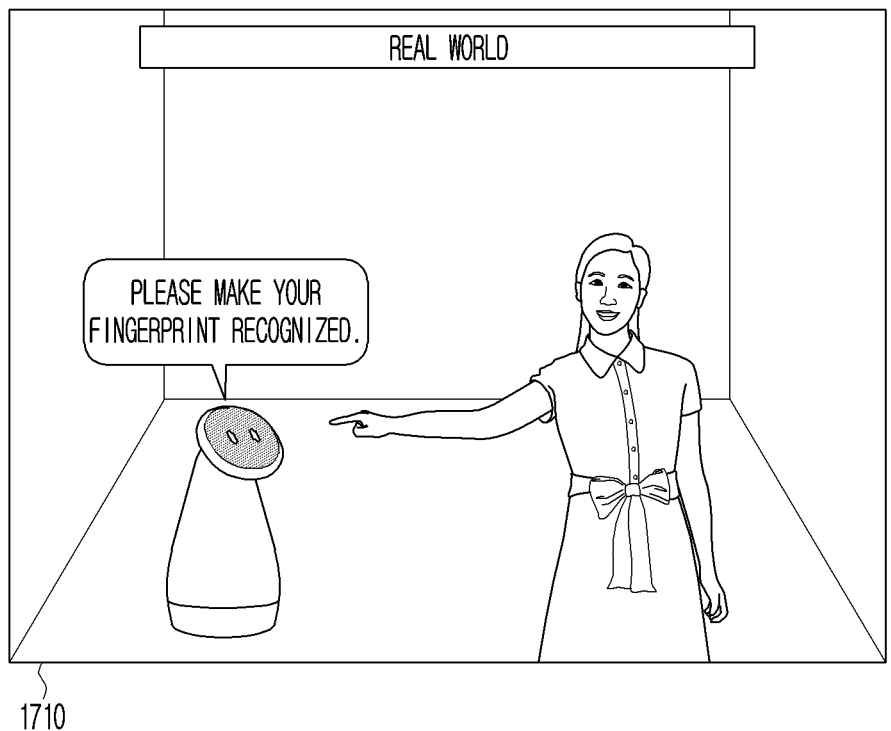
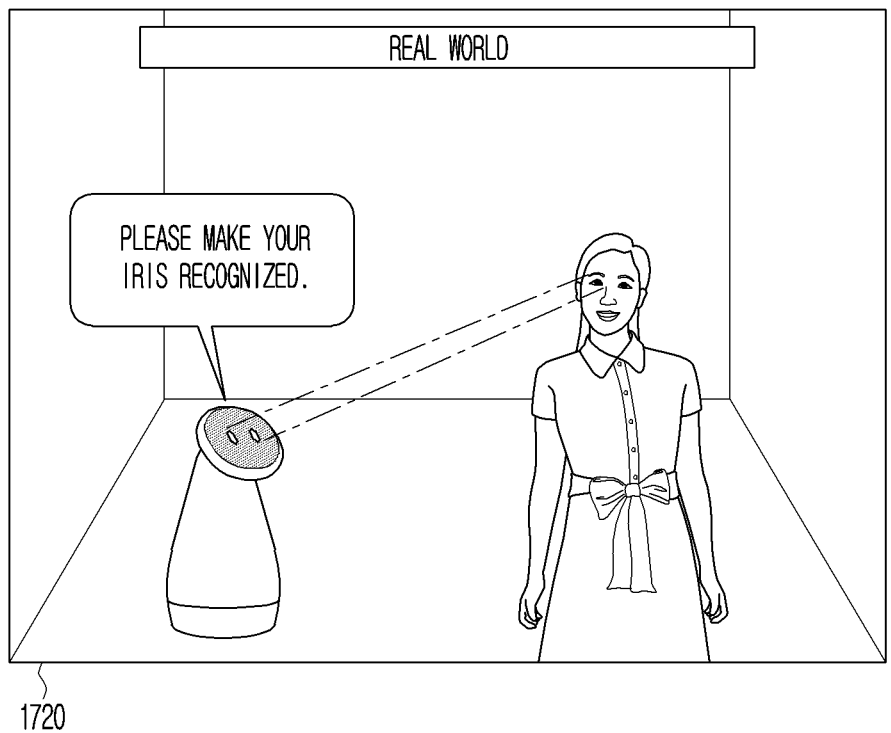

FIG. 20
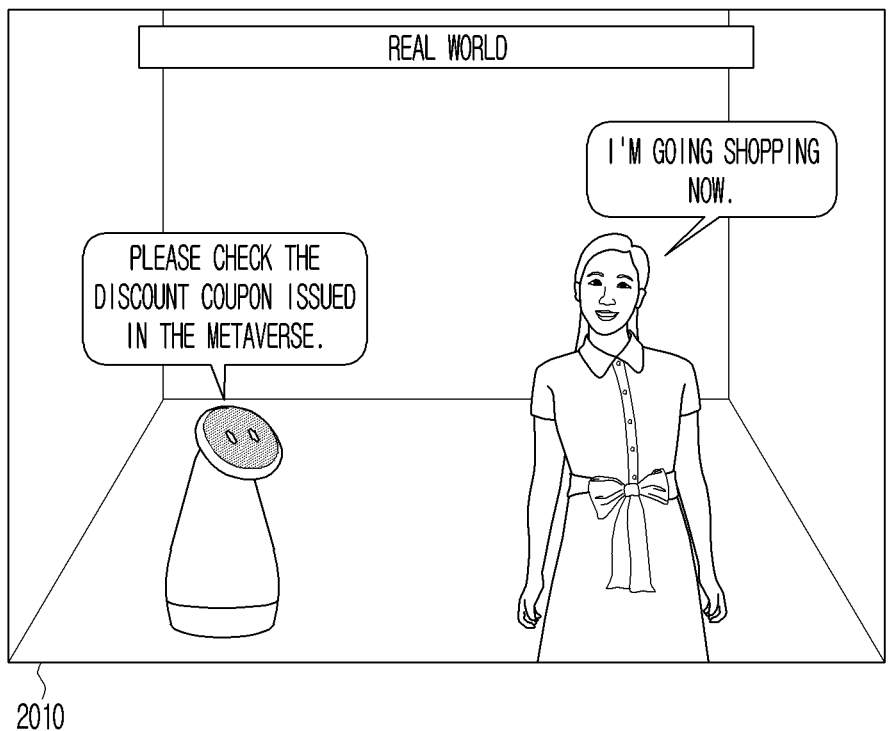
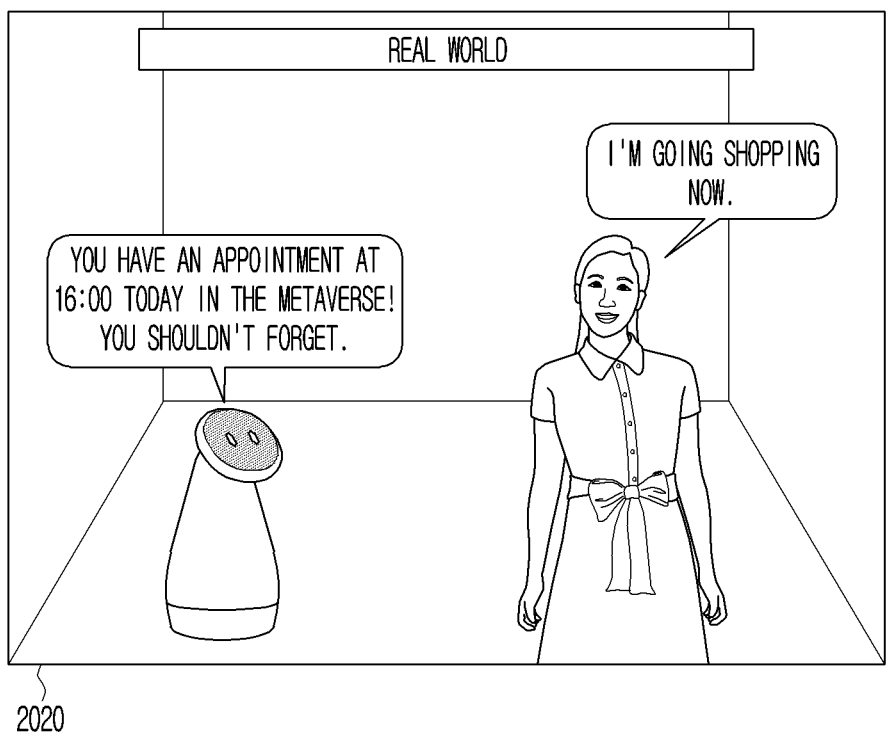

FIG. 23
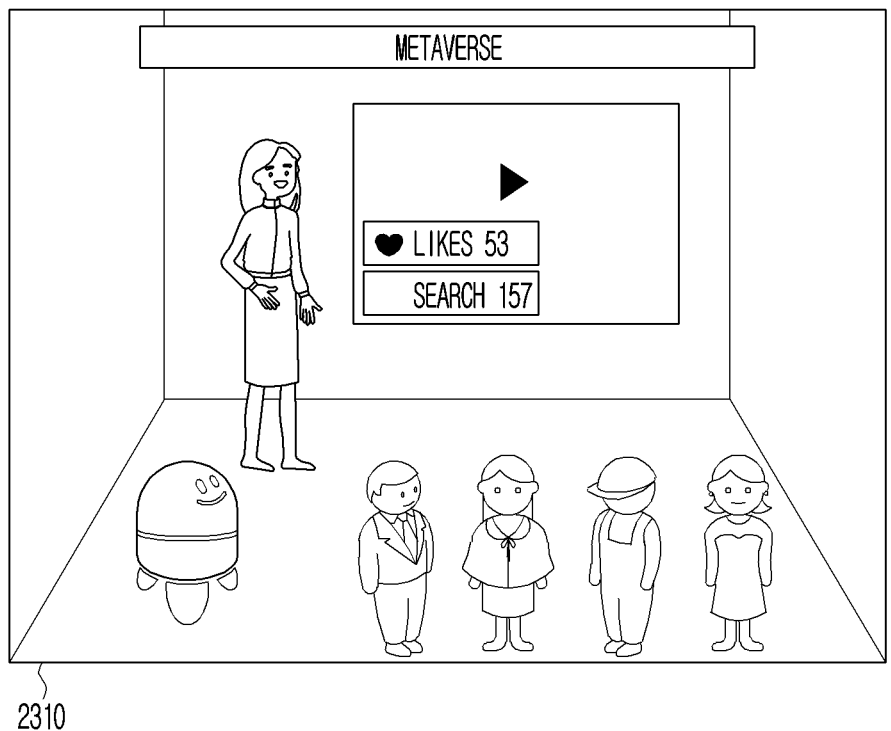
2310
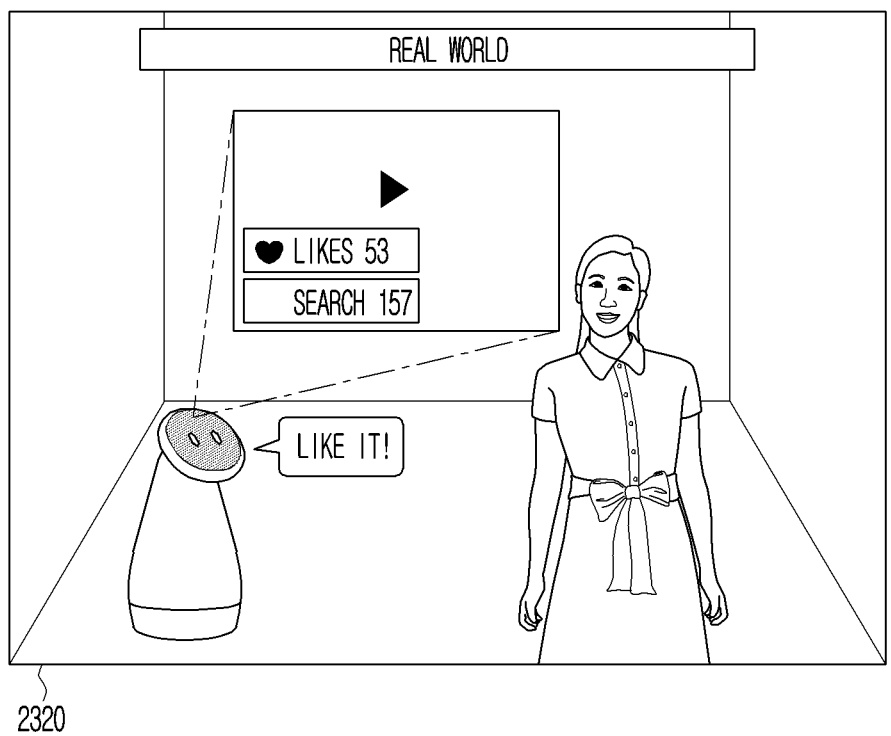
2320

FIG. 24
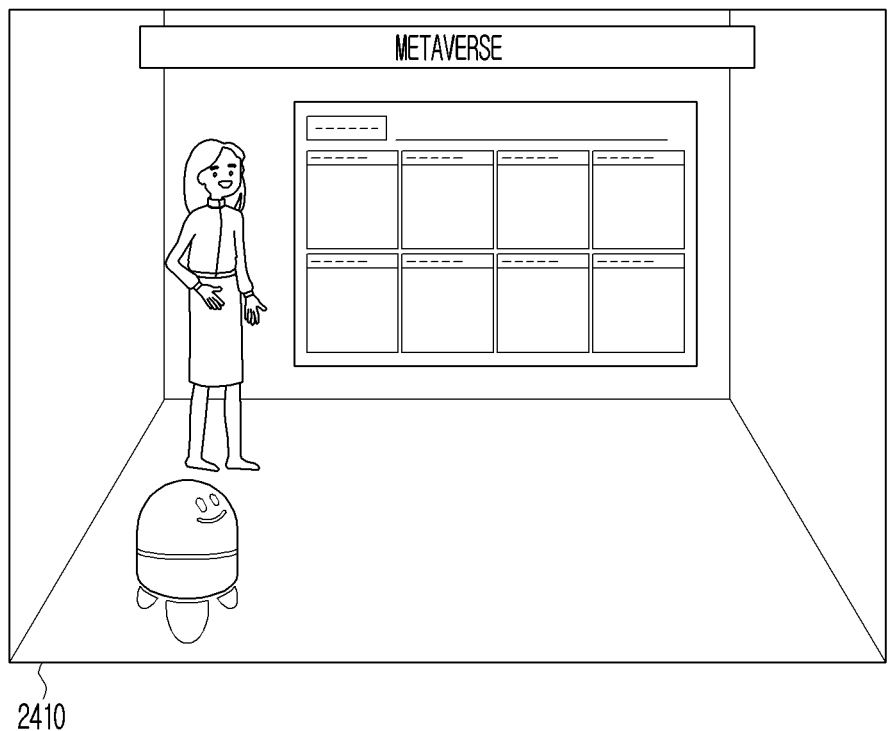

FIG. 25
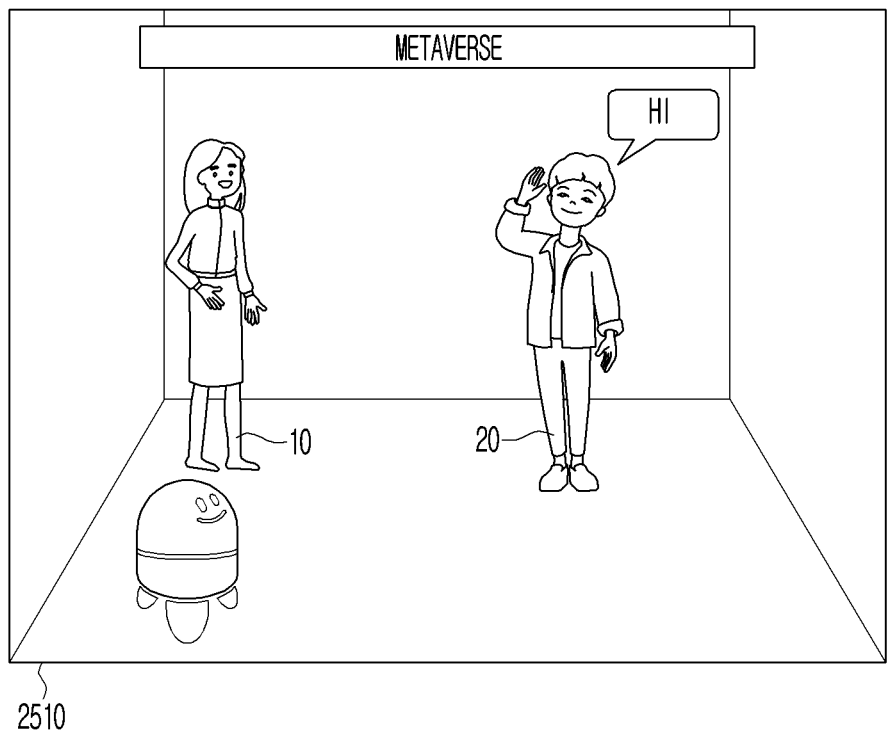
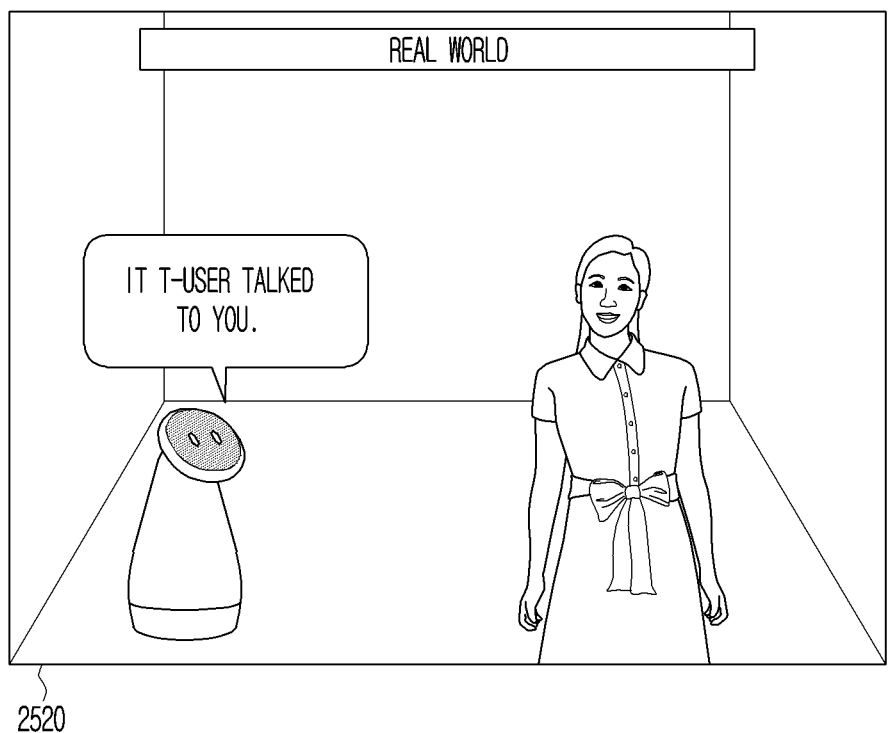

FIG. 26
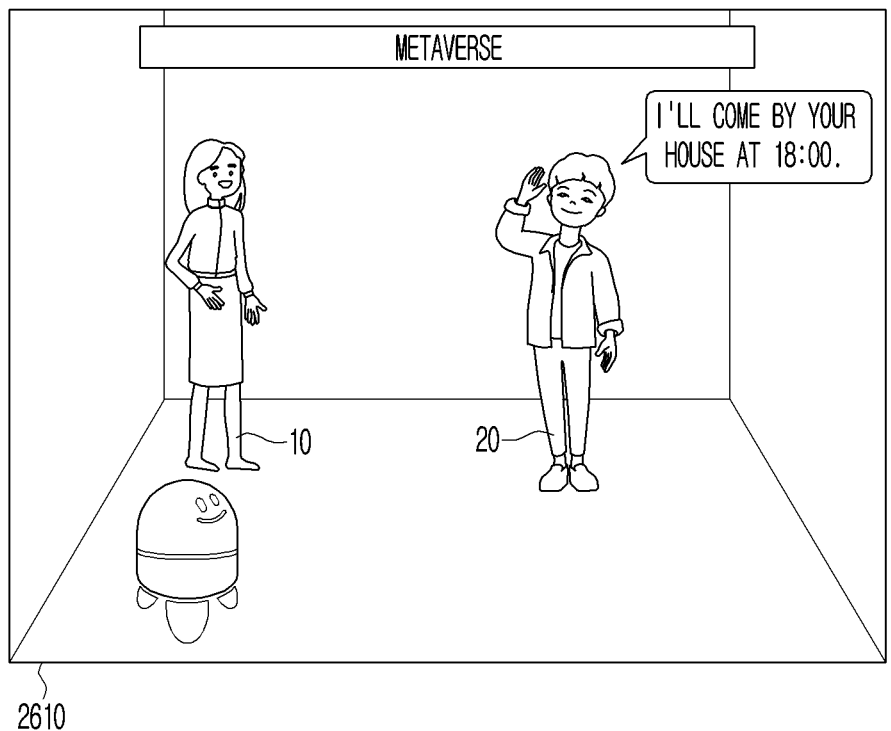
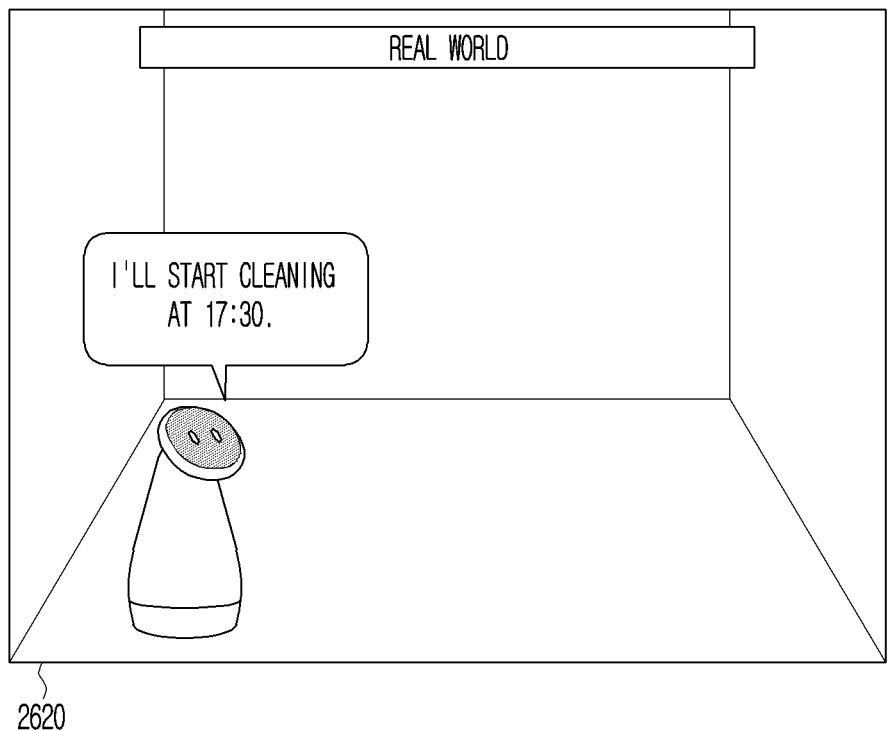

FIG. 27
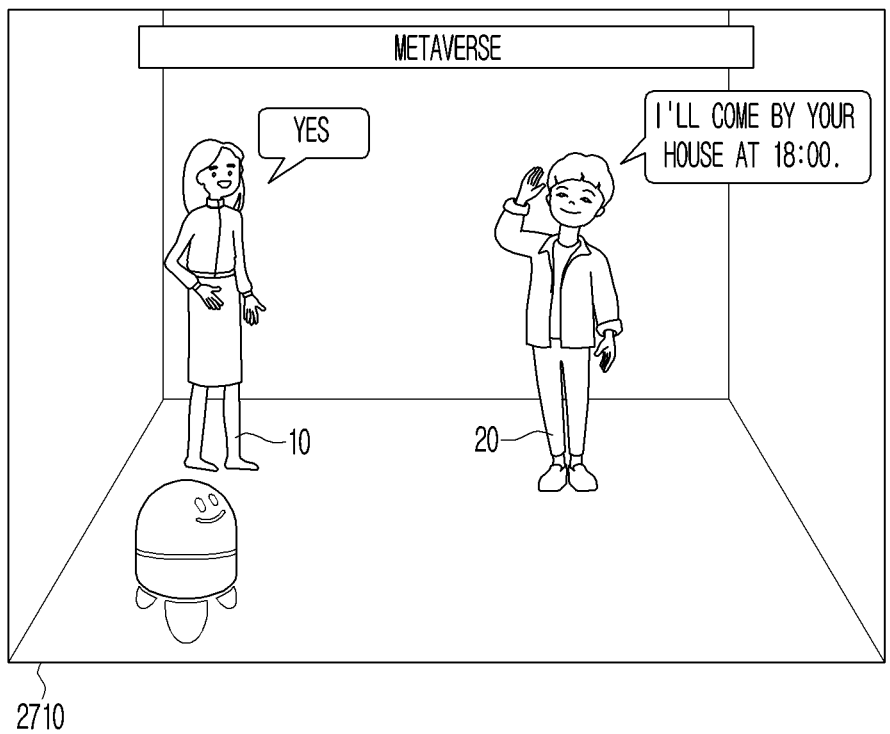
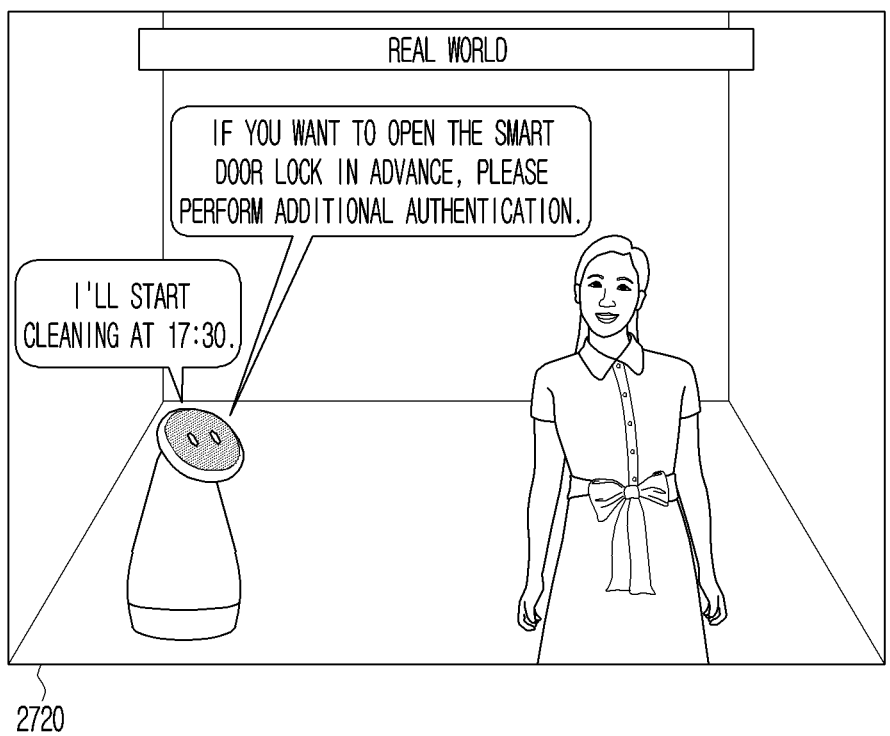

FIG. 30
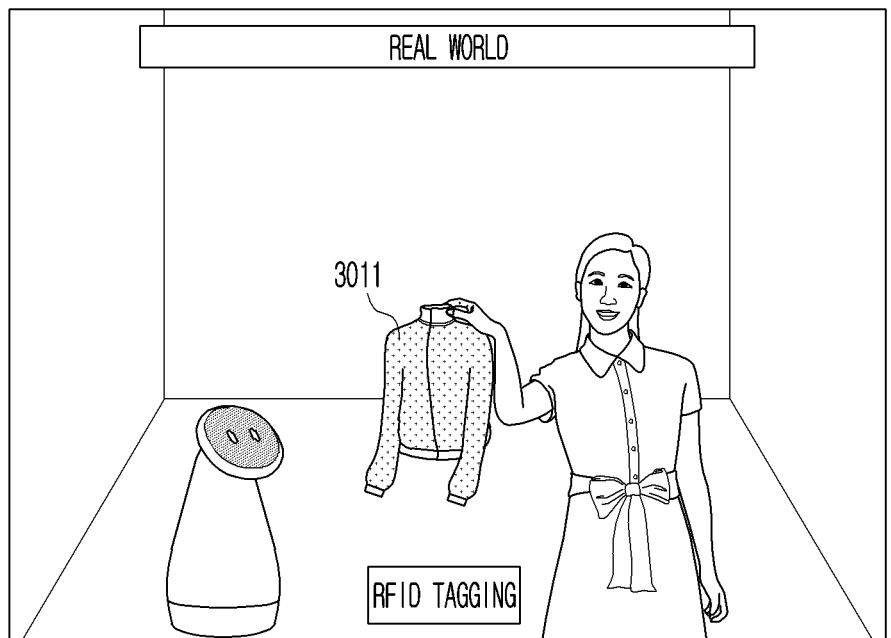
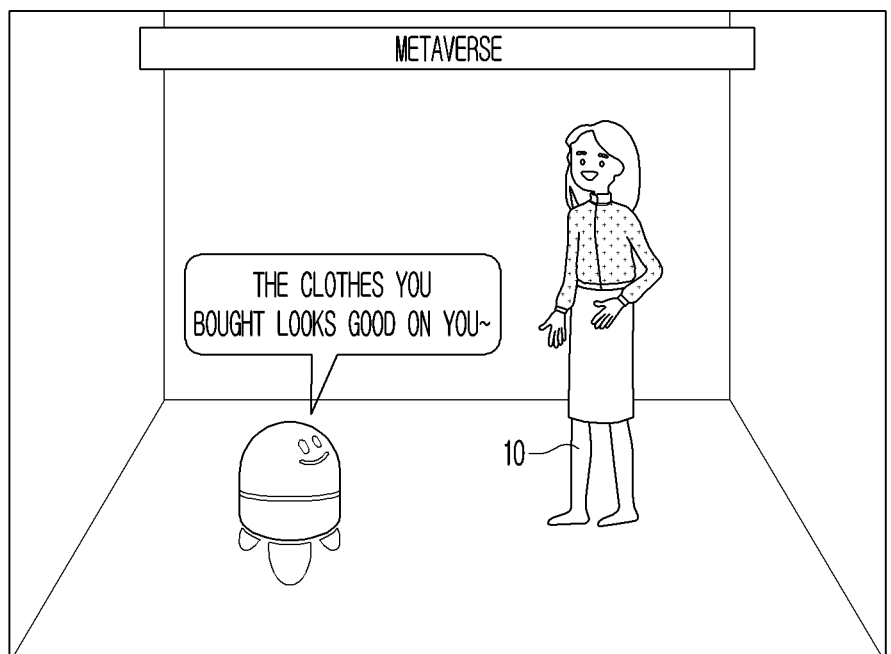

FIG. 31
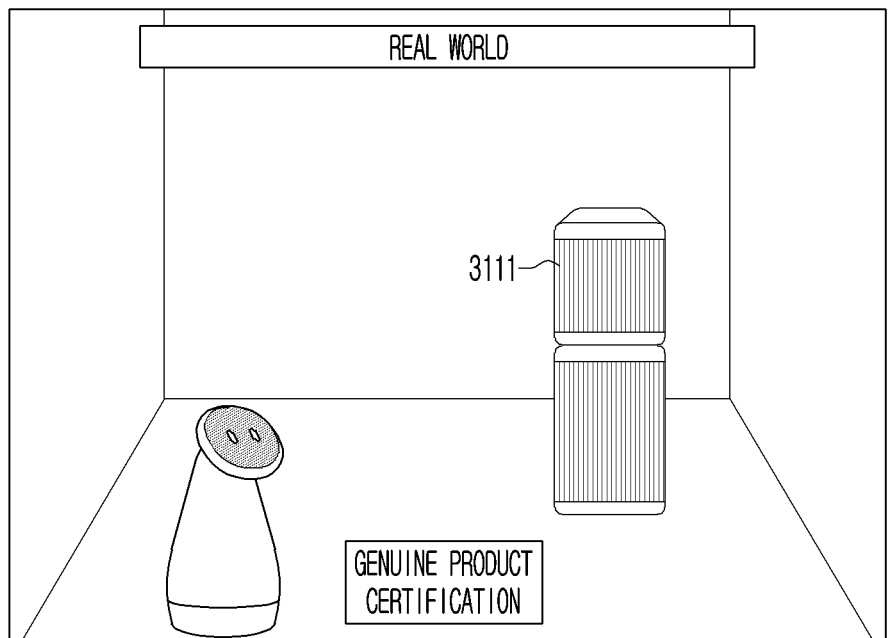
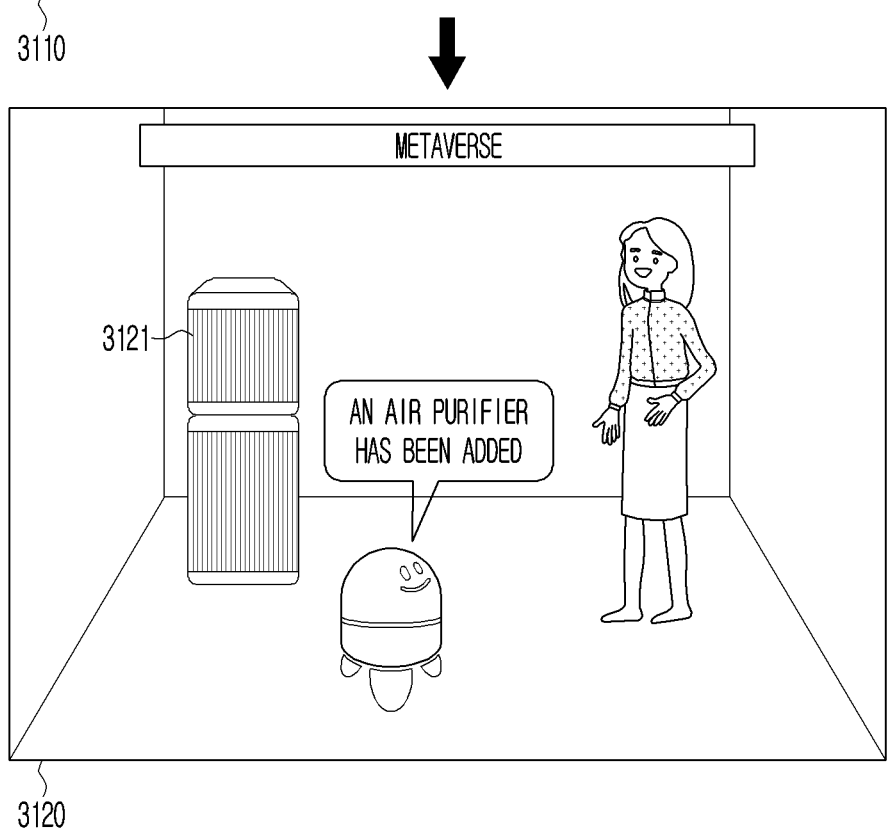

FIG. 32
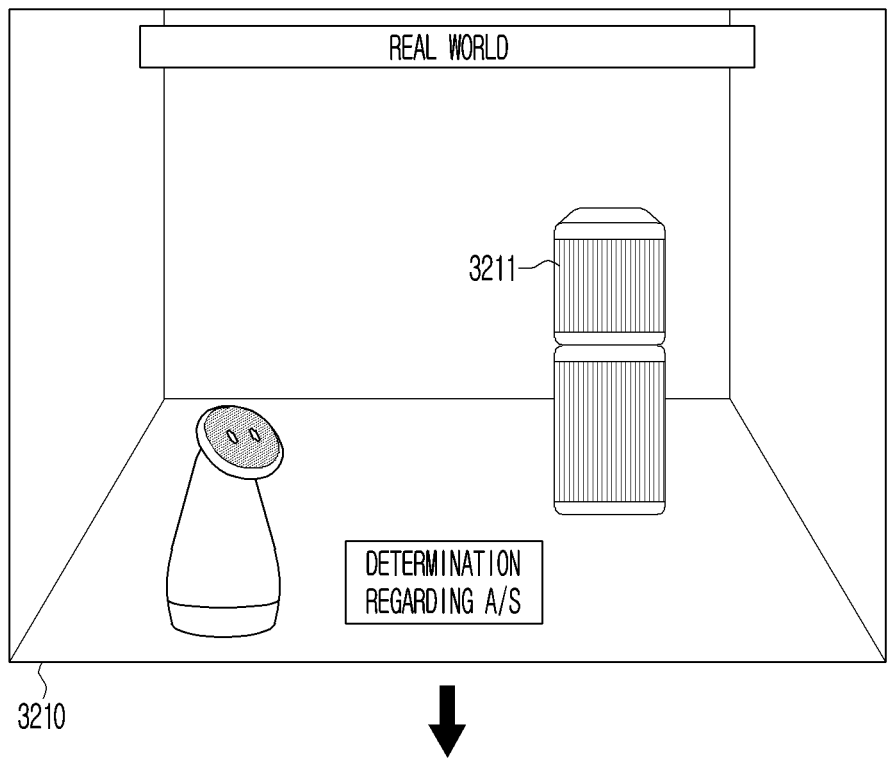
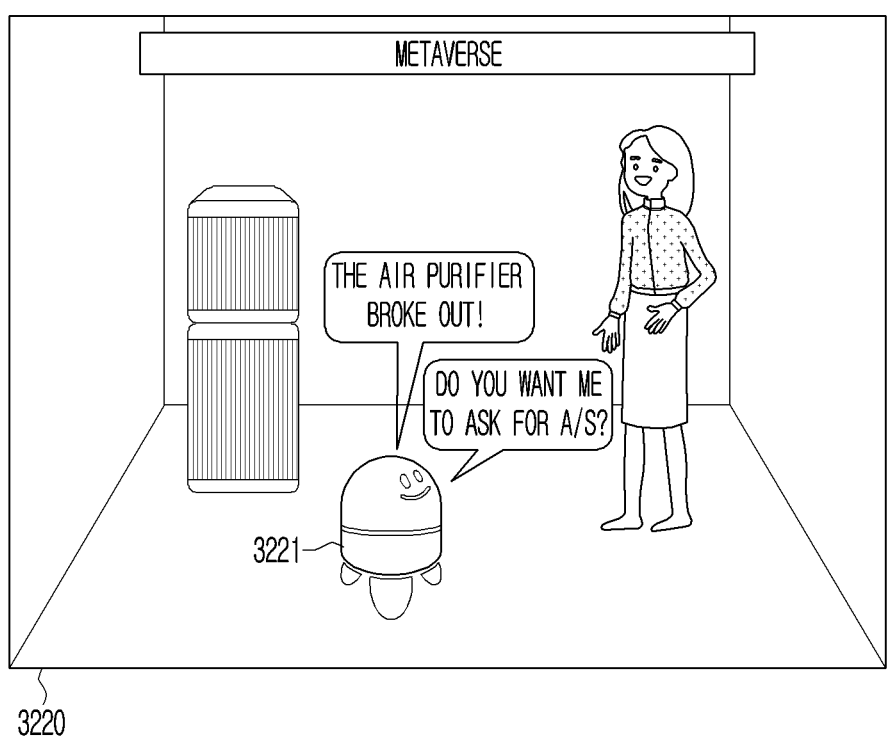

FIG. 33
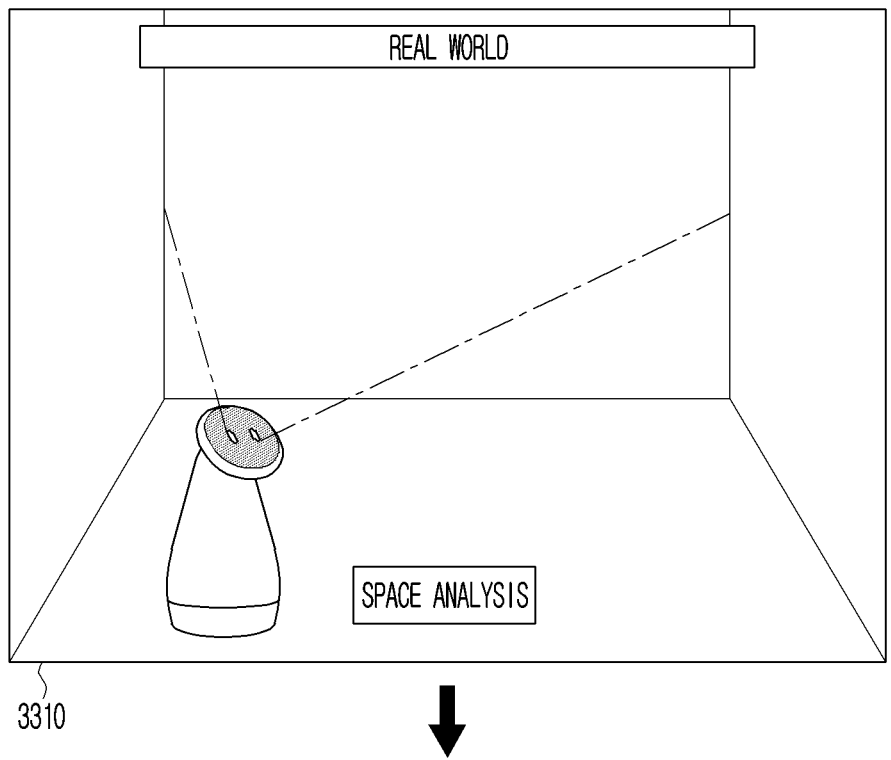
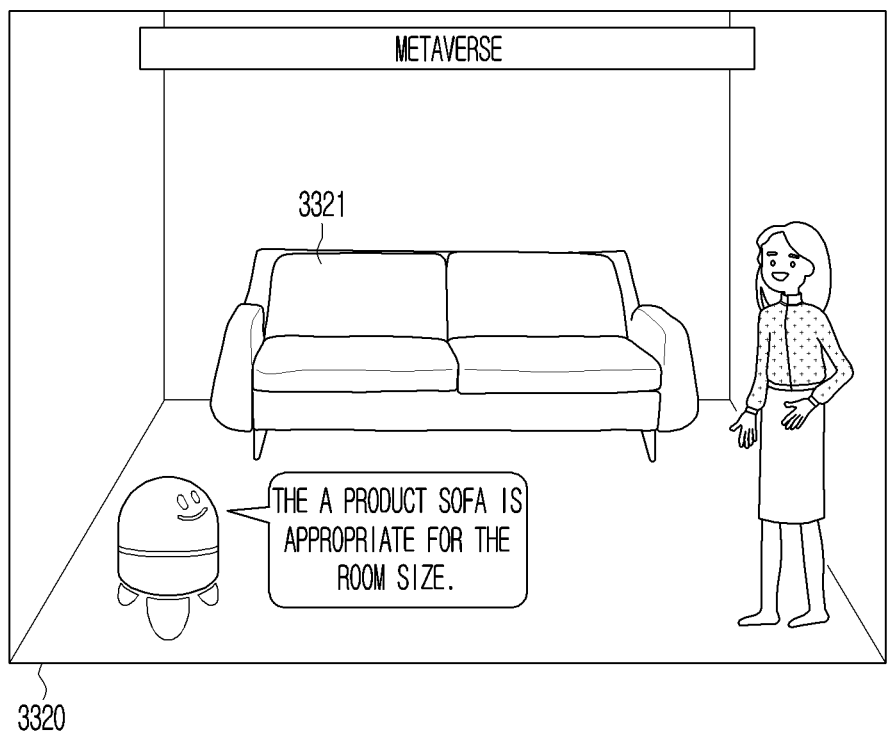

FIG. 34
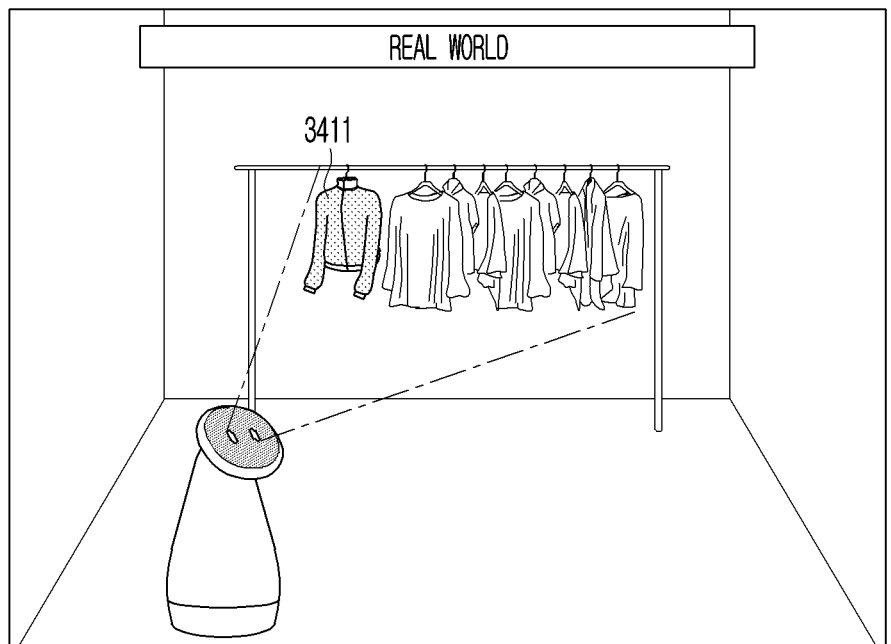
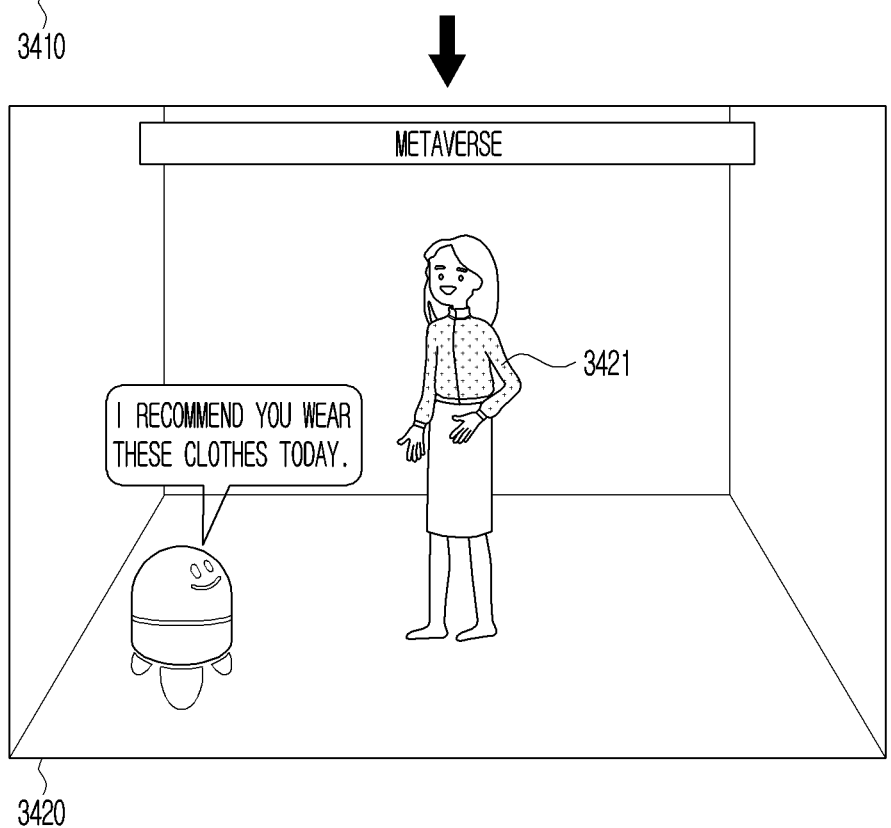

FIG. 35
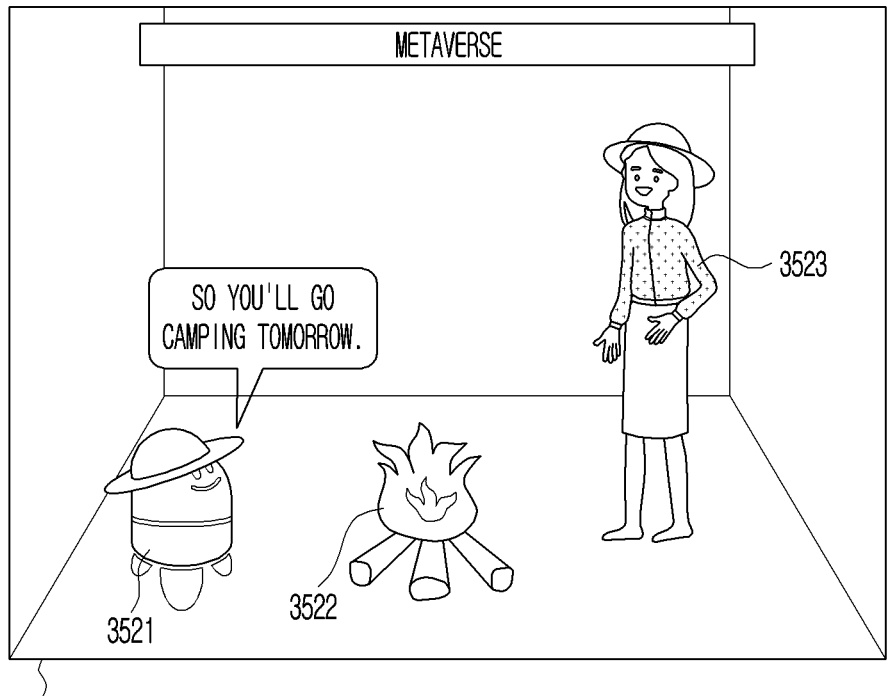

FIG. 36
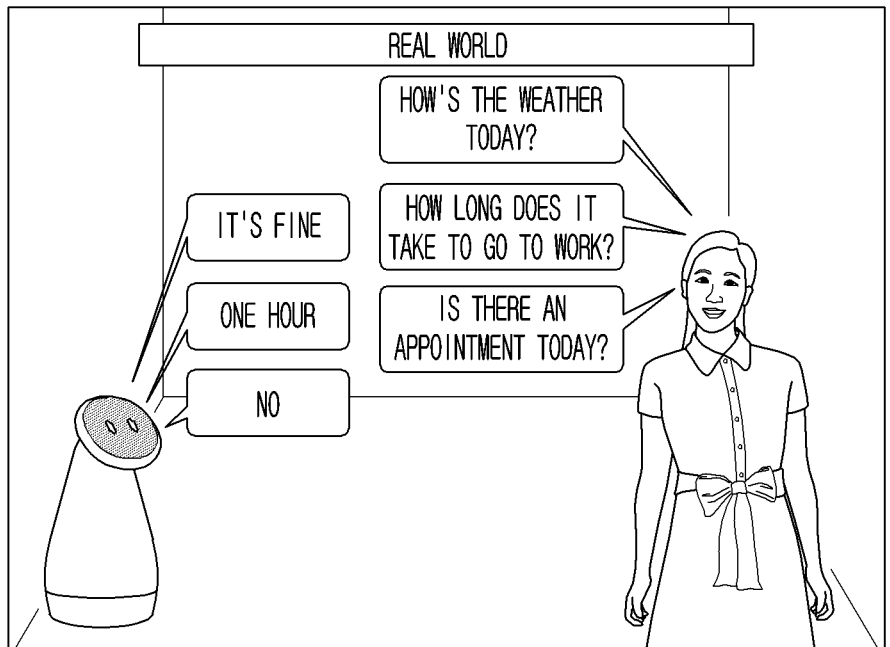
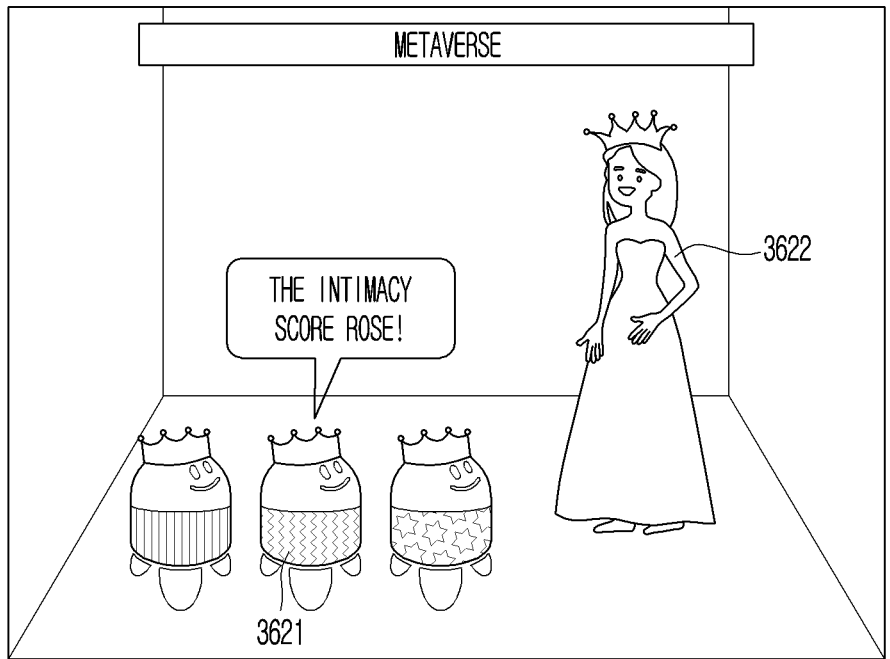

FIG. 37
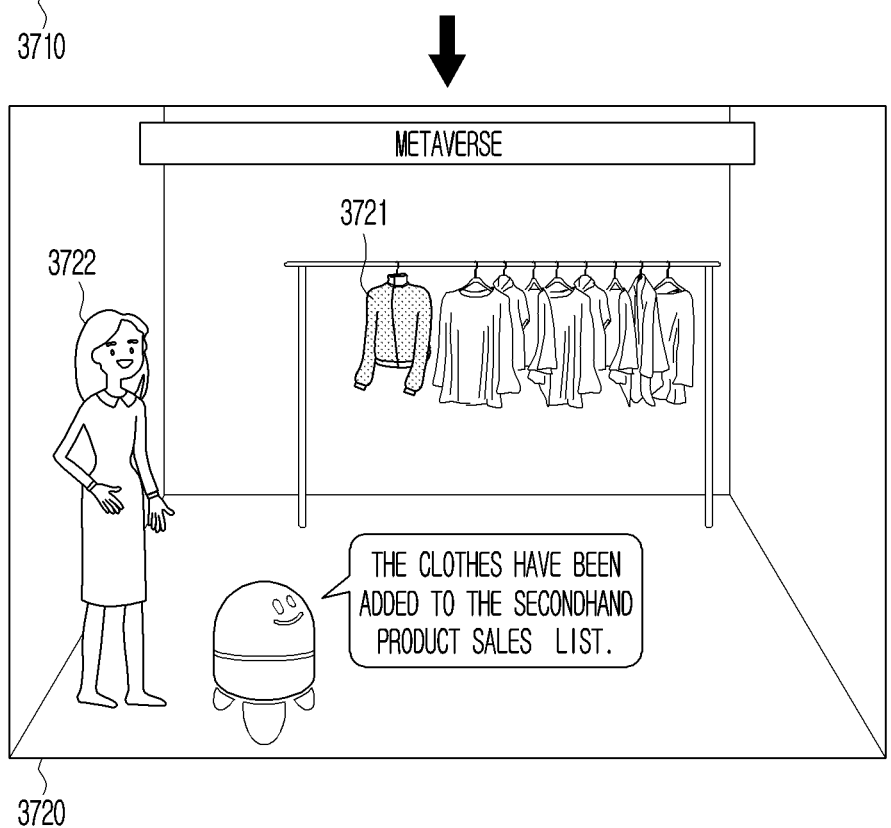

FIG. 38
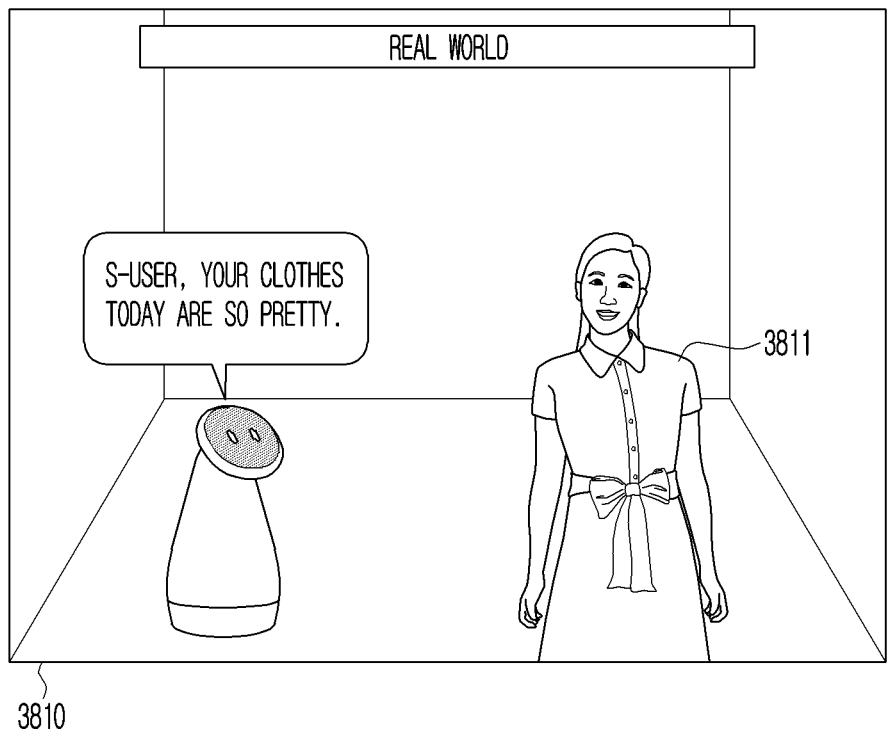
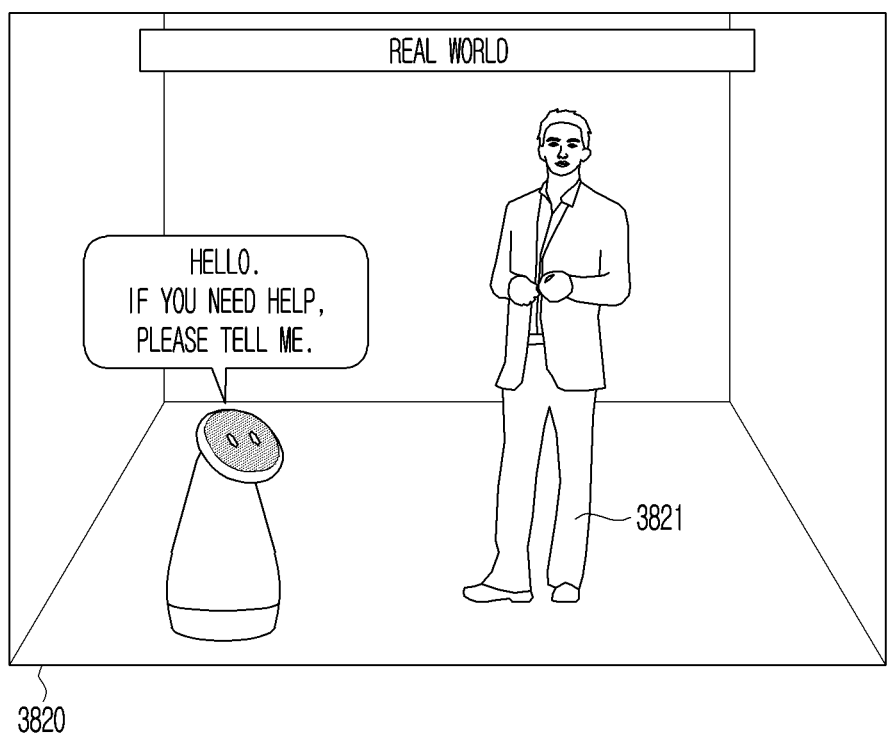

ROBOT AND CONTROLLING METHOD THEREOF

CROSS-REFERENCE TO RELATED APPLICATION(S)

This application is a continuation application, claiming priority under § 365(c), of an International application No. PCT/KR2023/006049, filed on May 3, 2023, which is based on and claims the benefit of a Korean patent application number 10-2022-0106367, filed Aug. 24, 2022, in the Korean Intellectual Property Office, the disclosure of which is incorporated by reference herein in its entirety.

TECHNICAL FIELD

The disclosure relates to a robot and a controlling method thereof. More particularly, the disclosure relates to a robot that provides a response to a user by using information related to a virtual environment service, and a controlling method thereof.

DESCRIPTION OF THE RELATED ART

A robot providing a voice recognition service of providing a response according to a user's utterance exists. The robot may provide an appropriate response according to a user instruction. Meanwhile, the robot may provide an appropriate response according to a user conversation. Here, the robot generates a response dependent on predetermined data. The robot may use a pre-trained model, or store only a voice that a user uttered in the space wherein the robot is arranged.

Accordingly, it is difficult for the robot to know specific information for a user, and thus there is a problem that the robot cannot provide an appropriate response fitting the situation to the user.

Recently, as there are increasing users who use a virtual environment service or a metaverse service, etc., there is inconvenience that a user has to perform an act of moving separate data, etc. for reflecting a user action performed at an external server to a robot.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Solution

Aspects of the disclosure are to address at least the above-mentioned problems and/or disadvantages and to provide at least the advantages described below. Accordingly, an aspect of the disclosure is to provide a robot that controls driving of the robot based on information acquired in a virtual environment service, and a controlling method thereof.

Additional aspects will be set forth in part in the description which follows and, in part, will be apparent from the description, or may be learned by practice of the presented embodiments.

In accordance with an aspect of the disclosure, A robot is provided. The robot includes a display, a memory storing identification information of the robot, a communication interface communicating with a server providing a virtual environment service, and at least one processor configured to, based on receiving a user input for interlocking the robot with the virtual environment service, transmit, to the server through the communication interface, the identification information of the robot stored in the memory, and based on receiving, from the server through the communication interface, interaction information related to an avatar corresponding to the identification information of the robot, control an operation of the robot based on the interaction information.

Meanwhile, the at least one processor is further configured to, based on receiving the interaction information through the communication interface, control the display to display a user interface (UI) for performing user authentication, and based on the user authentication being completed based on information received through the UI, control the operation of the robot based on the interaction information.

Meanwhile, the robot further includes a microphone, and the at least one processor is further configured to, based on receiving the interaction information through the communication interface, control the display to display the UI guiding to utter an avatar's identification information based on the interaction information, and based on acquiring a user voice including the identification information of the user avatar through the microphone based on the UI, identify that the authentication of the user was completed.

Meanwhile, the interaction information includes at least one of interaction information related to a user avatar corresponding to the user, interaction information related to a robot avatar corresponding to the robot, or environment information related to the virtual environment service.

Meanwhile, the interaction information related to the user avatar includes at least one of identification information of the user avatar, conversation information related to the user avatar, context information related to the user avatar, or schedule information related to the user avatar, and the interaction information related to the robot avatar includes at least one of identification information of the robot avatar, conversation information related to the robot avatar, context information related to the robot avatar, or schedule information related to the robot avatar, and the environment information related to the virtual environment service includes information related to an event acquired in the virtual environment service.

Meanwhile, the identification information of the user avatar or the identification information of the robot avatar includes at least one of a name, an identification number, or profile information for identifying the avatar, and the conversation information related to the user avatar or the conversation information related to the robot avatar includes at least one of a keyword, a preferred theme, a preferred emotional expression, or a tendency included in the conversation of the avatar, and the context information related to the user avatar or the context information related to the robot avatar includes at least one of a relation, an activity, a visited place, a purchased product, or a preferred product of the avatar.

Meanwhile, the at least one processor is further configured to, based on acquiring a user voice through the microphone, identify whether the user voice is a voice of a user pre-registered in the memory, and based on the user voice being a voice of the pre-registered user, perform a function corresponding to the user voice based on the interaction information.

Meanwhile, the robot further includes a speaker, and the at least one processor is further configured to, based on a word related to a schedule being included in the user voice, control the speaker to output schedule information included in the interaction information.

Meanwhile, the at least one processor is further configured to, based on receiving notification information for a predetermined event from the server through the communication interface, perform a function corresponding to the predetermined event based on the interaction information.

Meanwhile, the at least one processor is further configured to, based on identifying a predetermined event, acquire mapping information in which the interaction information and notification information for the predetermined event are combined, and transmit the mapping information to the server through the communication interface.

In accordance with another aspect of the disclosure, a controlling method of a robot communicating with a server providing a virtual environment service is provided. The controlling method includes, based on receiving a user input for interlocking the robot with the virtual environment service, transmitting identification information of the robot stored in a memory of the robot to the server, and based on receiving interaction information related to an avatar corresponding to the identification information of the robot from the server, controlling an operation of the robot based on the interaction information.

Meanwhile, the controlling method further includes, based on receiving the interaction information, displaying a user interface (UI) for performing user authentication, and in the controlling of the operation of the robot, based on the user authentication being completed based on information received through the UI, the operation of the robot may be controlled based on the interaction information.

Meanwhile, in the displaying of the UI, the controlling method further includes, based on receiving the interaction information, displaying the UI for guiding to utter an avatar's identification information based on the interaction information, and, based on acquiring a user voice including the identification information of the user avatar based on the UI, identifying that the authentication of the user was completed.

Meanwhile, the interaction information includes at least one of interaction information related to a user avatar corresponding to the user, interaction information related to a robot avatar corresponding to the robot, or environment information related to the virtual environment service.

Meanwhile, the interaction information related to the user avatar includes at least one of identification information of the user avatar, conversation information related to the user avatar, context information related to the user avatar, or schedule information related to the user avatar, and the interaction information related to the robot avatar includes at least one of identification information of the robot avatar, conversation information related to the robot avatar, context information related to the robot avatar, or schedule information related to the robot avatar, and the environment information related to the virtual environment service includes information related to an event acquired in the virtual environment service.

Meanwhile, the identification information of the user avatar or the identification information of the robot avatar includes at least one of a name, an identification number, or profile information for identifying the avatar, and the conversation information related to the user avatar or the conversation information related to the robot avatar includes at least one of a keyword, a preferred theme, a preferred emotional expression, or a tendency included in the conversation of the avatar, and the context information related to the user avatar or the context information related to the robot avatar includes at least one of a relation, an activity, a visited place, a purchased product, or a preferred product of the avatar.

Meanwhile, the controlling method further includes, based on acquiring a user voice, identifying whether the user voice is a voice of a user pre-registered in the robot, and the controlling of the operation of the robot includes, based on the user voice being a voice of the pre-registered user, performing a function corresponding to the user voice based on the interaction information.

Meanwhile, in controlling of the operation of the robot, the controlling method further includes, based on a word related to a schedule being included in the user voice, outputting schedule information included in the interaction information through the speaker of the robot.

Meanwhile, in the controlling of the operation of the robot, the controlling method further includes, based on receiving notification information for a predetermined event from the server, performing a function corresponding to the predetermined event based on the interaction information.

Meanwhile, the controlling method further includes, based on identifying a predetermined event, acquiring mapping information in which the interaction information and notification information for the predetermined event are combined, and transmitting the mapping information to the server through the communication interface.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiment of the disclosure will be more apparent from the following description taken in conjunction with the accompanying drawings, in which:

FIG. 8 is a diagram for illustrating avatar information according to an embodiment of the disclosure;

FIG. 11 is a diagram for illustrating a user authentication method according to an embodiment of the disclosure;

FIG. 12 is a diagram for illustrating user authentication using identification information according to an embodiment of the disclosure;

FIG. 13 is a diagram for illustrating user authentication using a gesture according to an embodiment of the disclosure;

FIG. 14 is a diagram for illustrating user authentication using a terminal device according to an embodiment of the disclosure;

FIG. 15 is a diagram for illustrating user authentication using a question according to an embodiment of the disclosure;

FIG. 16 is a diagram for illustrating user authentication using a pre-registered object according to an embodiment of the disclosure;

FIG. 17 is a diagram for illustrating user authentication through biometrics according to an embodiment of the disclosure;

FIG. 20 is a diagram for illustrating a response operation corresponding to a user voice according to an embodiment of the disclosure;

FIG. 23 is a diagram for illustrating an operation of a robot of performing a function corresponding to response information based on a predetermined event acquired at a server according to an embodiment of the disclosure;

FIG. 24 is a diagram for illustrating an operation of a robot of performing a function corresponding to response information based on a predetermined event acquired at a server according to an embodiment of the disclosure;

FIG. 25 is a diagram for illustrating an operation of a robot of performing a function corresponding to response information based on a predetermined event acquired at a server according to an embodiment of the disclosure;

FIG. 26 is a diagram for illustrating an operation of a robot of performing a function corresponding to response information based on a predetermined event acquired at a server according to an embodiment of the disclosure;

FIG. 27 is a diagram for illustrating an operation of a robot of performing a function corresponding to response information based on a predetermined event acquired at a server according to an embodiment of the disclosure;

FIG. 30 is a diagram for illustrating an operation of a server of providing a service corresponding to response information based on a predetermined event generated at a robot according to an embodiment of the disclosure;

FIG. 31 is a diagram for illustrating an operation of a server of providing a service corresponding to response information based on a predetermined event generated at a robot according to an embodiment of the disclosure;

FIG. 32 is a diagram for illustrating an operation of a server of providing a service corresponding to response information based on a predetermined event generated at a robot according to an embodiment of the disclosure;

FIG. 33 is a diagram for illustrating an operation of a server of providing a service corresponding to response information based on a predetermined event generated at a robot according to an embodiment of the disclosure;

FIG. 34 is a diagram for illustrating an operation of a server of providing a service corresponding to response information based on a predetermined event generated at a robot according to an embodiment of the disclosure;

FIG. 35 is a diagram for illustrating an operation of a server of providing a service corresponding to response information based on a predetermined event generated at a robot according to an embodiment of the disclosure;

FIG. 36 is a diagram for illustrating an operation of a server of providing a service corresponding to response information based on a predetermined event generated at a robot according to an embodiment of the disclosure;

FIG. 37 is a diagram for illustrating an operation of a server of providing a service corresponding to response information based on a predetermined event generated at a robot according to an embodiment of the disclosure;

FIG. 38 is a diagram for illustrating an operation of providing different responses according to an embodiment of the disclosure;

Throughout the drawings, it should be noted that like reference numbers are used to depict the same or similar elements, features, and structures.

MODE FOR IMPLEMENTING THE INVENTION

Figure 1:
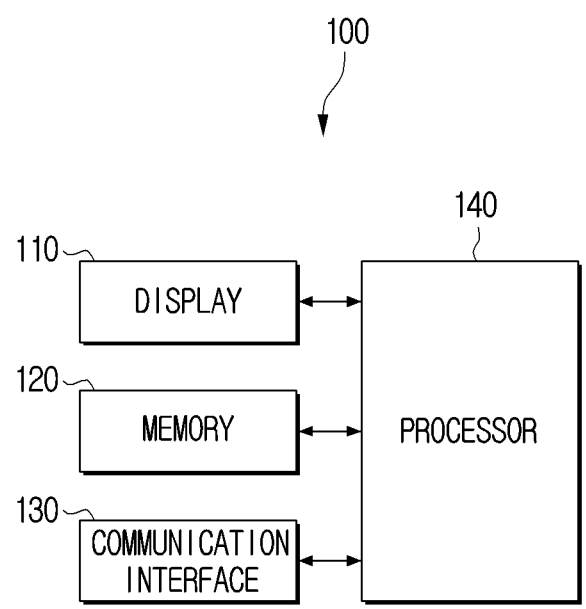
FIG. 1 is a block diagram illustrating a robot according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g., elements such as numbers, functions, operations, and components), and do not exclude the existence of additional characteristics.

In addition, the expression "at least one of A and/or B" should be interpreted to be any one of "A" or "B" or "A and B."

Further, the expressions "first," "second," and the like used in this specification may be used to describe various elements regardless of any order and/or degree of importance. Also, such expressions are used only to distinguish one element from another element, and are not intended to limit the elements.

In addition, the description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element).

Further, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, in the disclosure, "a module" or "a part" performs at least one function or operation, and may be implemented as hardware or software, or as a combination of hardware and software. Also, a plurality of "modules" or a plurality of "parts" may be integrated into at least one module and implemented as at least one processor (not shown), except "a module" or "a part" that needs to be implemented as specific hardware.

Further, in this specification, the term "user" may refer to a person who uses a robot or a device using a robot (e.g., an artificial intelligence robot).

Hereinafter, embodiments of the disclosure will be described in more detail with reference to the accompanying drawings.

FIG. 1 is a block diagram illustrating a robot according to an embodiment of the disclosure.

Referring to FIG. 1, a robot 100 may include at least one of a display 110, a memory 120, a communication interface 130, or at least one processor 140.

Here, the robot 100 may be a mobile service robot.

Here, the display 110 may display an image provided to a user. Also, the display 110 may display UIs in various forms provided to a user.

Here, the memory 120 may store identification information of the robot or voice information of a pre-registered user.

Here, the communication interface 130 may communicate with a server 200. Here, the server 200 may be a server providing a virtual environment service or a metaverse environment service.

The at least one processor 140 may perform overall control operations of the robot 100. Specifically, the at least one processor 140 performs a function of controlling the overall operations of the robot 100.

The memory 120 may store identification information of the robot 100. Here, the identification information of the robot 100 may be a serial number or a model number, etc. Here, the identification information of the robot 100 may be stored in the memory 120 in advance in the factory shipment operation or the initial delivery operation.

The communication interface 130 may communicate with the server 200 providing a virtual environment service. Here, the server 200 may be a server providing a virtual environment service or a metaverse service. According to various embodiments, the server 200 may be a game server.

If a user input for interlocking the robot 100 with a virtual environment service is received, the identification information of the robot 100 stored in the memory 120 may be transmitted to the server 200 through the communication interface 130.

Also, according to various embodiments, if interaction information related to an avatar corresponding to the identification information of the robot 100 is received from the server 200 through the communication interface 130, the at least one processor 140 may control the operation of the robot 100 based on the interaction information.

Further, according to various embodiments, if interaction information related to an avatar corresponding to the identification information of the robot 100 is received from the server 200 through the communication interface 130, the at least one processor 140 may control the display 110 to display a user interface (UI) for performing authentication of a user, and when authentication of the user is completed based on a user input acquired through the UI (or the guide UI), the at least one processor 140 may control the operation of the robot 100 based on the interaction information.

In case a user purchased the robot 100, the user may receive the robot 100 in the factory default state. Here, the robot 100 may provide a service while a default setting is applied. Here, the user to whom the robot 100 was delivered may want to be interlocked with the virtual environment service and apply information related to the user to the robot 100. Accordingly, the user may input a user input (or a user instruction) for interlocking the robot 100 with the virtual environment service into the robot 100.

Here, the user input may be a user instruction for interlocking the virtual environment service and the robot 100. Here, the virtual environment service may be a metaverse service. The virtual environment service may also be a service of providing an environment so that a user uses a specific function through an avatar, etc. in a virtual space.

The user may input a user instruction for interlocking the robot 100 and the virtual environment service into the robot 100. Here, the interlocking operation may be an operation of sharing information stored in the robot 100 and information stored in the virtual environment. The at least one processor 140 may perform communication with the server 200 through the communication interface 130. Specifically, the at least one processor 140 may request information corresponding to the user through the communication interface 130. The at least one processor 140 may transmit the identification information of the robot 100 to the server 200 through the communication interface 130 for specifying the user of the robot 100 among a plurality of users.

According to various embodiments, the robot 100 may transmit the identification information of the robot 100 to the server 200, and acquire interaction information of the user from the server 200. Specifically, the server 200 may have stored in advance information on the user who purchased the robot 100, and the identification information of the robot 100 that the user purchased. The server 200 may store mapping information in which the interaction information of the purchaser and the identification information of the robot 100 are combined in the memory of the server 200. Detailed operations in this regard will be described in FIGS. 9 and 10. Here, the user may not need to separately input the identification information of the user into the robot 100.

According to various embodiments, the robot 100 may transmit the identification information of the user to the server 200, and acquire the interaction information of the user from the server 200. Specifically, the server 200 may have stored in advance the interaction information of the user. The server 200 may identify the interaction information of the user corresponding to the identification information of the user from the robot 100. The server 200 may transmit the identified interaction information of the user to the robot 100. Here, the user needs to directly input the user's identification information into the robot 100.

The robot 100 may receive the interaction information of the user received from the server 200, and store the received interaction information in the memory 120. Then, the robot 100 may control the operation based on the stored interaction information.

The server 200 may store information on a plurality of users. The information stored in the server 200 will be described as interaction information. The interaction information is information acquired at the server 200 providing the virtual environment service, and it may be information related to an avatar existing in the virtual environment service. The interaction information may be various kinds of information acquired through the virtual environment service.

Meanwhile, the interaction information may include at least one of user avatar information corresponding to a user (or interaction information related to a user avatar), robot avatar information corresponding to the robot 100 (or interaction information related to a robot avatar), or environment information related to the virtual environment service at the server 200.

Here, the user avatar may be an avatar representing a user existing in the virtual environment. Also, the user avatar may be an avatar representing a user of the robot 100. The user avatar may vary depending on a user using the virtual environment service.

The robot avatar may be an avatar representing the robot existing in the virtual environment. Also, the robot avatar may be an avatar representing the robot 100. The robot avatar may vary depending on a user using the virtual environment service. Even if a basic appearance or a provided service, etc. are the same for each user, an information collecting information may be performed respectively for each user. Accordingly, a robot avatar corresponding to a first user and a robot avatar corresponding to a second user may be different avatars.

Meanwhile, the user avatar information (or the interaction information related to the user avatar) may include at least one of identification information of the user avatar, conversation information acquired through the user avatar, observation information (or context information) acquired through the user avatar, or schedule information of the user avatar.

Meanwhile, the robot avatar information (or the interaction information related to the robot avatar) may include at least one of identification information of the robot 100 avatar, conversation information acquired through the robot 100 avatar, observation information (or context information) acquired through the robot 100 avatar, or schedule information of the robot 100 avatar.

Meanwhile, the identification information of the user avatar or the identification information of the robot 100 avatar may include at least one of a name, an identification number, or profile information for identifying the avatar. Also, the identification information may be a name, a number, an identification (ID) of a user, a nickname, a unique number, etc. that can specify the avatar.

Meanwhile, the conversation information of the user avatar or the conversation information of the robot 100 avatar may include at least one of a keyword, a preferred theme, a preferred emotional expression, or a tendency included in the avatar's conversation. Also, the conversation information may be data of a conversation performed in a conversation service provided through the avatar. Here, the conversation information may include at least one of text data or audio data.

Meanwhile, the observation information (or the context information) of the user avatar or the observation information (or the context information) of the robot 100 avatar may include at least one of a relation, an activity, a visited place, a purchased product, or a preferred product of the avatar. Also, the observation information (or the context information) may be various kinds of information related to a service provided to the user through the avatar.

Meanwhile, the environment information may include event information acquired at the server 200. Also, the environment information may be various kinds of information that can be acquired by the user in the virtual environment service itself but not the avatar.

Specific examples related to the interaction information will be additionally described in FIG. 8. The interaction information may also be described as metaverse information, information related to a metaverse, avatar information, information related to an avatar, information related to a virtual environment service, information acquired through a virtual environment service, etc.

Meanwhile, if the interaction information is received through the communication interface 130, the at least one processor 140 may control the display 110 to display a UI guiding to utter an avatar's identification information included in the interaction information.

Even if the interaction information is received from the server 200, the at least one processor 140 may perform a user authenticating operation. As the provided interaction information is personal information corresponding to the user, the robot 100 may request authentication of the user before performing an interlocking operation. Detailed explanation related to user authentication will be described in FIGS. 11 to 18.

Here, the at least one processor 140 may perform user authentication based on the interaction information that was already received. In case the user utters information included in the interaction information, the at least one processor 140 may determine that the user succeeded in authentication. Detailed explanation in this regard will be described in FIG. 12.

Meanwhile, the robot 100 may further include a microphone 180, and the identification information of the avatar included in the interaction information is the identification information of the avatar corresponding to the user stored in the server 200, and if a user voice including the identification information of the avatar is acquired through the microphone 180 based on the UI, the at least one processor 140 may identify that the user's authentication was completed.

For example, the robot 100 may output a UI guiding the user to utter the identification information of the user avatar. The user may utter the identification information of the user avatar (S-USER) that the user uses in the virtual environment service. The at least one processor 140 may acquire text information corresponding to the voice uttered by the user (S-USER). The at least one processor 140 may perform user authentication by comparing the acquired text information and the pre-stored identification information of the user avatar. If the acquired text information and the pre-stored identification information of the user avatar coincide, the at least one processor 140 may identify that the user authentication succeeded. Detailed explanation in this regard will be described in the embodiment 1210 in FIG. 12.

Meanwhile, if a user voice is acquired through the microphone 180, the at least one processor 140 may identify whether the user voice is a voice of a user pre-registered in the memory 120, and if the user voice is a voice of the pre-registered user, the at least one processor 140 may perform a function corresponding to the user voice based on the interaction information. An operation of determining whether a voice is a voice of a pre-registered user will be described in detail in FIGS. 6, 19, and 29.

Meanwhile, the robot 100 may further include a speaker 170, and if a word related to a schedule is included in a user voice, the at least one processor 140 may control the speaker 170 to output schedule information included in the interaction information.

The at least one processor 140 may receive a user voice. Then, the at least one processor 140 may acquire text information corresponding to the user voice. Then, the at least one processor 140 may identify a keyword included in the text information corresponding to the user voice. Here, the keyword may indicate a word related to a schedule. If a predetermined word (e.g., shopping) related to a schedule is identified in the text information corresponding to the user voice, the at least one processor 140 may output the schedule information included in the interaction information through the speaker 170.

A detailed operation in this regard will be described in the embodiment 2020 in FIG. 20.

Meanwhile, if notification information for a predetermined event is received from the server 200 through the communication interface 130, the at least one processor 140 may perform a function corresponding to the predetermined event based on the interaction information. Detailed explanation in this regard will be described in FIGS. 21 to 27.

Meanwhile, if a predetermined event is identified, the at least one processor 140 may acquire mapping information in which the interaction information and the notification information for the predetermined event are combined, and transmit the mapping information to the server 200 through the communication interface 130. Detailed explanation in this regard will be described in FIGS. 28 to 37.

The robot 100 and the server 200 according to various embodiments may automatically apply information collected in the virtual environment service to the robot 100. The robot 100 may provide an appropriate response (or reply) to the user through the interaction information although it was not trained through information related to the user for a long period.

As the robot 100 according to the various embodiments provides a service by using interaction information related to a plurality of avatars (a user avatar, a robot avatar) provided in the virtual environment service together, the robot 100 can provide an experience that the real environment and the virtual environment are matched as they are to the user.

Meanwhile, in the above, only simple components constituting the robot 100 were illustrated and described, but in actual implementation, various components may additionally be provided. Explanation in this regard will be described below with reference to FIG. 2.

Figure 2:
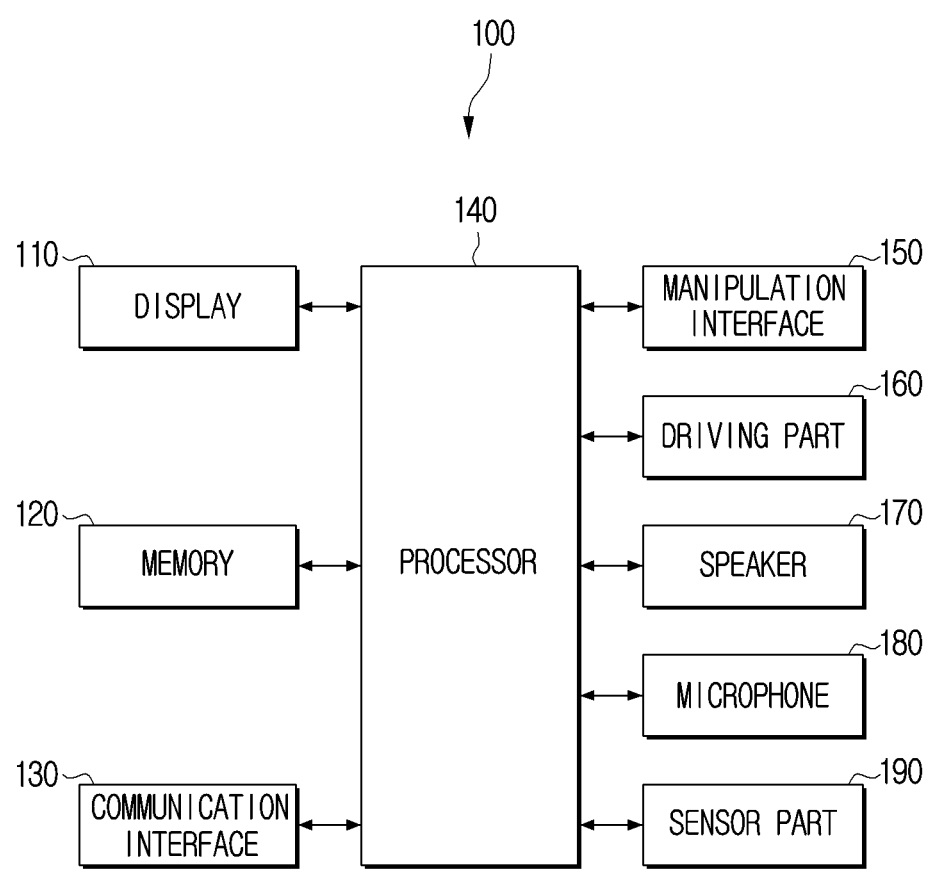
FIG. 2 is a block diagram for illustrating a detailed configuration of the robot in FIG. 1 according to an embodiment of the disclosure.

FIG. 2 is a block diagram for illustrating a detailed configuration of the robot 100 in FIG. 1 according to an embodiment of the disclosure.

Referring to FIG. 2, the robot 100 may include at least one of a display 110, a memory 120, a communication interface 130, at least one processor 140, a manipulation interface 150, a driving part 160, a speaker 170, a microphone 180, or a sensor part 190.

Meanwhile, among the operations of the display 110, the memory 120, the communication interface 130, and the at least one processor 140, regarding operations that are identical to what were described above, overlapping explanation will be omitted.

The display 110 may be implemented as displays in various forms such as a liquid crystal display (LCD), an organic light emitting diodes (OLED) display, a plasma display panel (PDP), etc. Inside the display 110, driving circuits that may be implemented in forms such as an amorphous silicon (a-si) thin film transistor (TFT), a low temperature poly silicon (LTPS) TFT, an organic TFT (OTFT), etc., a backlight unit and the like may also be included together. Meanwhile, the display 110 may be implemented as a touch screen combined with a touch sensor, a flexible display, a three-dimensional (3D) display, etc. Also, the display 110 according to one or more embodiments of the disclosure may include not only a display panel outputting images, but also a bezel housing the display panel. In particular, a bezel according to one or more embodiments of the disclosure may include a touch sensor (not shown) for detecting user interactions.

The memory 120 may be implemented as an internal memory such as a read-only memory (ROM) (e.g., an electrically erasable programmable read-only memory (EEPROM)), a random access memory (RAM), etc. included in the at least one processor 140, or a memory separate from the at least one processor 140. In this case, the memory 120 may be implemented in the form of a memory embedded in the robot 100, or in the form of a memory that can be attached to or detached from the robot 100 according to the usage of stored data. For example, in the case of data for operating the robot 100, the data may be stored in a memory embedded in the robot 100, and in the case of data for an extended function of the robot 100, the data may be stored in a memory that can be attached to or detached from the robot 100.

Meanwhile, in the case of a memory embedded in the robot 100, the memory may be implemented as at least one of a volatile memory (e.g., a dynamic RAM (DRAM), a static RAM (SRAM), or a synchronous dynamic RAM (SDRAM), etc.) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., an NAND flash or an NOR flash, etc.), a hard drive, or a solid state drive (SSD)). Also, in the case of a memory that can be attached to or detached from the robot 100, the memory may be implemented in forms such as a memory card (e.g., a compact flash (CF), a secure digital (SD), a micro secure digital (Micro-SD), a mini secure digital (Mini-SD), extreme digital (xD), a multi-media card (MMC), etc.), an external memory that can be connected to a universal serial bus (USB) port (e.g., a USB memory), etc.

The communication interface 130 is a component that performs communication with external devices in various types according to communication methods in various types. The communication interface 130 may include a wireless communication module or a wired communication module. Here, each communication module may be implemented in a form of at least one hardware chip.

A wireless communication module may be a module communicating with an external device wirelessly. For example, a wireless communication module may include at least one module among a wireless-fidelity (Wi-Fi) module, a Bluetooth™ module, an infrared communication module, or other communication modules.

A Wi-Fi module and a Bluetooth™ module may perform communication by a Wi-Fi method and a Bluetooth™ method, respectively. In the case of using a Wi-Fi module or a Bluetooth™ module, various types of connection information such as a service set identifier (SSID) and a session key, etc. is transmitted and received first, and connection of communication is performed by using the information, and various types of information can be transmitted and received thereafter.

An infrared communication module performs communication according to an infrared Data Association (IrDA) technology of transmitting data to a near field wirelessly by using infrared rays between visible rays and millimeter waves.

Other communication modules may include at least one communication chip that performs communication according to various wireless communication protocols such as Zigbee, 3rd Generation (3G), 3rd Generation Partnership Project (3GPP), Long Term Evolution (LTE), LTE Advanced (LTE-A), 4th Generation (4G), 5th Generation (5G), etc., other than the aforementioned communication methods.

A wired communication module may be a module communicating with an external device via wire. For example, a wired communication module may include at least one of a local area network (LAN) module, an Ethernet module, a pair cable, a coaxial cable, an optical fiber cable, or an ultra wide-band (UWB) module.

The at least one processor 140 may be implemented as a digital signal processor (DSP) processing digital signals, a microprocessor, and a time controller (TCON). However, the disclosure is not limited thereto, and the at least one processor 140 may include one or more of a central processing unit (CPU), a micro controller unit (MCU), a micro processing unit (MPU), a controller, an application processor (AP), a graphics-processing unit (GPU) or a communication processor (CP), and an advanced reduced instruction set computer (RISC) machines (ARM) processor, or may be defined by the terms. Also, the at least one processor 140 may be implemented as a system on chip (SoC) having a processing algorithm stored therein or large scale integration (LSI), or in the form of a field programmable gate array (FPGA). In addition, the at least one processor 140 may perform various functions by executing computer executable instructions stored in the memory.

The manipulation interface 150 may be implemented as a device such as a button, a touch pad, a mouse, and a keyboard, or as a touch screen that can perform both of the aforementioned display function and a manipulation input function. Here, a button may be various types of buttons such as a mechanical button, a touch pad, a wheel, etc. formed in any areas such as the front surface part, the side surface part, the rear surface part, etc. of the exterior of the main body of the robot 100.

The driving part 160 may include a motor for controlling the movement of the robot 100. Here, the motor may generate a physical force.

The speaker 170 may be a component that outputs not only various kinds of audio data, but also various kinds of notification sounds or voice messages, etc.

The microphone 180 is a component for receiving input of a user voice or other sounds and converting them into audio data. The microphone 180 may receive a user's voice in an activated state. For example, the microphone 180 may be formed as an integrated type on the upper side or the front surface direction, the side surface direction, etc. of the robot 100. The microphone 180 may include various components such as a microphone collecting a user voice in an analogue form, an amp circuit amplifying the collected user voice, an analog-to-digital (A/D) conversion circuit that samples the amplified user voice and converts the user voice into a digital signal, a filter circuit that removes noise components from the converted digital signal, etc.

The sensor part 190 may include at least one sensor. Here, the sensor part 190 may include at least one of a distance sensor, a depth camera, an image sensor, or a bio sensor. Here, the bio sensor may be a fingerprint sensor, an iris sensor, etc. Here, the sensor part 190 may include a light detection and ranging (LiDAR) sensor.

Figure 3:
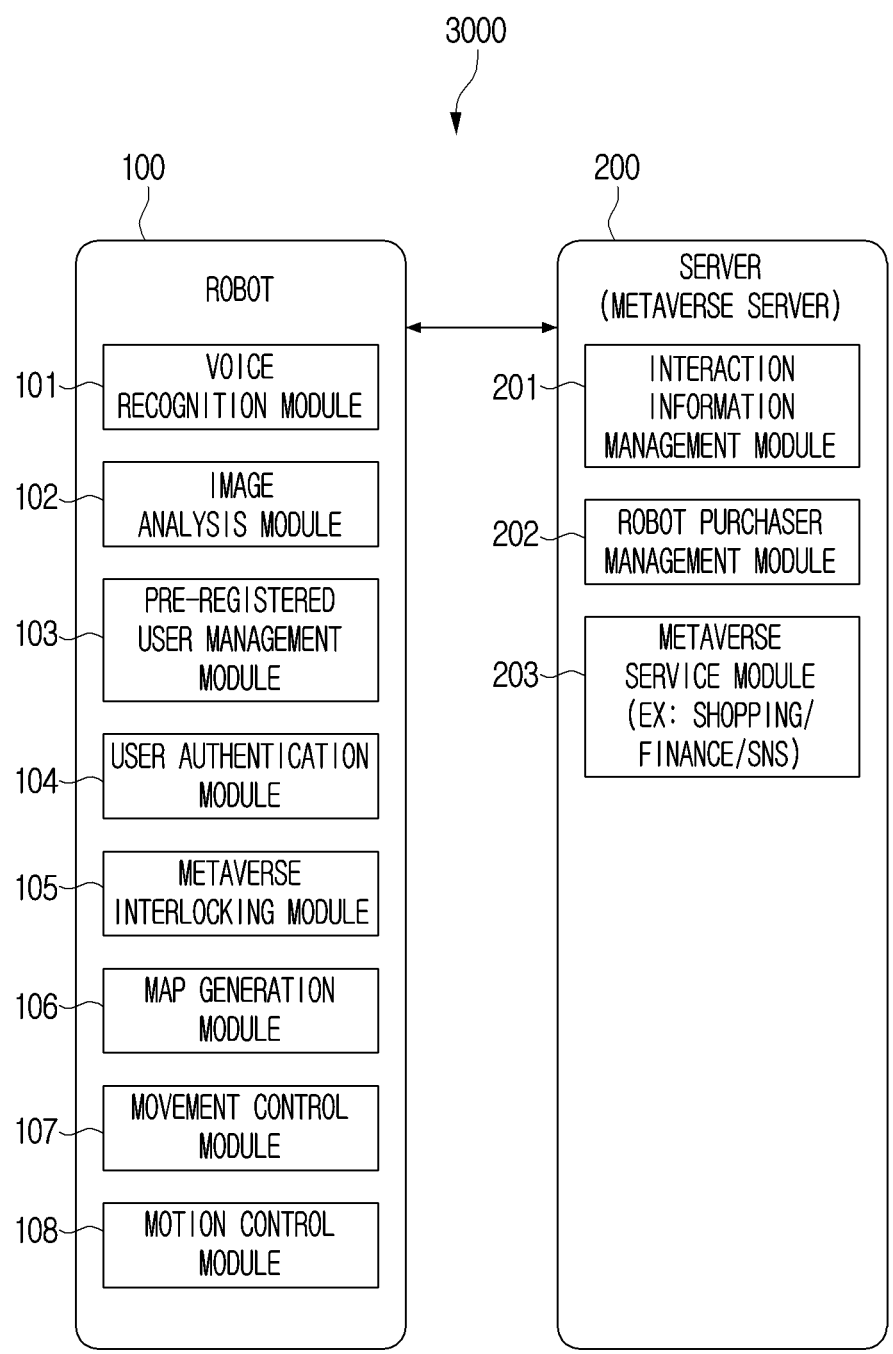
FIG. 3 is a diagram for illustrating a system including a robot and a server according to an embodiment of the disclosure.

FIG. 3 is a diagram for illustrating a system including a robot and a server according to an embodiment of the disclosure.

Referring to FIG. 3, a system 3000 may include the robot 100 and the server 200, and the robot 100 may include at least one of a voice recognition module 101, an image analysis module 102, a pre-registered user management module 103, a user authentication module 104, a metaverse interlocking module 105, a map generation module 106, a movement control module 107, or a motion control module 108.

The voice recognition module 101 may acquire a user voice and convert the user voice into text information. Then, the voice recognition module 101 may provide response information (result information) corresponding to the text information to the user.

The image analysis module 102 may analyze a photographed image or an acquired image, and extract a specific object.

The pre-registered user management module 103 may store information on at least one pre-registered user. Also, the pre-registered user management module 103 may transmit the stored information to another module or another device depending on needs.

The user authentication module 104 may be a module that checks whether a user has an access right or a use right.

The metaverse interlocking module 105 may be a module that receives and stores interaction information stored in the server 200. The metaverse interlocking module 105 may transmit the interaction information to another module so that the interaction information is used in an operation of the robot 100.

The map generation module 106 may generate and store map data related to spaces for setting a moving path of the robot 100.

The movement control module 107 may control the movement of the robot 100 by using the driving part or the motor, etc.

The motion control module 108 may control the robot 100 to take a specific motion according to a predetermined instruction.

Here, the server 200 may include at least one of an interaction information management module 201, a robot purchaser management module 202, or a metaverse service module 203.

The interaction information management module 201 may store and manage interaction information related to avatars provided at the server 200.

The robot purchaser management module 202 may store and manage information related to the purchase of purchasing a robot.

The metaverse service module 203 may provide various services related to avatars to a user who accesses the server 200.

Meanwhile, the robot 100 and the server 200 may be communicatively connected with each other. Accordingly, the robot 100 and the server 200 may transmit and receive information with each other through the communication interface of the robot 100 and the communication interface of the server 200.

Figure 4:
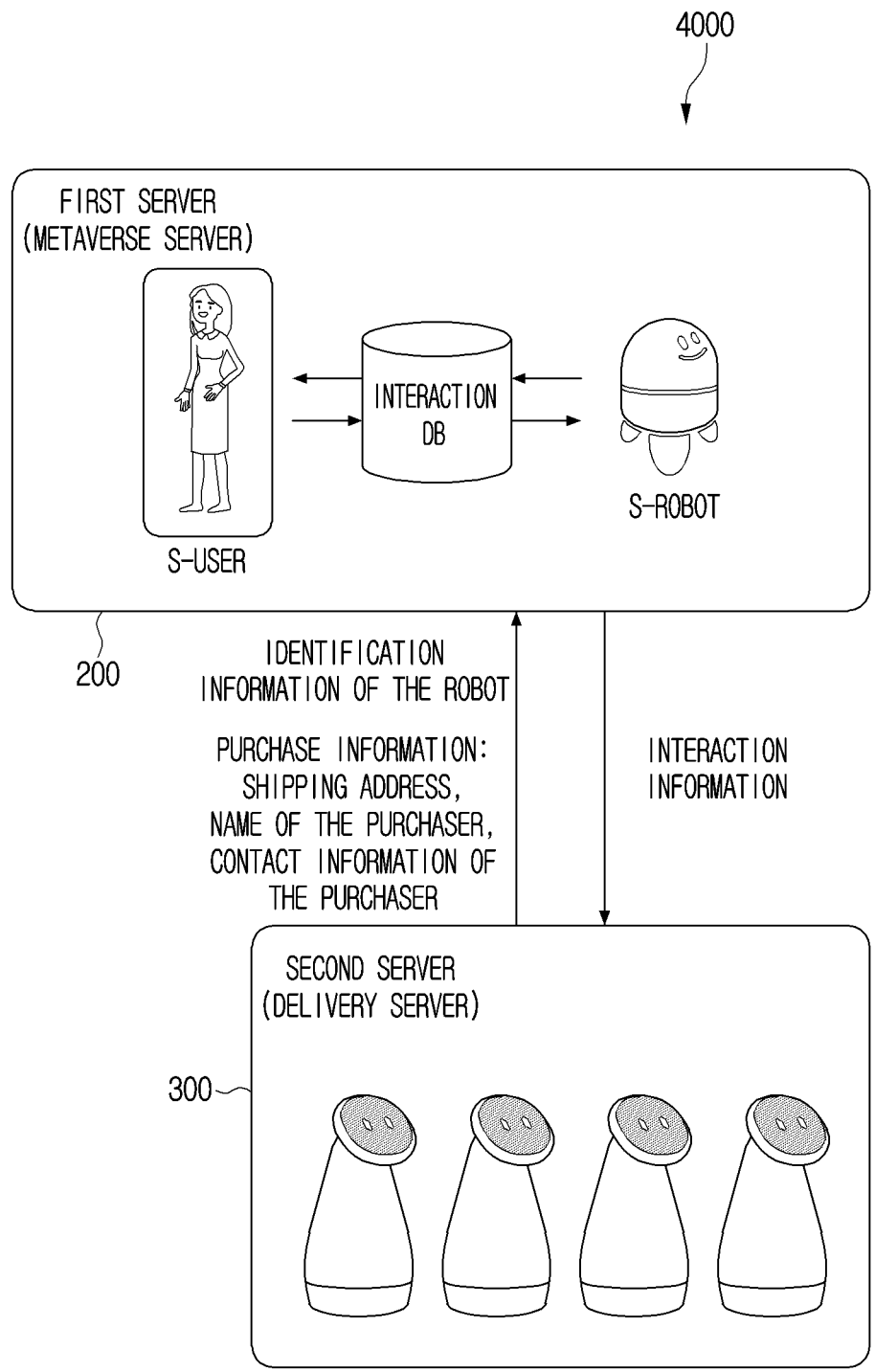
FIG. 4 is a diagram for illustrating a system including a first server and a second server according to an embodiment of the disclosure.

FIG. 4 is a diagram for illustrating a system including a first server and a second server according to an embodiment of the disclosure.

Referring to FIG. 4, a system 4000 may include a first server 200 and a second server 300. Here, the first server 200 may be a server providing various services related to avatars. The second server 300 may be a server for purchasing a robot.

The first server 200 may provide a service of displaying a user avatar (S-USER) and a robot avatar (S-ROBOT). Also, the first server 200 may acquire interaction information by each of the user avatar (S-USER) or the robot avatar (S-ROBOT). The first server 200 may store the interaction information in an interaction DB.

The second server 300 may be a server that purchases a robot or a server that delivers a robot. The second server 300 may determine identification information of a robot delivered to a purchaser. Then, the second server 300 may acquire identification information and purchase information of the robot delivered to the purchaser, and store the acquired purchase information.

The second server 300 may transmit the identification information and the purchase information of the robot to the first server 200. Here, the purchase information may include the shipping address, the name of the purchaser, the contact information of the purchaser, etc. The first server 200 may receive the identification information and the purchase information of the robot from the second server 300.

Meanwhile, the first server 200 may transmit interaction information to the second server 300. Here, the interaction information may be information related to avatars provided at the first server 200. The second server 300 may receive the interaction information from the first server 200.

The first server 200 and the second server 300 may be connected with each other, and transmit and receive some information.

According to various embodiments, when purchase information is acquired at the second server 300, the second server 300 may acquire identification information of the robot to be delivered to the purchaser, and transmit the identification information and the purchase information of the robot to the first server 200. The first server 200 may specify the user based on the purchase information. Then, the first server 200 may map the interaction information corresponding to the specified user and the identification information of the user. Then, when an interlocking instruction is received from the robot 100 later, the first server 200 may transmit the interaction information corresponding to the specified user mapped with the identification information of the robot to the robot 100.

Also, according to various embodiments, the first server 200 may receive an instruction requesting interaction information from the second server 300. Specifically, the first server 200 may receive purchase information from the second server 300. The first server 200 may specify the user based on the purchase information. Then, the first server 200 may identify interaction information corresponding to the specified user. The first server 200 may transmit the identified interaction information to the second server 300. The second server 300 may receive the interaction information from the first server 200. The second server 300 may store the received interaction information in the robot 100 to be delivered. As the interaction information is already stored in the robot 100, the user may not need to perform a separate interlocking operation.

Figure 5:
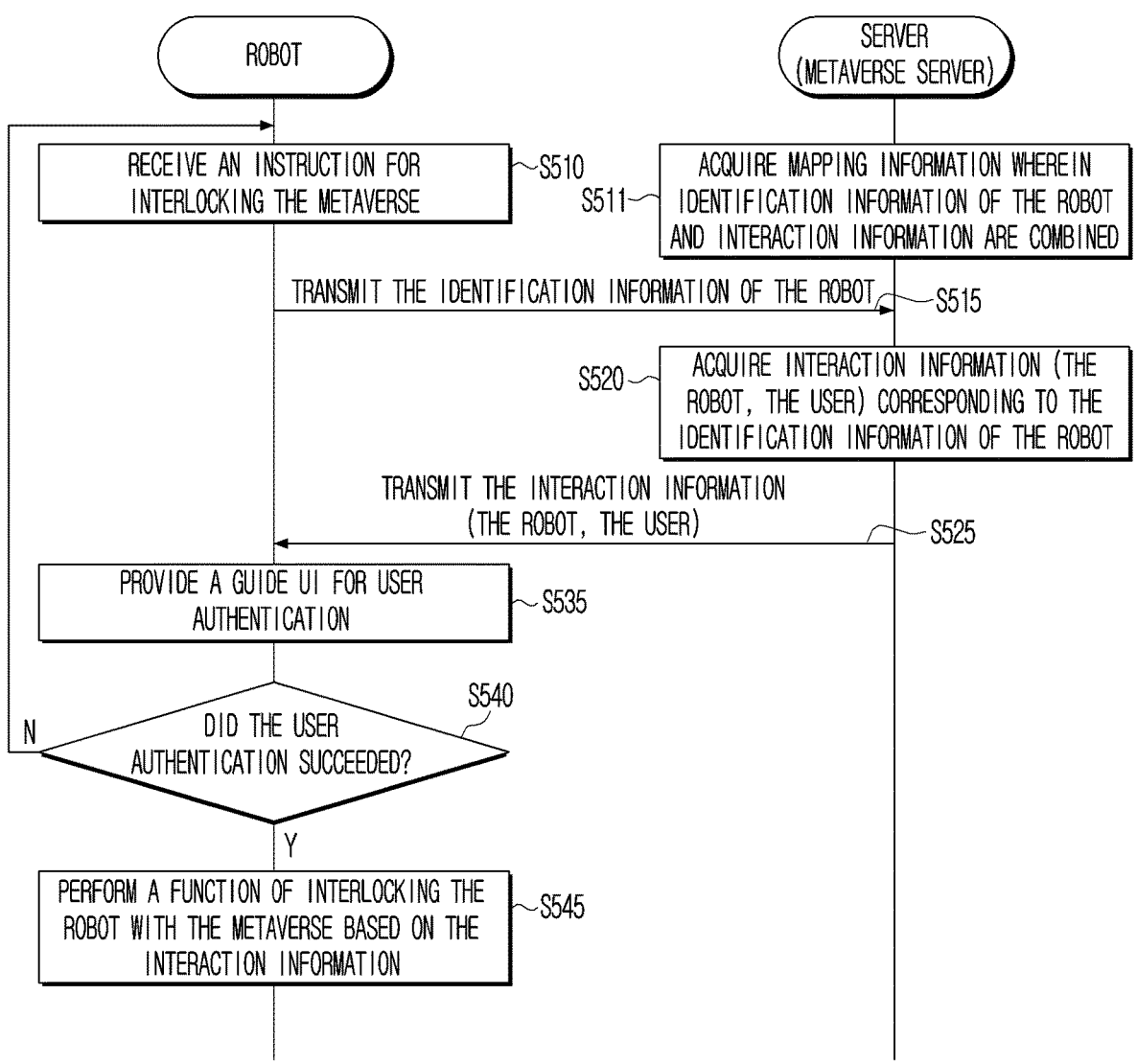
FIG. 5 is a flowchart for illustrating an operation of performing an interlocking function of a robot and a server according to an embodiment of the disclosure.

FIG. 5 is a flowchart for illustrating an operation of performing an interlocking function of a robot and a server according to an embodiment of the disclosure.

Referring to FIG. 5, the robot 100 may receive an instruction for interlocking a metaverse, in operation S510. Then, the robot 100 may transmit identification information of the robot to the server 200, in operation S515.

The server 200 may acquire mapping information in which the identification information of the robot and interaction information are combined, in operation S511. The server 200 may receive the identification information of the robot from the robot 100. Then, the server 200 may acquire interaction information corresponding to the identification information of the robot, in operation S520. The server 200 may transmit the interaction information to the robot 100, in operation S525.

The robot 100 may receive the interaction information from the server 200. The robot 100 may provide a guide UI for user authentication, in operation S535. The robot 100 may determine whether user authentication succeeded, in operation S540. If the user authentication does not succeed in operation S540-N, the robot 100 may repeat the operations S510, S515, S535, and S540.

If the user authentication succeeds in operation S540-Y, the robot 100 may perform a function of interlocking the robot to the metaverse based on the interaction information, in operation S545.

Figure 6:
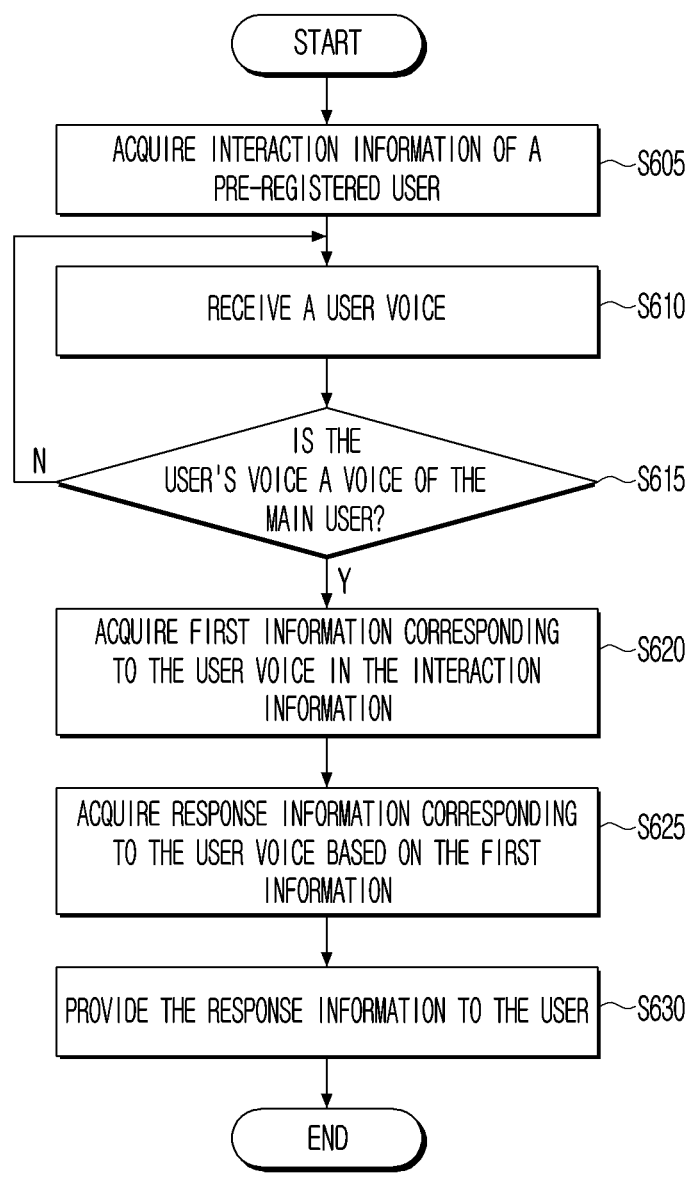
FIG. 6 is a flowchart for illustrating an operation of providing information corresponding to a user voice by using avatar information according to an embodiment of the disclosure.

FIG. 6 is a flowchart for illustrating an operation of providing information corresponding to a user voice by using interaction information according to an embodiment of the disclosure.

Referring to FIG. 6, the robot 100 may acquire interaction information of a main user, in operation S605. The robot 100 may receive a user voice, in operation S610. Then, the robot 100 may determine whether the user voice is the voice of the main user, in operation S615. If the user voice is not the voice of the main user in operation S615-N, the robot 100 may repeat the operations S610 and S615.

If the user voice is the voice of the main user in operation S615-Y, the robot 100 may acquire first information corresponding to the user voice in the interaction information, in operation S620. The robot 100 may acquire response information corresponding to the user voice based on the first information, in operation S625. Then, the robot 100 may provide the response information to the user, in operation S630.

Referring to FIG. 6, the main user may be a user who can be recognized by using a predetermined method. Also, the main user may be a user who mainly uses the robot 100. The robot 100 may specify (or recognize) the main user among a plurality of users according to a predetermined method. Here, the robot 100 may recognize the main user, and provide appropriate response information corresponding to the user voice to the main user. Also, the main user may be a pre-registered user. The robot 100 may register a user in advance according to a predetermined method. Then, the robot 100 may determine whether a user is a pre-registered user according to a predetermined method.

Figure 7:
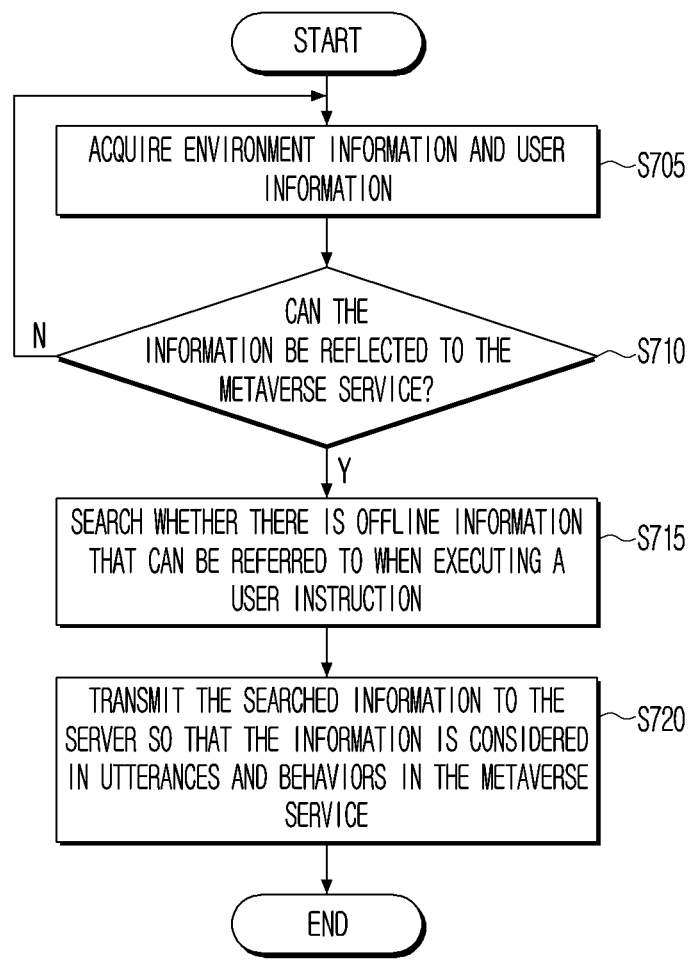
FIG. 7 is a flowchart for illustrating an operation of providing a service at a server based on information sensed at a robot according to an embodiment of the disclosure.

FIG. 7 is a flowchart for illustrating an operation of providing a service at a server based on information sensed at a robot according to an embodiment of the disclosure.

Referring to FIG. 7, the robot 100 may acquire environment information and user information. Here, the environment information and the user information may be information directly sensed by the robot 100, or information stored in the robot 100.

The robot 100 may determine whether the information acquired, in operation S705, is information that can be applied to a metaverse, in operation S710. If the acquired information is not information that can be applied to a metaverse in operation S710-N, the robot 100 may repeat the operations S705 and S710.

If the acquired information is information that can be applied to a metaverse in operation S710-Y, the robot 100 may search whether there is offline information that can be referred to when executing a user instruction, in operation S715. Then, the robot 100 may transmit the searched information to the server 200 so that the information is considered in utterances and behaviors in the metaverse service, in operation S720.

FIG. 8 is a diagram for illustrating interaction information according to an embodiment of the disclosure.

Referring to FIG. 8, interaction information 810 may include at least one of primary information (basic information), secondary information (conversation information), third information (observation information), or fourth information (environment information).

The primary information (basic information) may include at least one of account identification (ID) information or profile information.

The secondary information (conversation information) may include at least one of a keyword, a preferred theme, a preferred emotional expression, or a tendency.

The third information (observation information) may include at least one of a relation, an activity, a visited place, consumption, a purchased product, a preferred product, a preferred theme, or preference.

The fourth information (environment information) may include at least one of information collected in a metaverse environment, an event, or a notification. The fourth information (environment information) may be collected in a state wherein the user is offline (logged out) other than a state wherein the user is online (logged in) to the metaverse server.

Figure 9:
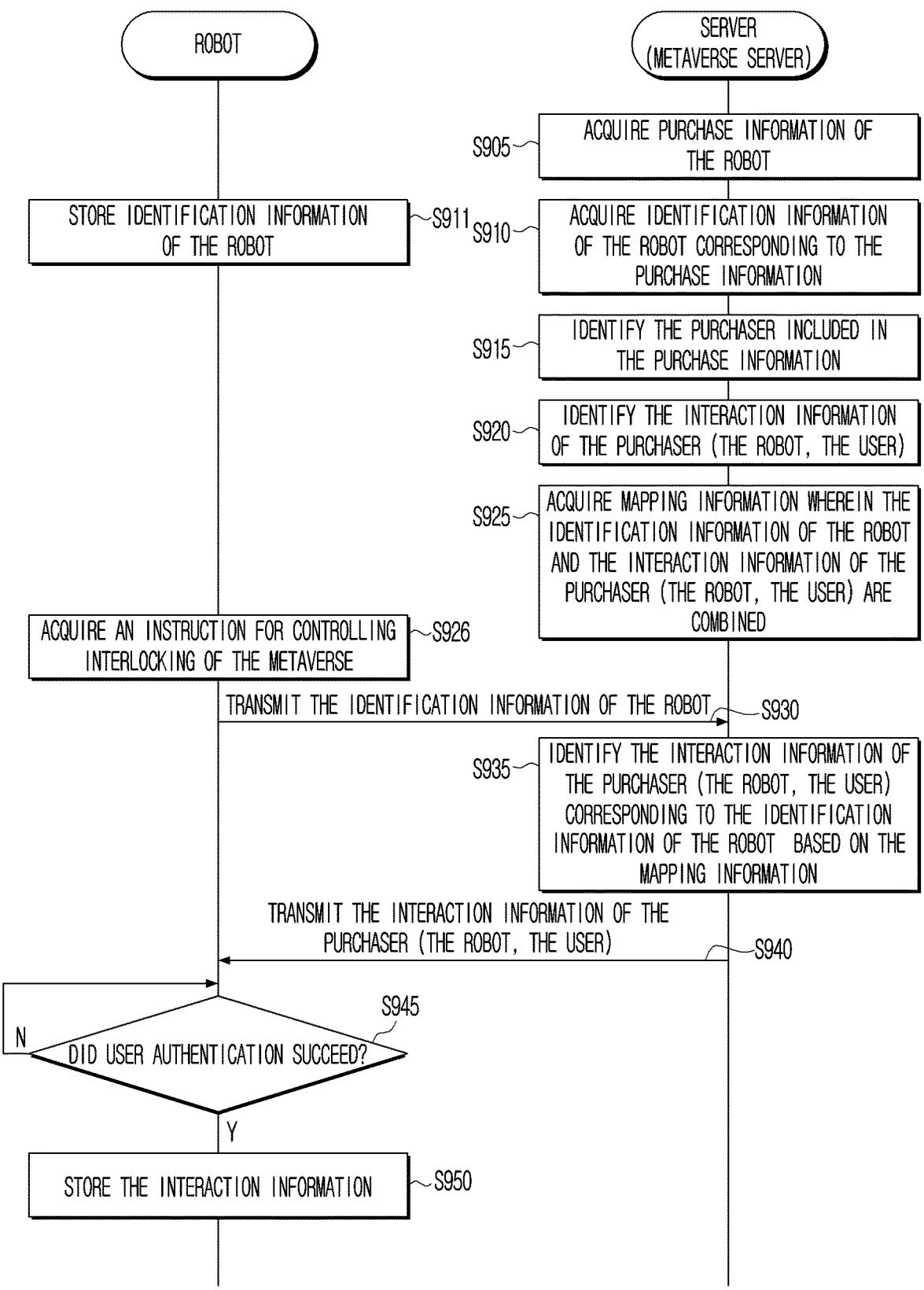
FIG. 9 is a flowchart for illustrating an operation for a robot to be interlocked with a metaverse according to an embodiment of the disclosure.

FIG. 9 is a flowchart for illustrating an operation for a robot to be interlocked with a metaverse according to an embodiment of the disclosure.

Referring to FIG. 9, the robot 100 may be a robot, and the server 200 may be a server managing robot purchase information and providing a metaverse service.

The robot 100 and the server 200 may perform an interactive interlocking operation. The server 200 may acquire purchase information of the robot, in operation S905.

According to various embodiments, purchase information of the robot may be acquired in the server 200 itself. The server 200 may acquire identification information of the robot corresponding to the purchase information, in operation S910. Here, identification information of the robot may be the unique serial number of the robot.

Also, according to various embodiments, purchase information may be acquired through a server related to purchase (the second server). Explanation in this regard will be described in FIG. 10.

Meanwhile, in the manufacturing process of the robot 100, identification information of the robot may be stored in the internal memory, in operation S911. The identification information of the robot may be a serial number indicating that the robot is a specific device among a plurality of devices.

The server 200 may acquire identification information corresponding to the purchase information, and then the server 200 may identify a purchaser included in the purchase information, in operation S915. Then, the server 200 may identify interaction information of the purchaser, in operation S920. Here, the interaction information may include at least one of robot avatar information or user avatar information. Also, the interaction information may be various kinds of information acquired at the server 200. Here, the server 200 may be an environment related to a metaverse or a virtual space.

The server 200 may acquire mapping information in which the identification information of the robot and the interaction information of the purchaser are combined, in operation S925. Then, the server 200 may store the mapping information in the internal memory.

The robot 100 may acquire a control instruction for interlocking with a metaverse, in operation S926. According to various embodiments, the control instruction may be input as the user directly manipulates the robot 100. Here, the control instruction may also be described as a user instruction. According to various embodiments, the control instruction may be input automatically at a time point when initial power is connected to the robot 100 and the robot 100 is booted.

Here, the robot 100 may transmit the identification information of the robot to the server 200, in operation S930.

The server 200 may receive the identification information of the robot from the robot 100. Then, the server 200 may identify interaction information of a purchaser corresponding to the identification information of the robot based on the mapping information, in operation S935. Then, the server 200 may transmit the interaction information of the purchaser to the robot 100, in operation S940.

The robot 100 may receive the interaction information of the purchaser from the server 200. Then, the robot 100 may perform user authentication, and identify whether the user authentication was successful, in operation S945. Explanation regarding the user authenticating operation will be described in FIGS. 11 to 18.

If it is identified that the user authentication did not succeed in operation S945-N, the robot 100 may repeatedly request user authentication to the user.

If it is identified that the user authentication was successful in operation S945-Y, the robot 100 may store the interaction information received from the server 200, in operation S950. Then, the robot 100 may perform a specific function with the information stored in the robot 100 based on the interaction information.

Meanwhile, according to various embodiments, purchase information of a robot may be acquired at a separate server but not the server 200.

Figure 10:
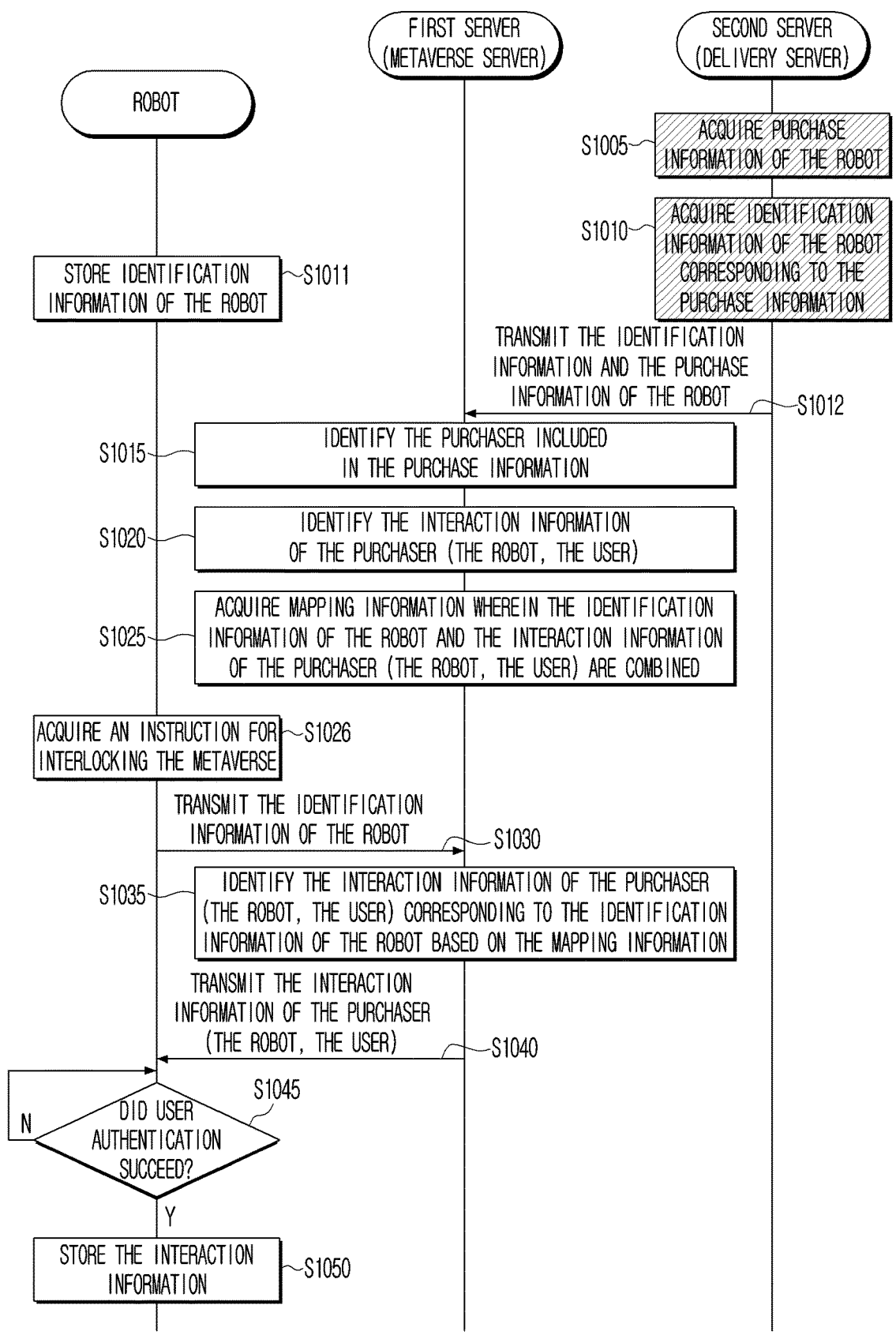
FIG. 10 is a flowchart for illustrating an operation for a robot to be interlocked with a metaverse according to an embodiment of the disclosure.

FIG. 10 is a flowchart for illustrating an operation for a robot to be interlocked with a metaverse according to an embodiment of the disclosure.

The operations S1011, S1015, S1020, S1025, S1026, S1030, S1035, S1040, S1045, and S1050 in FIG. 10 may correspond to the operations S911, S915, S920, S925, S926, S930, S935, S940, S945, and S950, respectively, in FIG. 9. Accordingly, overlapping explanation will be omitted.

The first server 200 in FIG. 10 may be the server 200 in FIG. 9. The system may include the robot 100, the first server 200, and the second server 300.

The robot 100 may be a robot, and the first server 200 may provide a service related to a metaverse, and the second server 300 may manage robot purchase information.

Referring to FIG. 10, the second server 300 may acquire purchase information of a robot, in operation S1005. For example, a user who wishes to purchase a robot may directly purchase a robot through the second server 300. If the user purchases a robot, the second server 300 may acquire information related to the purchaser (the user). Then, the second server 300 may acquire identification information of the robot corresponding to the purchase information, in operation S1010. Identification information of a robot allotted to each of a plurality of robots may exist. Also, there may be various methods of determining which robot is to be delivered to a purchaser.

According to various embodiments, the person in charge of robot delivery may allot a specific robot based on the purchase information, and input the identification information of the specific robot to be delivered into the second server 300.

Also, according to various embodiments, the second server 300 may store a plurality of robots and identification information of the robots corresponding to each of the plurality of robots. Then, when a purchase request is received, the second server 300 may automatically allot a robot corresponding to the purchaser. Then, the second server 300 may acquire identification information of the robot corresponding to the purchase information.

The second server 300 may transmit the identification information and the purchase information of the robot to the first server 200, in operation S1012. Here, the identification information and the purchase information of the robot may be transmitted as combined mapping information. The second server 300 may generate one mapping information by combining the identification information and the purchase information of the robot. Then, the first server 200 may transmit the combined mapping information to the first server 200.

The first server 200 may receive the identification information and the purchase information of the robot from the second server 300. Then, the robot 100 and the first server 200 may perform the operations S1015, S1020, S1025, S1026, S1030, S1035, S1040, S1045, and S1050.

FIG. 11 is a diagram for illustrating a user authentication method according to an embodiment of the disclosure.

Embodiment 1110 in FIG. 11 may indicate a guide UI provided to a user. The robot 100 may provide a guide UI guiding a user to perform an authenticating operation. For example, the robot 100 may display the guide UI on the display 110. The user authenticating operation may include at least one of a method of inputting an authentication keyword, a method of making a gesture recognized, a method of interlocking with a mobile phone, a method of answering a question, a method of making an object for authentication recognized, or a method of performing bio authentication.

Here, the method of inputting an authentication keyword may be a method that a user directly inputs information related to interaction information. Detailed explanation in this regard will be described in FIG. 12.

The method of making a gesture recognized may be a method that the robot 100 recognizes a specific gesture (or pose) taken by a user through the camera. Detailed explanation in this regard will be described in FIG. 13.

The method of interlocking with a mobile phone may be a method that a user performs his or her own authentication by using a mobile phone. Detailed explanation in this regard will be described in FIG. 14.

The method of answering a question may be a method that a user utters a predetermined response corresponding to a predetermined question. Detailed explanation in this regard will be described in FIG. 15.

The method of making an object for authentication recognized may be a method that the robot 100 recognizes a predetermined object through the camera. Detailed explanation in this regard will be described in FIG. 16.

The method of performing bio authentication may be a method of performing authentication by using body information of a user. Detailed explanation in this regard will be described in FIG. 17.

Embodiment 1120 in FIG. 11 may indicate a guide UI that the robot 100 provides to a user for performing additional authentication. It is assumed that a user succeeded in an authentication method using an authentication keyword. The robot 100 may provide a UI indicating success to an icon 1121 corresponding to the authentication keyword. For example, the robot 100 may change the color of the icon 1121. Also, the robot 100 may display text information 1122 indicating success of authentication in a location corresponding to the icon 1121. The user can easily figure out the authentication method that was already performed through the change of the color of the icon 1121 or the text information 1122.

Meanwhile, in case interaction information received from the server 200 is identified as a level higher than or equal to a predetermined security level, the robot 100 may request additional authentication to the user.

FIG. 12 is a diagram for illustrating user authentication using identification information according to an embodiment of the disclosure.

Embodiment 1210 in FIG. 12 indicates that a user performs authentication by uttering identification information of the user avatar. The interaction information may include the identification information of the user avatar used at the server 200. The robot 100 may provide a UI for guiding the user to utter the identification information of the user avatar used at the server 200 to the user.

For example, the robot 100 may output information including a content which is "Please let me know the name of your avatar in the metaverse environment." The user may utter "S-USER" in response to this. The robot 100 may acquire text information corresponding to the user voice. Then, the robot 100 may compare the text information corresponding to the user voice and the identification information of the user avatar included in the interaction information received from the server 200. If the text information corresponding to the user voice and the identification information of the user avatar included in the interaction information coincide, the robot 100 may identify that the user's authenticating operation succeeded.

Embodiment 1220 in FIG. 12 indicates that a user performs authentication by uttering identification information of the robot avatar. The interaction information may include the identification information of the robot avatar used at the server 200. The robot 100 may provide a UI for guiding the user to utter the identification information of the robot avatar used at the server 200 to the user.

For example, the robot 100 may output information including a content which is "Please let me know the name of the robot avatar in the metaverse environment." The user may utter "S-ROBOT" in response to this. The robot 100 may acquire text information corresponding to the user voice. Then, the robot 100 may compare the text information corresponding to the user voice and the identification information of the robot avatar included in the interaction information received from the server 200. If the text information corresponding to the user voice and the identification information of the robot avatar included in the interaction information coincide, the robot 100 may identify that the user's authenticating operation succeeded.

FIG. 13 is a diagram for illustrating user authentication using a gesture according to an embodiment of the disclosure.

Embodiment 1310 in FIG. 13 may indicate an operation of the robot 100 of recognizing a user's gesture. The robot 100 may store a predetermined gesture. Also, the robot 100 may provide a guide UI for authentication to the user. Further, the user may take a specific gesture or a specific pose. Then, the robot 100 may acquire an image including the user through the sensor part 190. Then, the robot 100 may identify whether the user's gesture acquired through the image and the predetermined gesture coincide. If the user's gesture acquired through the image and the predetermined gesture coincide, the robot 100 may identify that the user's authenticating operation succeeded.

For example, the robot 100 may output information including a content which is "Please show me the predetermined gesture." The user may take a gesture of indicating 'V' with his or her finger in response to this. The robot 100 may acquire an image by photographing the user with the camera. The robot 100 may analyze the image, and identify that the user took a 'V' gesture. Then, if the 'V' gesture is the predetermined gesture, the robot 100 may identify that the user's authenticating operation succeeded.

Embodiment 1320 in FIG. 13 indicates an operation of providing a candidate gesture to a user. The user may not remember the predetermined gesture. Accordingly, the robot 100 may provide an image 1321 including the predetermined gesture and a candidate gesture (or a dummy gesture) to the user. The user can easily determine what kind of gesture he or she will take through the image 1321.

For example, the robot 100 may output information including a content which is "Please show me the gesture for authentication from the following" and "an image including rock-paper-scissors." Then, the user may take a specific gesture through the output information and the output image.

FIG. 14 is a diagram for illustrating user authentication using a terminal device according to an embodiment of the disclosure.

Embodiment 1410 in FIG. 14 indicates that a terminal device 400 and the robot 100 communicate by using a near field communication method. The robot 100 may transmit a request signal related to authentication to the terminal device 400. The terminal device 400 may receive the request signal related to authentication. The terminal device 400 may transmit response information corresponding to the request signal to the robot 100. The robot 100 may receive the response information from the terminal device 400. If the response information is identical to the predetermined authentication information, the robot 100 may identify that the authenticating operation through the terminal device 400 succeeded.

For example, the robot 100 may output information including a content which is "Please tag the mobile phone." The user may tag the terminal device 400 to the robot 100. The robot 100 may perform an authenticating operation by using near field communication (NFC).

Embodiment 1420 in FIG. 14 indicates that a user directly performs an authenticating operation at the terminal device 400. The robot 100 may request a separate management server (not shown) to perform an authenticating operation. The management server (not shown) may provide notification information requesting authentication to the terminal device 400 based on the request received from the robot 100. The terminal device 400 may input a user input based on the notification information received through the management server (not shown), and transmit the user input to the management server (not shown). The management server (not shown) may identify whether the user input received from the terminal device 400 coincides with predetermined information. If the user input received from the terminal device 400 coincides with the predetermined information, the management server (not shown) may identify that authentication succeeded, and transmit result information indicating success of authentication to the robot 100. Then, the robot 100 may determine whether authentication succeeded based on the result information received from the management server (not shown).

For example, the robot 100 may output information including a content which is "Please perform an authenticating operation at the mobile phone." The user may directly input information related to authentication through the terminal device 400.

According to various embodiments, the robot 100 may receive information related to authentication from the user by directly communicating with the terminal device 400 not through the management server (not shown).

FIG. 15 is a diagram for illustrating user authentication using a question according to an embodiment of the disclosure.

Embodiment 1510 in FIG. 15 indicates that a question is provided based on interaction information acquired at the server 200. The interaction information may include the name of a service that a user used in a virtual environment service through the server 200. The robot 100 may acquire the name of the service that the user used based on the interaction information. The robot 100 may provide a guide UI guiding the user to utter the name of the service to the user.

For example, the robot 100 may output information including a content which is "Please tell me the name of the game that you played in the metaverse yesterday." The user may utter "a card game." If the text information ("a card game") corresponding to the user voice and the interaction information coincide, the robot 100 may identify that the user authenticating operation succeeded.

Embodiment 1520 in FIG. 15 indicates that a question is provided based on interaction information acquired at the server 200. The interaction information may include the name of an item that a user purchased in a virtual environment service that the user used through the server 200. The robot 100 may acquire the name of the item that the user purchased based on the interaction information. The robot 100 may provide a guide UI guiding the user to utter the name of the item to the user.

For example, the robot 100 may output information including a content which is "What was the item that you purchased in the metaverse yesterday?" The user may utter "avatar clothes." If the text information ("avatar clothes") corresponding to the user voice and the interaction information coincide, the robot 100 may identify that the user authenticating operation succeeded.

FIG. 16 is a diagram for illustrating user authentication using a pre-registered object according to an embodiment of the disclosure.

Embodiment 1610 in FIG. 16 indicates that the robot 100 recognizes a pre-registered object. The robot 100 may store the pre-registered object. The robot 100 may provide a guide UI guiding to make the pre-registered object recognized to the user. Then, the robot 100 may identify whether the pre-registered object is recognized through a photographed image. If the pre-registered object is included in the photographed image, the robot 100 may identify that the user authenticating operation succeeded.

For example, the robot 100 may output information including a content which is "Please show me the pre-registered object." The user may locate a rabbit doll near the robot 100. The robot 100 may acquire an object indicating a rabbit doll in a photographed image. If the rabbit doll object and the pre-registered object coincide, the robot 100 may identify that the user authenticating operation succeeded.

Embodiment 1620 in FIG. 16 indicates that the pre-registered object is a dedicated card provided in a virtual environment service.

For example, the robot 100 may output information including a content which is "Please show me the card issued in the metaverse." The user may locate the dedicated card near the robot 100. The robot 100 may acquire an object indicating the dedicated card in a photographed image. If the dedicated card and the pre-registered object coincide, the robot 100 may identify that the user authenticating operation succeeded.

FIG. 17 is a diagram for illustrating user authentication through biometrics according to an embodiment of the disclosure.

Embodiment 1710 in FIG. 17 indicates that authentication is performed by recognizing a fingerprint. The robot 100 may provide a guide UI for inputting bio information to the user. When bio information is input from the user, the robot 100 may compare the input bio information and pre-stored bio information. If the input bio information and the pre-stored bio information are identical, the robot 100 may identify that the user authenticating operation succeeded.

For example, the robot 100 may output information including a content which is "Please make your fingerprint recognized." The user may make the fingerprint recognized through the sensor part 190 of the robot 100. The robot 100 may acquire information related to the user's fingerprint input through the sensor part 190. If the user's fingerprint input through the sensor part 190 and the pre-registered fingerprint coincide, the robot 100 may identify that the user authenticating operation succeeded.

Embodiment 1720 in FIG. 17 indicates than authentication is performed by recognizing an iris.

For example, the robot 100 may output information including a content which is "Please make your iris recognized." The user may make the iris recognized through the sensor part 190 of the robot 100. The robot 100 may acquire information (an image) related to the user's iris input through the sensor part 190. If the user's iris input through the sensor part 190 and the pre-registered iris coincide, the robot 100 may identify that the user authenticating operation succeeded.

Figure 18:
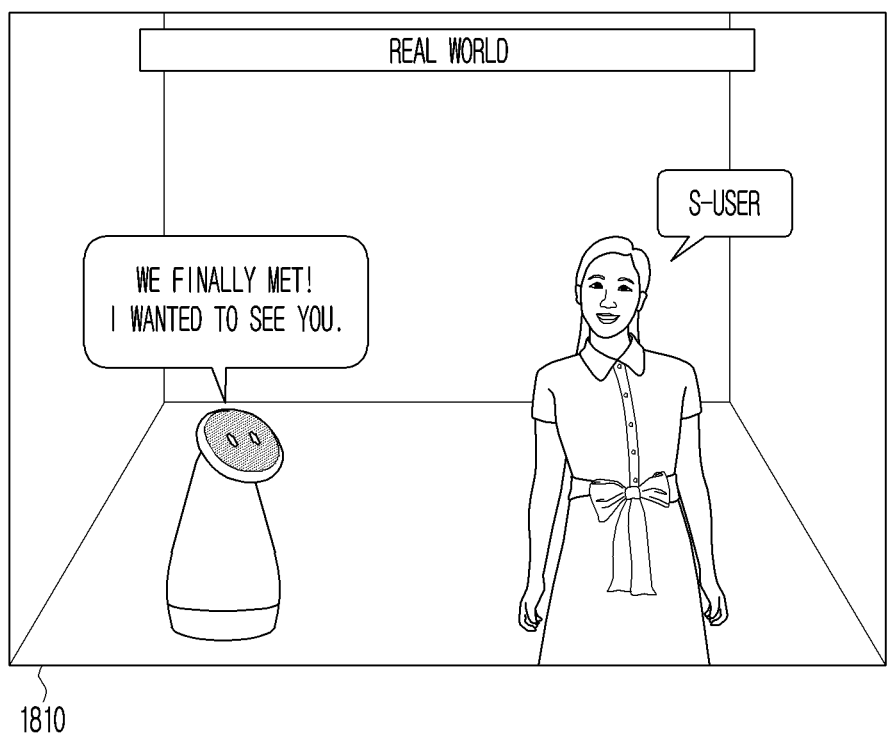
FIG. 18 is a diagram for illustrating a response of a robot after a user authenticating operation according to an embodiment of the disclosure.

FIG. 18 is a diagram for illustrating a response of a robot after a user authenticating operation according to an embodiment of the disclosure.

Embodiment 1810 in FIG. 18 may indicate a function of the robot 100 that is provided as user authentication succeeds. If user authentication succeeds, the robot 100 may output specific information to the user.

For example, it is assumed that the user uttered identification information of the user avatar (S-USER) according to the embodiment 1210 in FIG. 12. If the text information (S-USER) corresponding to the user voice is included in the pre-stored interaction information, the robot 100 may identify that the user authenticating operation succeeded. Then, the robot 100 may output information of a content which is "We finally met! I wanted to see you."

Figure 19:
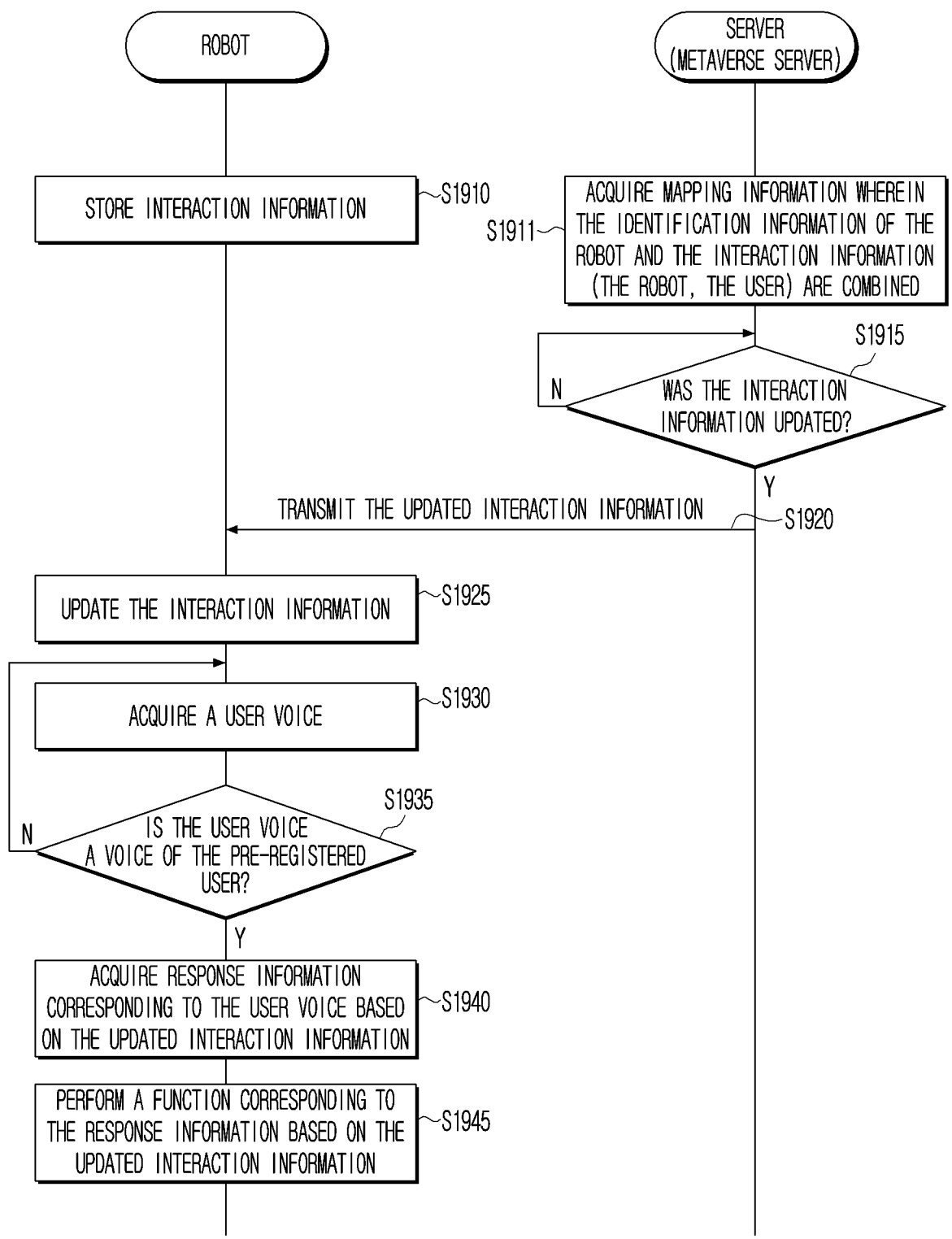
FIG. 19 is a flowchart for illustrating a response operation corresponding to a user voice according to an embodiment of the disclosure.

FIG. 19 is a flowchart for illustrating a response operation corresponding to a user voice according to an embodiment of the disclosure.

Referring to FIG. 19, the robot 100 may store interaction information, in operation S1910. Then, the server 200 may acquire mapping information in which identification information of the robot and the interaction information are combined, in operation S1911.

Here, the server 200 may identify whether the interaction information is updated, in operation S1915. If the interaction information is not updated in operation S1915-N, the robot 100 may repeatedly identify whether the interaction information is updated.

If the interaction information is updated in operation S1915-Y, the robot 100 may transmit the updated interaction information to the robot 100, in operation S1920.

The robot 100 may receive the interaction information from the server 200. Then, the robot 100 may update the interaction information stored previously based on the interaction information received from the server 200, in operation S1925.

Meanwhile, the robot 100 may acquire a user voice, in operation S1930. The robot 100 may identify whether the user voice is a voice of a pre-registered user, in operation S1935. If the acquired user voice is not a voice of the pre-registered user in operation S1935-N, the robot 100 may repeatedly perform the operations S1930 and S1935.

If the acquired voice is a voice of the pre-registered user in operation S1935-Y, the robot 100 may acquire response information corresponding to the user voice based on the updated interaction information, in operation S1940. Then, the robot 100 may perform a function corresponding to the response information based on the updated interaction information, in operation S1945.

Meanwhile, according to various embodiments, the operations S1915 and S1920 may be omitted.

FIG. 20 is a diagram for illustrating a response operation corresponding to a user voice according to an embodiment of the disclosure.

Embodiment 2010 in FIG. 20 indicates that the robot 100 performs a specific function based on interaction information. The robot 100 may acquire a user voice. Then, the robot 100 may use the interaction information in analyzing the user voice. In performing a function corresponding to the user voice, the robot 100 may generate response information including the interaction information.

For example, it is assumed that the robot 100 received a user voice including a content which is "I'm going shopping now." The robot 100 may have stored information that there is a discount coupon issued in the metaverse in the interaction information. The robot 100 may output response information including "Please check the discount coupon issued in the metaverse." The user may be provided with information related to the virtual environment service from the robot 100.

Embodiment 2020 in FIG. 20 indicates that the robot 100 performs a specific function based on interaction information.

For example, it is assumed that the robot 100 received a user voice including a content which is "I'm going shopping now." The robot 100 may have stored information that there is a schedule reserved in the metaverse in the interaction information. The robot 100 may output response information including "There is an appointment at 16:00 today in the metaverse! You shouldn't forget." The user may be provided with information related to the virtual environment service from the robot 100.

Figure 21:
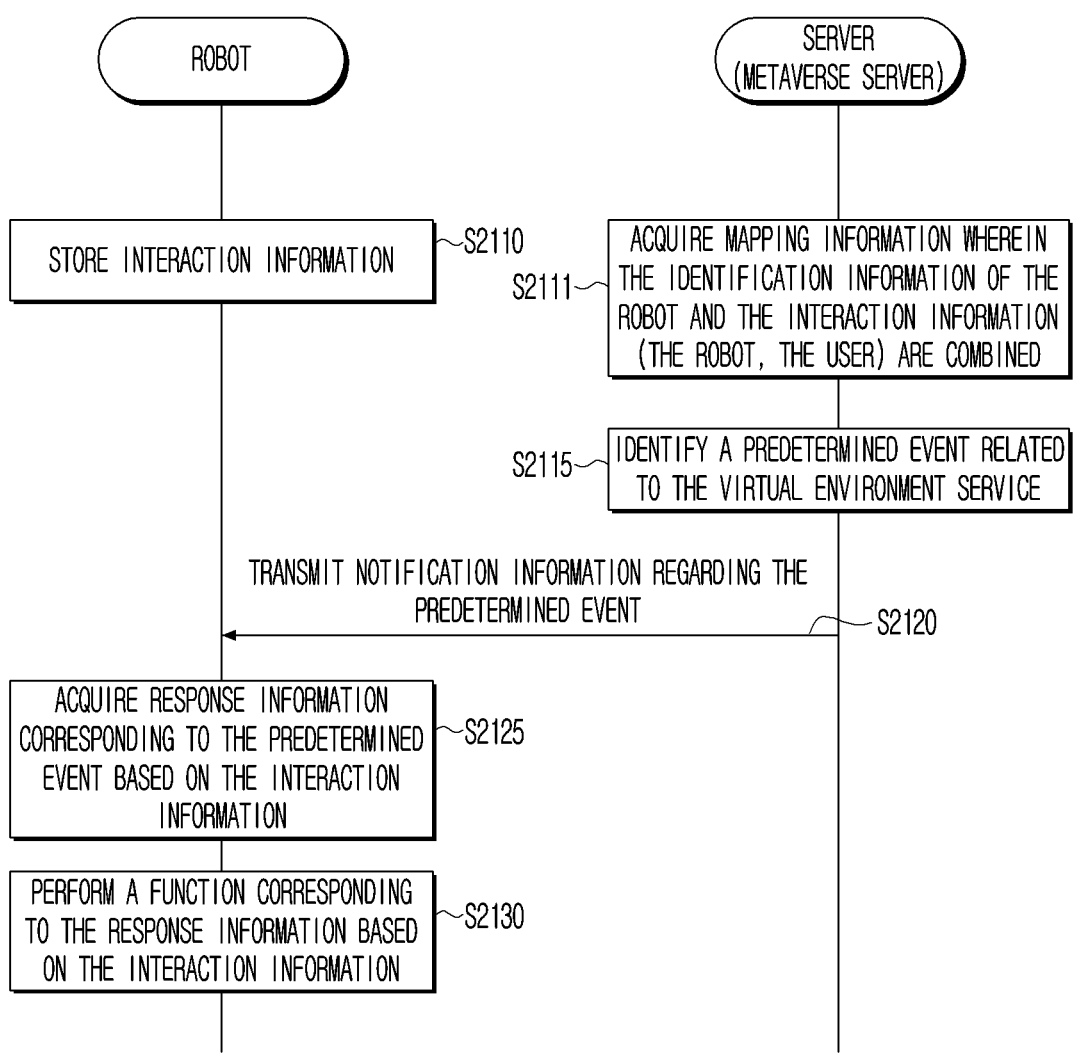
FIG. 21 is a flowchart for illustrating an operation of a robot of acquiring response information based on a predetermined event generated at a server according to an embodiment of the disclosure.

FIG. 21 is a flowchart for illustrating an operation of a robot of acquiring response information based on a predetermined event generated at a server according to an embodiment of the disclosure.

Referring to FIG. 21, the robot 100 may store interaction information, in operation S2110. Then, the server 200 may acquire mapping information in which identification information of the robot and the interaction information are combined, in operation S2111.

Here, the server 200 may identify a predetermined event related to the virtual environment service, in operation S2115. The server 200 may generate notification information regarding the predetermined event. Then, the server 200 may transmit the notification information regarding the predetermined event to the robot 100, in operation S2120.

The robot 100 may receive the notification information regarding the predetermined event from the server 200. Then, the robot 100 may acquire response information corresponding to the predetermined event based on the interaction information, in operation S2125. The robot 100 may perform a function corresponding to the response information based on the interaction information, in operation S2130.

Detailed explanation related to the predetermined event will be described in FIGS. 23 to 27.

Figure 22:
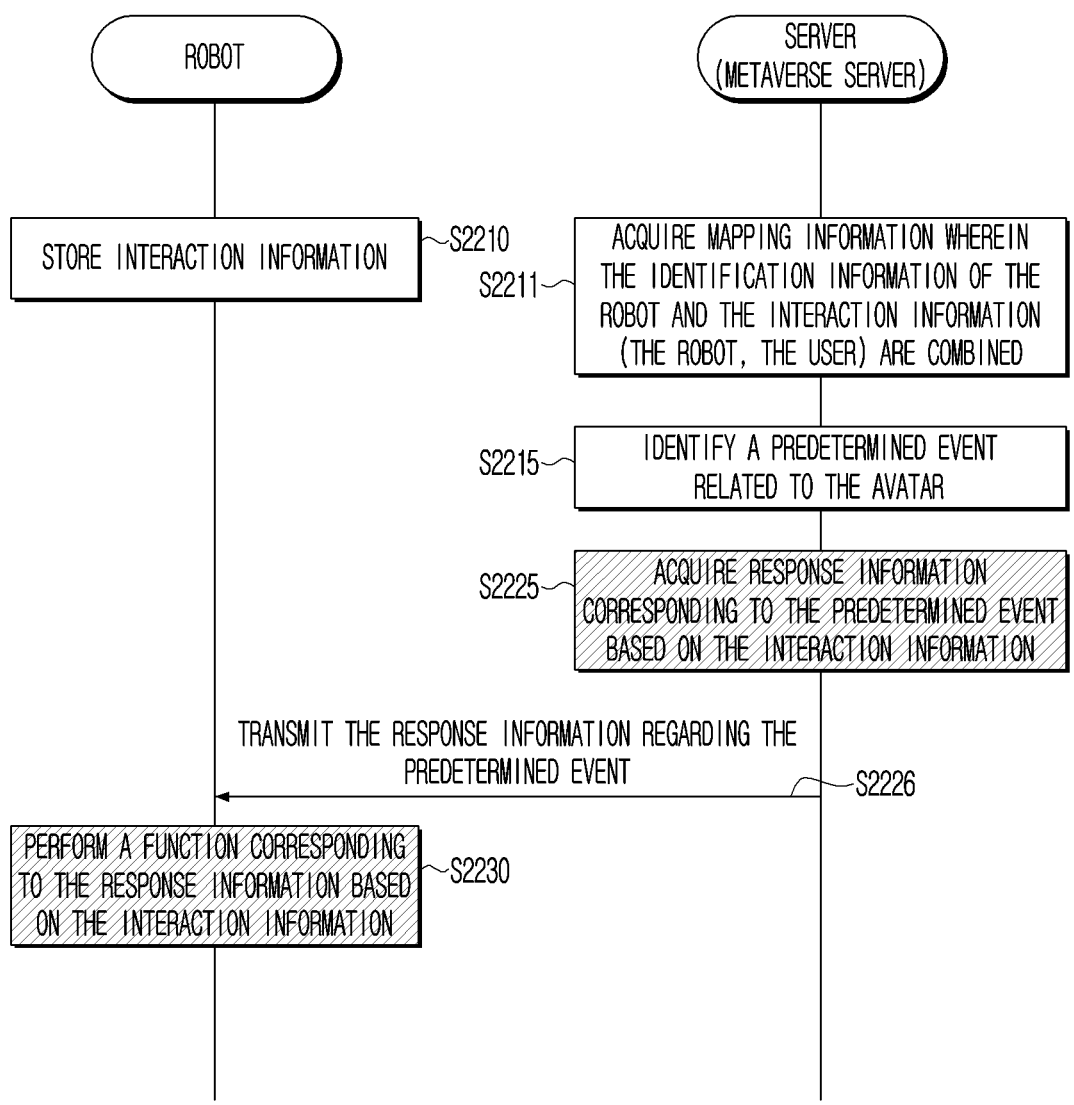
FIG. 22 is a flowchart for illustrating an operation of a server of acquiring response information based on a predetermined event generated at a server according to an embodiment of the disclosure.

FIG. 22 is a flowchart for illustrating an operation of a server of acquiring response information based on a predetermined event generated at the server according to an embodiment of the disclosure.

Referring to FIG. 22, the robot 100 may store interaction information, in operation S2210. Then, the server 200 may acquire mapping information in which identification information of the robot and the interaction information are combined, in operation S2211.

Here, the server 200 may identify a predetermined event related to the virtual environment service, in operation S2215. The server 200 may acquire response information corresponding to the predetermined event based on the interaction information, in operation S2225. Then, the server 200 may transmit the response information corresponding to the predetermined event to the robot 100, in operation S2226.

The robot 100 may receive the response information corresponding to the predetermined event from the server 200. Then, the robot 100 may perform a function corresponding to the response information based on the interaction information, in operation S2230.

FIG. 23 is a diagram for illustrating an operation of a robot of performing a function corresponding to response information based on a predetermined event acquired at a server according to an embodiment of the disclosure.

Embodiment 2310 in FIG. 23 indicates that the predetermined event is an event of receiving information (a feedback) related to a user's posting in the virtual environment service. In the virtual environment service, the user of the robot 100 may upload a specific posting. Then, another user may provide feedback (e.g., clicking of an icon of interest) related to the uploaded specific posting. The server 200 may acquire the feedback related to the specific posting. Then, the server 200 may transmit the feedback related to the specific posting to the robot 100.

For example, it is assumed that the user of the robot 100 uploaded an image in the virtual environment service. Another user of the virtual environment service may click an icon indicating preference after seeing the uploaded image. The server 200 may acquire feedback information (clicking of an icon of preference) of the another user. The server 200 may transmit the feedback information of the another user to the robot 100.

Embodiment 2320 in FIG. 23 indicates that a function corresponding to the predetermined event is performed. The robot 100 may receive information (a feedback) related to the posting uploaded by the user from the server 200. The robot 100 may output response information corresponding to the received information.

For example, if feedback information (clicking of an icon of preference) of another user is received, the robot 100 may output information corresponding to the icon of preference ("Like it!"). Additionally, the robot 100 may output the uploaded image or thumbnail information of the uploaded image together with the information corresponding to the icon of preference ("Like it!").

Here, the outputting operation may be an operation in which the robot 100 displays the information (the feedback) on the display 110 as image data. According to various embodiments, the robot 100 may project the image data through a projection part.

FIG. 24 is a diagram for illustrating an operation of a robot of performing a function corresponding to response information based on a predetermined event acquired at a server according to an embodiment of the disclosure.

Embodiment 2410 in FIG. 24 indicates that the predetermined event is an event related to schedule information stored in the virtual environment service. The server 200 may have stored schedule information of the user. Then, the server 200 may identify an event that a notification for a specific schedule included in the schedule information occurs as the predetermined event. The server 200 may transmit the notification for the specific schedule to the robot 100.

For example, the server 200 may identify that there is a schedule reserved at 14:00 today in the virtual environment service. The server 200 may directly transmit the information related to the reserved schedule to the robot 100 other than the virtual environment service.

Embodiment 2420 in FIG. 24 indicates that a function corresponding to the predetermined event is performed. The robot 100 may receive information related to a schedule from the server 200. The robot 100 may output response information corresponding to the received information.

For example, when the schedule information is received, the robot 100 may output information including a content related to the schedule information ("There is a schedule reserved at 14:00 in the metaverse").

FIG. 25 is a diagram for illustrating an operation of a robot of performing a function corresponding to response information based on a predetermined event acquired at a server according to an embodiment of the disclosure.

Embodiment 2510 in FIG. 25 indicates that the predetermined event is an event that information related to another user 20 is received. The server 200 may identify an event wherein another user 20 sent a conversation to a user 10 in the virtual environment service as the predetermined event.

For example, it is assumed that another user 20 transmitted a conversation which is "Hi" to the user 10 in the virtual environment service. The server 200 may identify occurrence of the predetermined event based on the conversation of the another user 20. Then, the server 200 may transmit information related to the conversation of the another user 20 to the robot 100.

Embodiment 2520 in FIG. 25 indicates that a function corresponding to the predetermined event is performed. The robot 100 may receive information related to another user from the server 200. Then, the robot 100 may output response information corresponding to the received information.

For example, if conversation information of another user 20 is received, the robot 100 may identify a function corresponding to the conversation information of the another user 20. The robot 100 may identify a keyword which is 'hi' in the conversation information of the another user 20, and acquire a control instruction for outputting information which is "ID T-USER talked to you in the metaverse" as response information corresponding to the visit. Then, the robot 100 may output information that "ID T-USER talked to you in the metaverse."

FIG. 26 is a diagram for illustrating an operation of a robot of performing a function corresponding to response information based on a predetermined event acquired at a server according to an embodiment of the disclosure.

Embodiment 2610 in FIG. 26 indicates that a predetermined event is an event wherein information related to another user 20 is received. The server 200 may identify an event wherein the another user 20 sent a conversation to the user 10 in the virtual environment service as the predetermined event.

For example, it is assumed that the another user 20 transmitted a conversation which is "I'll come by your house at 18:00" to the user 10 in the virtual environment service. The server 200 may identify occurrence of the predetermined event based on the conversation of the another user 20. Then, the server 200 may transmit information related to the conversation of the another user 20 to the robot 100.

Embodiment 2620 in FIG. 26 indicates that a function corresponding to the predetermined event is performed. The robot 100 may receive conversation information related to another user from the server 200. Then, the robot 100 may output response information corresponding to the received information.

For example, if conversation information of another user 20 is received, the robot 100 may identify a function corresponding to the conversation information of the another user 20. The robot 100 may identify a keyword which is 'visit' in the conversation information of the another user 20, and acquire a control instruction for performing a cleaning function as response information corresponding to the visit. Then, the robot 100 may perform a cleaning function at a time (17:30) which is earlier than the visiting time of the another user 20 by a predetermined time.

FIG. 27 is a diagram for illustrating an operation of a robot of performing a function corresponding to response information based on a predetermined event acquired at a server according to an embodiment of the disclosure.

Embodiment 2710 in FIG. 27 indicates that a predetermined event is an event wherein information related to another user 20 is received. The server 200 may identify an event wherein another user 20 sent a conversation to the user 10 in the virtual environment service as the predetermined event. Then, the server 200 may identify a response of the user 10 corresponding to the conversation of the another user 20.

For example, it is assumed that another user 20 transmitted a conversation which is "I'll come by your house at 18:00" to the user 10 in the virtual environment service. The server 200 may identify occurrence of the predetermined event based on the conversation of the another user 20. Here, the user 10 may input a conversation agreeing to the visit of the another user 20 ("Yes"). Then, the server 200 may transmit information related to the conversation of the another user 20 and information related to the user 10 to the robot 100.

Embodiment 2720 in FIG. 27 indicates that a function corresponding to the predetermined event is performed. The robot 100 may receive the conversation information related to the another user and the conversation information related to the user from the server 200. Then, the robot 100 may output response information corresponding to the received information.

For example, when the conversation information of the another user 20 is received, the robot 100 may identify a function corresponding to the conversation information of the another user 20. The robot 100 may identify a keyword which is 'visit' in the conversation information of the another user 20, and acquire a control instruction for performing a cleaning function as response information corresponding to the visit. Then, the robot 100 may perform a cleaning function at a time (17:30) which is earlier than the visiting time of the another user 20 by a predetermined time. Also, the robot 100 may identify that the user 10 agreed to the visit of the another user 20 based on the conversation information of the user 10. Accordingly, the robot 100 may output information inquiring about whether to set the smart door lock as 'open' at a specific time (18:00). The robot 100 may output information including a content which is "If you want to open the smart door lock in advance, please perform additional authentication." If the user's additional authentication succeeds, the robot 100 may perform an operation of setting the smart door lock as 'open' at the specific time (18:00).

Figure 28:
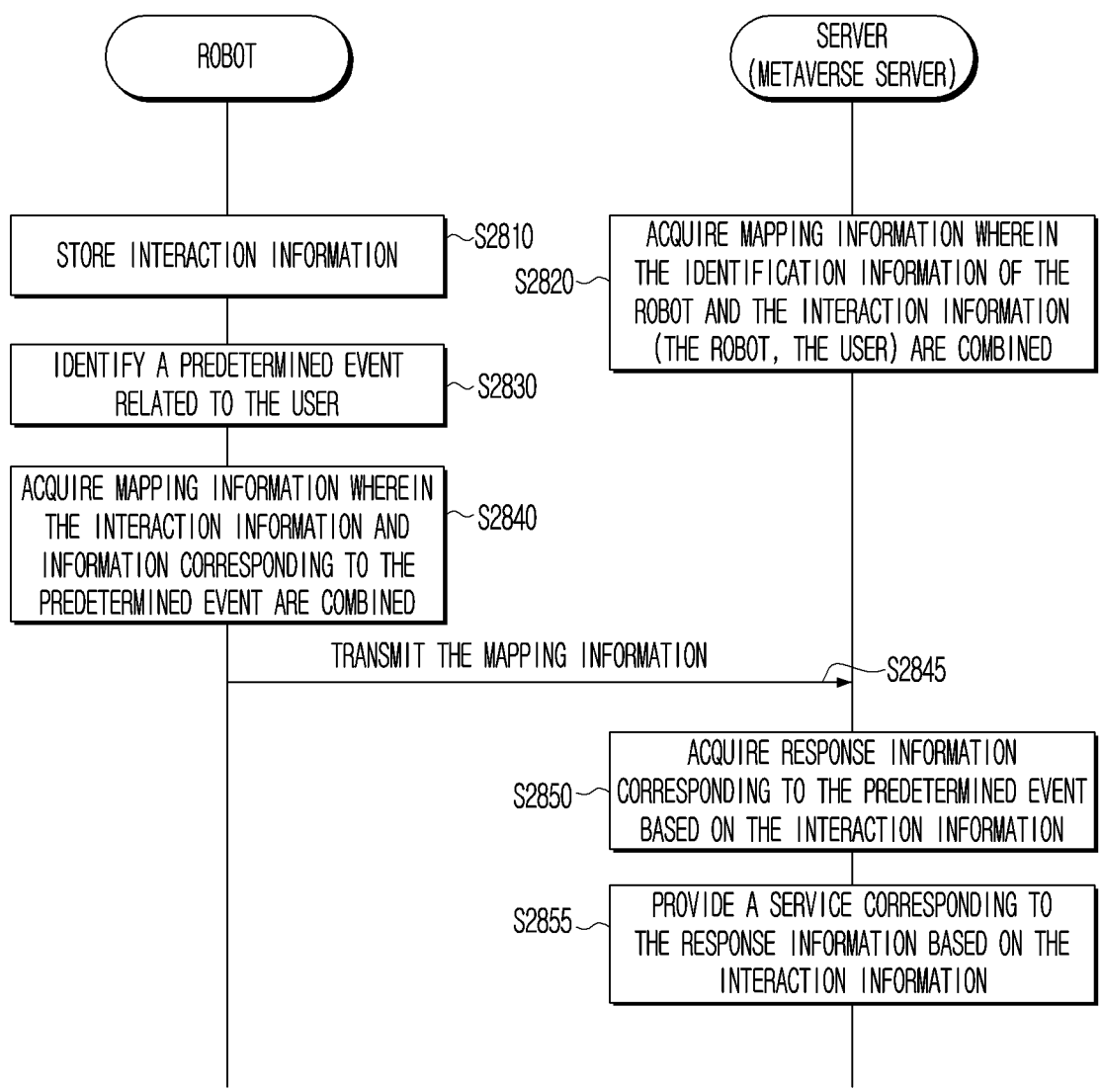
FIG. 28 is a flowchart for illustrating an operation of a server of acquiring response information based on a predetermined event generated at a robot according to an embodiment of the disclosure.

FIG. 28 is a flowchart for illustrating an operation of a server of acquiring response information based on a predetermined event generated at a robot according to an embodiment of the disclosure.

Referring to FIG. 28, the robot 100 may store interaction information, in operation S2810. Then, the server 200 may acquire mapping information in which the identification information of the robot and the interaction information are combined, in operation S2820.

Here, the robot 100 may identify a predetermined event related to the user, in operation S2830. The robot 100 may acquire mapping information in which the interaction information and information corresponding to the predetermined event are combined, in operation S2840. Then, the robot 100 may transmit the mapping information to the server 200, in operation S2845.

The server 200 may receive the mapping information from the robot 100. The server 200 may compare the interaction information included in the mapping information and the interaction information stored in the server 200. Then, the server 200 may specify the robot 100 based on the interaction information received from the robot 100. The server 200 may acquire response information corresponding to the predetermined event based on the interaction information, in operation S2850. Then, the server 200 may provide a service corresponding to the response information based on the interaction information, in operation S2855.

Detailed explanation related to the predetermined event will be described in FIGS. 30 to 37.

Figure 29:
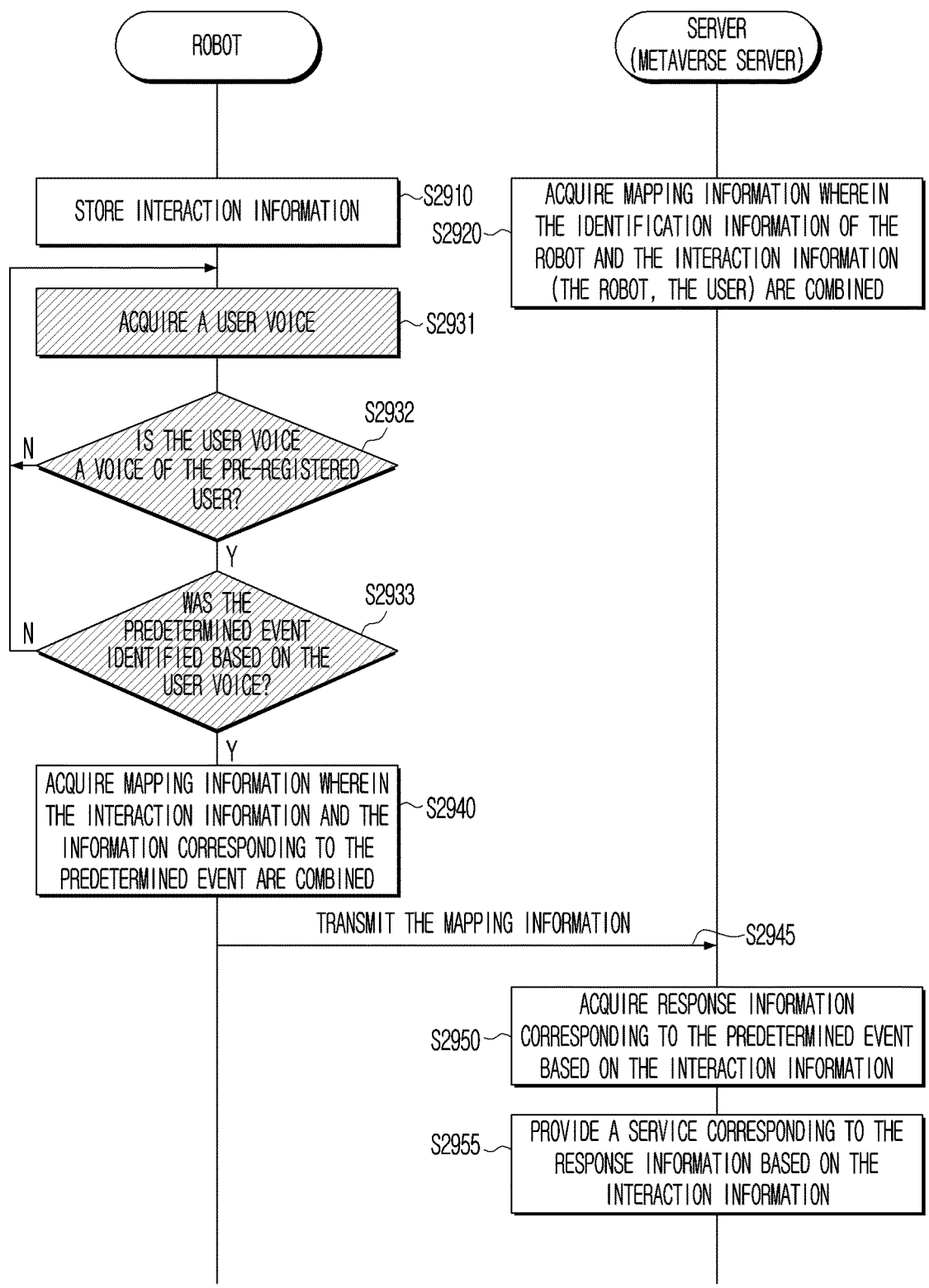
FIG. 29 is a flowchart for illustrating an operation of identifying a predetermined event based on a user voice according to an embodiment of the disclosure.

FIG. 29 is a flowchart for illustrating an operation of identifying a predetermined event based on a user voice according to an embodiment of the disclosure.

Operations S2910, S2920, S2940, S2945, S2950, and S2955 in FIG. 29 may correspond to the operations S2810, S2820, S2840, S2845, S2850, and S2855 in FIG. 28. Accordingly, overlapping explanation will be omitted.

After interaction information is stored, the robot 100 may acquire a user voice, in operation S2931. The robot 100 may identify whether the acquired user voice is the voice of a pre-registered user, in operation S2932. If the acquired user voice is not the voice of the pre-registered user in operation S2932-N, the robot 100 may repeat the operations S2931 and S2932.

If the acquired user voice is the voice of the pre-registered user in operation S2932-Y, the robot 100 may determine whether a predetermined event is identified based on the user voice, in operation S2933. If a predetermined event is not identified based on the user voice in operation S2933-N, the robot 100 may repeat the operations S2931 to S2933.

If a predetermined event is identified based on the user voice in operation S2933-Y, the robot 100 may perform the operations S2940, S2945, S2950, and S2955.

FIG. 30 is a diagram for illustrating an operation of a server of providing a service corresponding to response information based on a predetermined event generated at a robot according to an embodiment of the disclosure.

Embodiment 3010 in FIG. 30 indicates that a predetermined event is an event wherein the user makes an item 3011 recognized by the robot 100. The robot 100 may recognize the item 3011. The information corresponding to the predetermined event may be information related to the item 3011.

According to various embodiments, the robot 100 may recognize a radio-frequency identification (RFID) through the communication interface 130. The user may tag the item 3011 to the robot 100.

The robot 100 may acquire information corresponding to the recognized item 3011. Then, the robot 100 may transmit the information corresponding to the item 3011 to the server 200.

For example, the robot 100 may identify the clothes that is shown by the user. Then, the robot 100 may acquire information related to the clothes by an RFID method. The robot 100 may acquire information related to the clothes such as the name, the color, the material, the purchase information, etc. of the clothes through the RFID method. Then, the robot 100 may transmit the information of the clothes acquired by the RFID method to the server 200.

Embodiment 3020 in FIG. 30 indicates that the server 200 provides a specific service based on the information received from the robot 100. The server 200 may receive information corresponding to the predetermined event from the robot 100. Then, the server 200 may provide a specific service based on the information corresponding to the predetermined event.

For example, the server 200 may receive information related to the item 3011 from the robot 100. The server 200 may identify a skin related to the item 3011 among a plurality of skins stored in the internal memory. Then, the server 200 may provide a user avatar 3021 to which the identified skin is applied to the user.

FIG. 31 is a diagram for illustrating an operation of a server of providing a service corresponding to response information based on a predetermined event generated at a robot according to an embodiment of the disclosure.

Embodiment 3110 in FIG. 31 indicates that a predetermined event is an event wherein the user makes a home appliance 3111 recognized by the robot 100. The robot 100 may recognize the home appliance 3111. The information corresponding to the predetermined event may be information related to the home appliance 3111.

According to various embodiments, the robot 100 may acquire the information related to the home appliance 3111 from the user. Also, according to various embodiments, the robot 100 may acquire the information corresponding to the home appliance 3111 by directly communicating with the home appliance 3111.

The robot 100 may acquire the information corresponding to the recognized home appliance 3111. Then, the robot 100 may transmit the information corresponding to the home appliance 3111 to the server 200.

For example, the robot 100 may identify an air purifier. Then, the robot 100 may acquire information related to the air purifier. The robot 100 may acquire the information related to the air purifier such as the product information, the purchase information, etc. of the air purifier. Then, the robot 100 may transmit the information of the air purifier to the server 200.

Embodiment 3120 in FIG. 31 indicates that the server 200 provides a specific service based on the information received from the robot 100. The server 200 may receive information corresponding to the predetermined event from the robot 100. Then, the server 200 may provide a specific service based on the information corresponding to the predetermined event.

For example, the server 200 may receive information related to the home appliance 3111 from the robot 100. The server 200 may identify an icon related to the home appliance 3111 among a plurality of icons stored in the internal memory. Then, the server 200 may provide an identified icon 3121 to the user.

FIG. 32 is a diagram for illustrating an operation of a server of providing a service corresponding to response information based on a predetermined event generated at a robot according to an embodiment of the disclosure.

Embodiment 3210 in FIG. 32 indicates that a predetermined event is an event wherein a breakdown of a home appliance 3211 is recognized. The robot 100 may recognize the breakdown of the home appliance 3211. The information corresponding to the predetermined event may be information related to the home appliance 3211.

According to various embodiments, the robot 100 may acquire breakdown information related to the home appliance 3211 from the user. Also, according to various embodiments, the robot 100 may acquire breakdown information corresponding to the home appliance 3211 by directly communicating with the home appliance 3211.

The robot 100 may acquire the breakdown information corresponding to the recognized home appliance 3211. Then, the robot 100 may transmit the breakdown information corresponding to the home appliance 3211 to the server 200.

For example, the robot 100 may identify a breakdown event of an air purifier. Then, the robot 100 may acquire breakdown information related to the air purifier. The robot 100 may acquire information related to the air purifier such as the product information, the purchase information, the breakdown information, etc. of the air purifier. Then, the robot 100 may transmit the information on the air purifier to the server 200.

Embodiment 3220 in FIG. 32 indicates that the server 200 provides a specific service based on the information received from the robot 100. The server 200 may receive information corresponding to a predetermined event from the robot 100. Then, the server 200 may provide a specific service based on the information corresponding to the predetermined event.

For example, the server 200 may receive breakdown information related to the home appliance 3211 from the robot 100. The server 200 may provide at least one of information for notifying the fact regarding breakdown among a plurality of device information stored in the internal memory or information for inquiring about a repair request through a robot avatar 3221.

FIG. 33 is a diagram for illustrating an operation of a server of providing a service corresponding to response information based on a predetermined event generated at a robot according to an embodiment of the disclosure.

Embodiment 3310 in FIG. 33 indicates that a predetermined event is an event wherein it is recognized that a specific product is needed according to space analysis. The robot 100 may analyze the space around the robot 100. Then, the robot 100 may identify that a specific product is needed through the space analysis. The robot 100 may perform a function of recommending a specific product to the user. The information corresponding to the predetermined event may be the analyzed product information.

The robot 100 may acquire space information, and identify a product corresponding to the space information. Then, the robot 100 may acquire product information related to the identified product. Then, the robot 100 may transmit the product information to the server 200.

For example, the robot 100 may analyze a space, and identify that a sofa is needed. Then, the robot 100 may acquire information related to a sofa. The robot 100 may acquire the information related to a sofa such as the product information, the purchase information, etc. of the sofa. Then, the robot 100 may transmit the information related to the sofa to the server 200.

Embodiment 3320 in FIG. 33 indicates that the server 200 provides a specific service based on the information received from the robot 100. The server 200 may receive information corresponding to a predetermined event from the robot 100. Then, the server 200 may provide a specific service based on the information corresponding to the predetermined event.

For example, the server 200 may receive information related to a sofa from the robot 100. The server 200 may identify an icon 3321 related to a sofa among the plurality of icons stored in the internal memory. Then, the server 200 may provide the identified icon 3321 to the user.

FIG. 34 is a diagram for illustrating an operation of a server of providing a service corresponding to response information based on a predetermined event generated at a robot according to an embodiment of the disclosure.

Embodiment 3410 in FIG. 34 indicates that a predetermined event is an event of recommending specific clothes according to space analysis. The robot 100 may analyze the space around the robot 100. Then, the robot 100 may photograph specific clothes through the space analysis, and identify that one of the photographed clothes should be recommended. The robot 100 may perform a function of recommending the specific clothes to the user. The information corresponding to the predetermined event may be the analyzed clothes information.

The robot 100 may acquire space information, and identify the clothes corresponding to the space information. Then, the robot 100 may acquire clothes information related to recommended clothes 3411 among the plurality of clothes information. Then, the robot 100 may transmit the clothes information to the server 200.

For example, the robot 100 may analyze the space, and recommend specific clothes to the user. Then, the robot 100 may acquire information related to the recommended clothes 3411. The robot 100 may acquire information related to the clothes such as the product information, the purchase information, etc. of the recommended clothes. Then, the robot 100 may transmit the information related to the recommended clothes to the server 200.

Embodiment 3420 in FIG. 34 indicates that the server 200 provides a specific service based on the information received from the robot 100. The server 200 may receive information corresponding to a predetermined event from the robot 100. The server 200 may provide a specific service based on the information corresponding to the predetermined event.

For example, the server 200 may receive information related to the recommended clothes from the robot 100. The server 200 may identify a skin related to the recommended clothes 3411 among the plurality of skins stored in the internal memory. Then, the server 200 may provide a user avatar 3421 to which the identified skin is applied to the user.

FIG. 35 is a diagram for illustrating an operation of a server of providing a service corresponding to response information based on a predetermined event generated at a robot according to an embodiment of the disclosure.

Embodiment 3510 in FIG. 35 indicates that the predetermined event is an event of receiving a user voice including schedule information. The robot 100 may receive a user voice, and perform a voice recognizing operation. Then, the robot 100 may perform control so that the schedule information acquired through the user voice recognition is provided to the user in the virtual environment service. The information corresponding to the predetermined event may be the analyzed schedule information.

The robot 100 may acquire schedule information included in the user voice. Then, the robot 100 may transmit the schedule information to the server 200.

For example, the robot 100 may acquire a user voice that uttered "I'll go camping on Friday." The robot 100 may analyze the user voice, and acquire keywords related to Friday and camping as schedule information. Then, the robot 100 may transmit the schedule information to the server 200.

Embodiment 3520 in FIG. 35 indicates that the server 200 provides a specific service based on the information received from the robot 100. The server 200 may receive information corresponding to the predetermined event from the robot 100. The server 200 may provide a specific service based on the information corresponding to the predetermined event.

For example, the server 200 may receive schedule information from the robot 100. The robot 100 may identify the time and the keyword included in the schedule information. The server 200 may identify a skin related to the keyword among the plurality of skins stored in the internal memory. Then, the server 200 may provide at least one of a robot avatar 3521, a separate item 3522, or a user avatar 3523 to which the identified skin is applied to the user. The server 200 may provide the avatars 3521, 3523 to which the skin related to camping is applied or the separate item 3522 related to camping to the user.

FIG. 36 is a diagram for illustrating an operation of a server of providing a service corresponding to response information based on a predetermined event generated at a robot according to an embodiment of the disclosure.

Embodiment 3610 in FIG. 36 indicates that the predetermined event is an event wherein the use degree of the robot 100 is greater than or equal to a threshold level.

The robot 100 may calculate the intimacy according to the use degree of the user. Then, if the intimacy degree is greater than or equal to a threshold level, the robot 100 may identify that a predetermined event occurred. Then, the robot 100 may acquire the intimacy degree information. The intimacy degree information may be determined based on the history information such as the number of times of use or the use history of the user. The information corresponding to the predetermined event may be the analyzed intimacy degree information.

The robot 100 may acquire the intimacy degree information. Then, the robot 100 may transmit the intimacy degree information to the server 200.

For example, if the robot 100 acquires a user voice that uttered "How is the weather?", the robot 100 may output a response which is "It's fine" to the user. Also, if the robot 100 acquires a user voice that uttered "How long does it take to go to work?", the robot 100 may output a response which is "One hour" to the user. Further, if the robot 100 acquires a user voice that uttered "Is there an appointment today?", the robot 100 may output a response which is "No" to the user. If the number of times of use is greater than or equal to a threshold number of times (three times), the robot 100 may identify that the intimacy information is greater than or equal to the threshold level. Then, the robot 100 may identify that the predetermined event occurred.

The robot 100 may determine the intimacy level corresponding to the user among a plurality of stored intimacy levels. Then, the robot 100 may transmit the intimacy degree information including the determined intimacy level to the server 200.

Embodiment 3620 in FIG. 36 indicates that the server 200 provides a specific service based on the information received from the robot 100. The server 200 may receive information corresponding to a predetermined event from the robot 100. The server 200 may provide a specific service based on the information corresponding to a predetermined event.

For example, the server 200 may receive the intimacy degree information from the robot 100. The robot 100 may identify the intimacy level included in the intimacy level information. The server 200 may identify a skin related to the identified intimacy level among the plurality of skins stored in the internal memory. Then, the server 200 may provide at least one of a robot avatar 3621 or a user avatar 3622 to which the identified skin is applied to the user. The server 200 may provide the avatars 3621, 3622 to which the skin related to camping is applied to the user.

FIG. 37 is a diagram for illustrating an operation of a server of providing a service corresponding to response information based on a predetermined event generated at a robot according to an embodiment of the disclosure.

Embodiment 3710 in FIG. 37 indicates that the predetermined event is an event wherein the user makes an item 3711 recognized by the robot 100, and inputs a user instruction. The robot 100 may recognize the item 3711 and acquire the user instruction. The information corresponding to the predetermined event may be the information related to the item 3711 and the user instruction.

As the operation of recognizing the item 3711 was described in the embodiment 3010 in FIG. 30, overlapping explanation will be omitted.

The robot 100 may acquire information corresponding to the recognized item 3711 and the user instruction. Then, the robot 100 may transmit the information corresponding to the item 3711 and the user instruction to the server 200.

For example, the robot 100 may acquire a user instruction which is "I'll sell these clothes secondhand, so please post it in the metaverse," and acquire information corresponding to the clothes.

Embodiment 3720 in FIG. 37 indicates that the server 200 provides a specific service based on the information received from the robot 100. The server 200 may receive information corresponding to the predetermined event from the robot 100. Then, the server 200 may provide a specific service based on the information corresponding to the predetermined event.

For example, the server 200 may receive the information related to the item 3711 and the user instruction from the robot 100. The server 200 may identify and display an icon 3721 corresponding to the item 3711 among the plurality of icons stored in the internal memory. Also, if the user avatar was previously in a state wherein the skin corresponding to the icon 3721 was applied, the robot 100 may provide a user avatar 3722 to which a new skin which is not the skin corresponding to the icon 3721 is applied to the user.

FIG. 38 is a diagram for illustrating an operation of providing different responses according to an embodiment of the disclosure.

Embodiment 3810 in FIG. 38 indicates a situation wherein a response is made to a pre-registered user 3811. The robot 100 may recognize the pre-registered user 3811. The robot 100 may perform a specific function based on interaction information corresponding to the pre-registered user 3811. The specific function may be conversation information provided to the pre-registered user 3811.

For example, the robot 100 may output information of a conversation having a high intimacy degree ("S-USER, your clothes are so pretty today") to the pre-registered user 3811 based on the interaction information corresponding to the pre-registered user 3811.

Embodiment 3820 in FIG. 38 indicates a situation wherein a response is made to a general user 3821. The robot 100 may recognize the general user 3821 who is not registered. It is assumed that the robot 100 does not store interaction information corresponding to the general user 3821. The robot 100 may perform a specific function without interaction information. The specific function may be an operation performed using information of a conversation provided to the general user 3821.

For example, the robot 100 may output information of a conversation having a low intimacy degree ("Hello, if you need help, please tell me") to the general user 3821.

Figure 39:
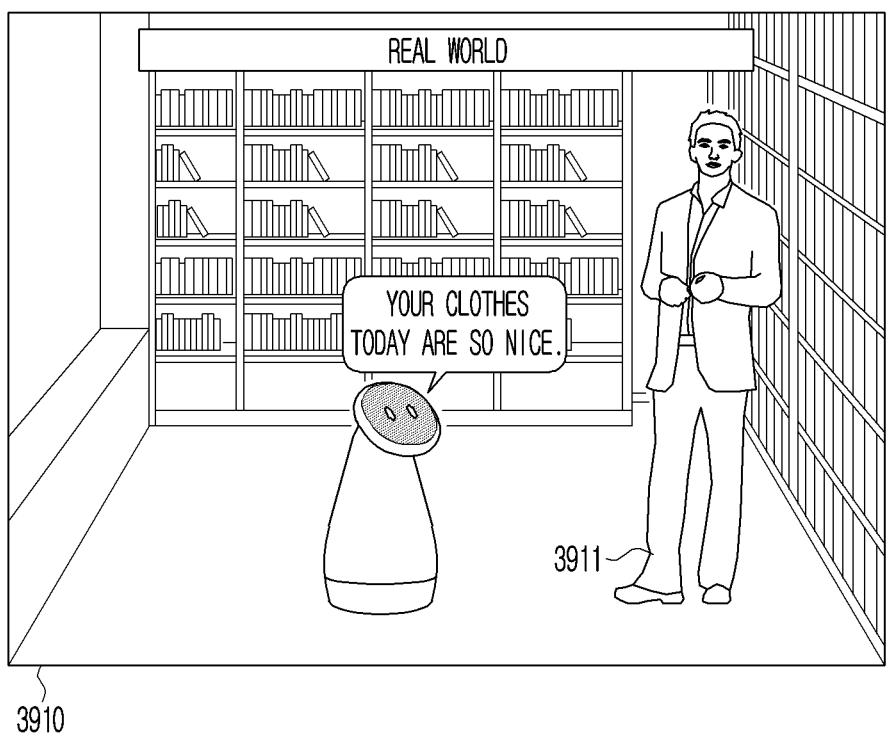
FIG. 39 is a diagram for illustrating a robot providing functions to a plurality of users according to an embodiment of the disclosure.

FIG. 39 is a diagram for illustrating a robot providing functions to a plurality of users according to an embodiment of the disclosure.

Embodiment 3910 of FIG. 39 indicates a situation in which the robot 100 may be arranged in an environment wherein there is no pre-registered user. For example, the robot 100 may be arranged in a space such as a public space or a place of business.

The robot 100 may be a device providing a service to a plurality of unspecified users who are not specific users. In case the robot 100 provides a service (or a function) to users who are more than a threshold number of people (ten people) during a threshold time (three hours), the robot 100 may operate in a public use mode. Here, the public use mode may be a mode of providing a service to various users.

The public use mode may be a mode of providing a response having a high intimacy degree to all users. Unlike in FIG. 38, the robot 100 described in FIG. 39 may also provide a response having a high intimacy degree to a general user 3911 who was not pre-registered.

Figure 40:
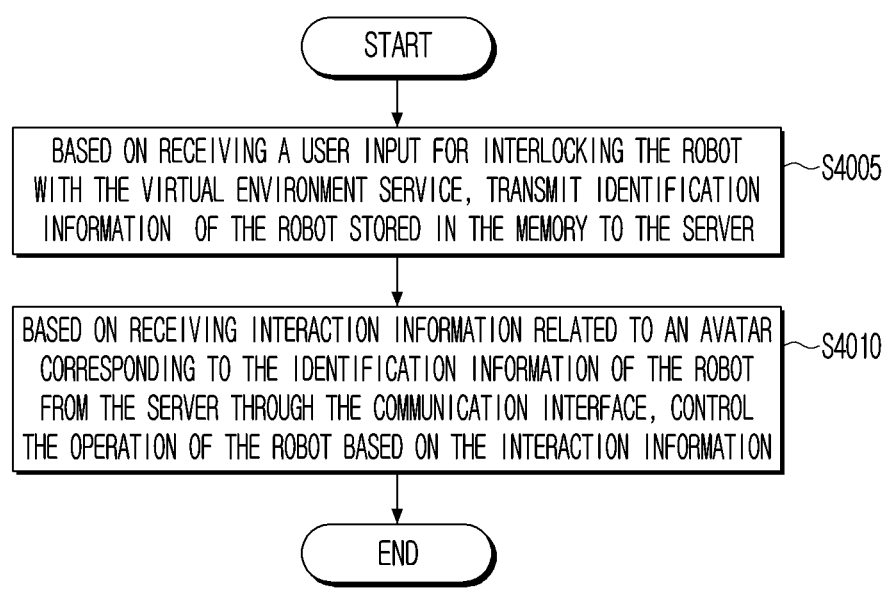
FIG. 40 is a flowchart for illustrating a method of controlling a robot according to an embodiment of the disclosure.

FIG. 40 is a flowchart for illustrating a method of controlling a robot according to an embodiment of the disclosure.

Referring to FIG. 40, a method of controlling a robot communicating with a server providing a virtual environment service includes, based on receiving a user input for interlocking the robot with the virtual environment service, transmitting the identification information of the robot stored in the robot to the server, in operation S4005, and based on receiving interaction information related to an avatar corresponding to the identification information of the robot from the server, controlling an operation of the robot based on the interaction information, in operation S4010.

Meanwhile, the controlling method may further include, based on receiving the interaction information, displaying a user interface (UI) for performing user authentication, and in the controlling of the operation of the robot, in operation S4010, based on the user authentication being completed based on information received through the UI, the operation of the robot may be controlled based on the interaction information.

Meanwhile, in the displaying of the UI, based on receiving the interaction information, the UI guiding to utter an avatar's identification information may be displayed based on the interaction information, and the controlling method may further include, based on acquiring a user voice including the identification information of the user avatar based on the UI, identifying that the authentication of the user was completed.

Meanwhile, the interaction information may include at least one of interaction information related to a user avatar corresponding to the user, interaction information related to a robot avatar corresponding to the robot, or environment information related to the virtual environment service.

Meanwhile, the interaction information related to the user avatar may include at least one of identification information of the user avatar, conversation information related to the user avatar, context information related to the user avatar, or schedule information related to the user avatar, and the interaction information related to the robot avatar may include at least one of identification information of the robot avatar, conversation information related to the robot avatar, context information related to the robot avatar, or schedule information related to the robot avatar, and the environment information related to the virtual environment service may include information related to an event acquired in the virtual environment service.

Meanwhile, the identification information of the user avatar or the identification information of the robot avatar may include at least one of a name, an identification number, or profile information for identifying the avatar, and the conversation information related to the user avatar or the conversation information related to the robot avatar may include at least one of a keyword, a preferred theme, a preferred emotional expression, or a tendency included in the conversation of the avatar, and the context information related to the user avatar or the context information related to the robot avatar may include at least one of a relation, an activity, a visited place, a purchased product, or a preferred product of the avatar.

Meanwhile, the controlling method may further include, based on acquiring a user voice, identifying whether the user voice is a voice of a user pre-registered in the robot, and in the controlling of the operation of the robot, in operation S4010, based on the user voice being a voice of the pre-registered user, a function corresponding to the user voice may be performed based on the interaction information.

Meanwhile, in the controlling of the operation of the robot, in operation S4010, based on a word related to a schedule being included in the user voice, schedule information included in the interaction information may be output through the speaker of the robot.

Meanwhile, in the controlling of the operation of the robot, in operation S4010, based on receiving notification information for a predetermined event from the server, a function corresponding to the predetermined event may be performed based on the interaction information.

Meanwhile, the controlling method may further include, based on identifying a predetermined event, acquiring mapping information in which the interaction information and notification information for the predetermined event are combined, and transmitting the mapping information to the server.

Meanwhile, the controlling method of a robot as in FIG. 40 may be executed in a robot having a configuration as in FIG. 1 or 2, and it may also be executed on robots having different configurations.

Meanwhile, methods according to the aforementioned various embodiments of the disclosure may be implemented in forms of applications that can be installed on conventional electronic devices (robots).

Also, the methods according to the aforementioned various embodiments of the disclosure may be implemented just with software upgrade, or hardware upgrade of conventional electronic devices (robots).

In addition, the aforementioned various embodiments of the disclosure may be performed through an embedded server provided on an electronic device (a robot), or an external server of at least one of an electronic device (a robot) or a display device.

Meanwhile, according to various embodiments of the disclosure, the aforementioned various embodiments may be implemented as software including instructions stored in machine-readable storage media, which can be read by machines (e.g., computers). The machines refer to devices that call instructions stored in a storage medium, and can operate according to the called instructions, and the devices may include an electronic device (a robot) according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' denotes that a storage medium does not include signals, and is tangible, but does not indicate whether data is stored in the storage medium semi-permanently or temporarily.

Also, according to various embodiments of the disclosure, the methods according to the aforementioned various embodiments may be provided while being included in a computer program product. The computer program product can be traded between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least temporarily stored in a storage medium such as the server of the manufacturer, the server of the application store, or the memory of the relay server, or temporarily generated.

In addition, each of the components (e.g., a module or a program) according to the aforementioned various embodiments may be comprised of a single entity or a plurality of entities, and some sub-components among the aforementioned sub-components may be omitted, or different sub-components may be further included in the various embodiments. Alternatively or additionally, some components (e.g., modules or programs) may be integrated into one entity to perform the same or similar functions performed by each component prior to integration. Operations performed by a module, a program, or another component, in accordance with the various embodiments, may be performed sequentially, in parallel, repetitively, or heuristically, or at least some operations may be performed in a different order, omitted, or a different operation may be added.

While the disclosure has been shown and described with reference to various embodiments thereof, it will be understood by those skilled in the art that various changes in form and details may be made therein without departing from the spirit and scope of the disclosure as defined by the appended claims. and their equivalents.

What is claimed is:

1. A robot comprising:
    a display;
    memory, comprising one or more storage media, storing identification information of the robot and one or more computer programs;
    a communication interface communicating with a server providing a virtual environment service; and
    at least one processor communicatively coupled to the display, the communication interface, and the memory,
    wherein the one or more computer programs include computer-executable instructions that, when executed by the at least one processor individually or collectively, cause the robot to:
        based on receiving a user input for interlocking the robot with the virtual environment service, transmit, to the server through the communication interface, the identification information of the robot stored in the memory,
        receive, from the server through the communication interface, interaction information related to an avatar corresponding to the identification information of the robot,
        based on a security level of the interaction information being less than a predetermined security level, control an operation of the robot according to the interaction information, and
        based on the security level of the interaction information being greater than or equal to the predetermined level, perform additional user authentication.

2. The robot of claim 1, wherein the one or more computer programs further include computer-executable instructions that, when executed by the at least one processor individually or collectively, cause the robot to:
    based on the receiving of the interaction information, control the display to display a user interface (UI) for performing user authentication, and
    based on the user authentication being successful using information received through the UI, control the operation of the robot based on the interaction information.

3. The robot of claim 2, further comprising:
    a microphone,
    wherein the one or more computer programs further include computer-executable instructions that, when executed by the at least one processor individually or collectively, cause the robot to:
        based on the receiving of the interaction information, control the display to display the UI for guiding a user to utter identification information of a user avatar, and
        based on acquiring, through the microphone, a user voice of the user uttering the identification information of the user avatar based on the UI, identify that the user authentication is successful.

4. The robot of claim 1, wherein the interaction information comprises at least one of interaction information related to a user avatar corresponding to a user, interaction information related to a robot avatar corresponding to the robot, or environment information related to the virtual environment service.

5. The robot of claim 4,
    wherein the interaction information related to the user avatar comprises at least one of identification information of the user avatar, conversation information related to the user avatar, context information related to the user avatar, or schedule information related to the user avatar,
    wherein the interaction information related to the robot avatar comprises at least one of identification information of the robot avatar, conversation information related to the robot avatar, context information related to the robot avatar, or schedule information related to the robot avatar, and
    wherein the environment information related to the virtual environment service comprises information related to an event acquired in the virtual environment service.

6. The robot of claim 5,
    wherein the identification information of the user avatar or the identification information of the robot avatar comprises at least one of a name, an identification number, or profile information for identifying the user avatar or the robot avatar,
    wherein the conversation information related to the user avatar or the conversation information related to the robot avatar comprises at least one of a keyword, a preferred theme, a preferred emotional expression, or a tendency included in a conversation of the user avatar or the robot avatar, and
    wherein the context information related to the user avatar or the context information related to the robot avatar comprises at least one of a relation, an activity, a visited place, a purchased product, or a preferred product of the user avatar or the robot avatar.

7. The robot of claim 1, further comprising:
a microphone,
wherein the one or more computer programs further include computer-executable instructions that, when executed by the at least one processor individually or collectively, cause the robot to:
based on a user voice being acquired through the microphone, identify whether the user voice is a voice of a user pre-registered in the memory, and
based on the user voice being a voice of the pre-registered user, perform a function corresponding to the user voice according to the interaction information.

8. The robot of claim 7, further comprising:
a speaker,
wherein the one or more computer programs further include computer-executable instructions that, when executed by the at least one processor individually or collectively, cause the robot to:
based on a word related to a schedule being included in the user voice, control the speaker to output schedule information included in the interaction information.

9. The robot of claim 1, wherein the one or more computer programs further include computer-executable instructions that, when executed by the at least one processor individually or collectively, cause the robot to:
based on receiving, from the server through the communication interface, notification information for a predetermined event, perform a function corresponding to the predetermined event according to the interaction information.

10. The robot of claim 1, wherein the one or more computer programs further include computer-executable instructions that, when executed by the at least one processor individually or collectively, cause the robot to:
based on identifying a predetermined event, acquire mapping information comprising the interaction information and notification information for the predetermined event being combined, and
transmit, to the server through the communication interface, the mapping information.

11. A method performed by a robot communicating with a server providing a virtual environment service, the method comprising:
based on receiving a user input for interlocking the robot with the virtual environment service, transmitting, by the robot to the server, identification information of the robot, the identification information being stored in a-memory of the robot;
receiving, from the server through a communication interface, interaction information related to an avatar corresponding to the identification information of the robot;
based on a security level of the interaction information being less than a predetermined security level, controlling an operation of the robot according to the interaction information; and
based on the security level of the interaction information being greater than or equal to the predetermined level, performing additional user authentication.

12. The method of claim 11, further comprising:
based on the receiving of the interaction information, displaying a user interface (UI) for performing user authentication,
wherein the controlling of the operation of the robot comprises:
based on the user authentication being successful using information received through the UI, controlling the operation of the robot according to the interaction information.

13. The method of claim 12,
wherein the displaying of the UI comprises:
based on the receiving of the interaction information, displaying the UI for guiding a user to utter identification information a user avatar, and
wherein the controlling method further comprises:
based on acquiring a user voice of the user uttering the identification information of the user avatar based on the UI, identifying that the user authentication is successful.

14. The method of claim 11, wherein the interaction information comprises at least one of interaction information related to a user avatar corresponding to a user, interaction information related to a robot avatar corresponding to the robot, or environment information related to the virtual environment service.

15. The method of claim 14,
wherein the interaction information related to the user avatar comprises at least one of identification information of the user avatar, conversation information related to the user avatar, context information related to the user avatar, or schedule information related to the user avatar,
wherein the interaction information related to the robot avatar comprises at least one of identification information of the robot avatar, conversation information related to the robot avatar, context information related to the robot avatar, or schedule information related to the robot avatar, and
wherein the environment information related to the virtual environment service comprises information related to an event acquired in the virtual environment service.

16. The method of claim 15, wherein at least one of the conversation information related to the user avatar or the conversation information related to the robot avatar includes at least one of a keyword, a preferred theme, a preferred emotional expression, or a tendency included in an avatar's conversation.

17. The method of claim 11, wherein the identification information of the robot includes at least one of a unique serial number or a unique model number indicating that the robot is a specific device among a plurality of devices.

18. The method of claim 17, wherein the identification information of the robot is stored in the memory in advance in one of a factory shipment operation or an initial delivery operation.

19. The robot of claim 1, further comprising:
a photographic sensor,
wherein a photograph taken of a gesture of the user by the photographic sensor is compared to a predetermined gesture to determine whether an authenticating operation succeeded.

* * * * *